United States Patent
Kuge

(12) 
(10) Patent No.: US 6,715,096 B2
(45) Date of Patent: Mar. 30, 2004

(54) INTERFACE CIRCUIT DEVICE FOR PERFORMING DATA SAMPLING AT OPTIMUM STROBE TIMING BY USING STORED DATA WINDOW INFORMATION TO DETERMINE THE STROBE TIMING

(75) Inventor: Shigehiro Kuge, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 581 days.

(21) Appl. No.: 09/749,509

(22) Filed: Dec. 28, 2000

(65) Prior Publication Data

US 2001/0014922 A1 Aug. 16, 2001

(30) Foreign Application Priority Data

Feb. 14, 2000 (JP) .................................. 2000-034830
Jun. 27, 2000 (JP) .................................. 2000-192565
Aug. 30, 2000 (JP) .................................. 2000-261152

(51) Int. Cl.[7] ................................................ G06F 1/04
(52) U.S. Cl. ........................ 713/600; 713/500; 710/305; 711/167
(58) Field of Search ........................ 713/400, 401, 713/500, 501, 502, 503, 600; 710/305, 306; 711/100, 154, 167

(56) References Cited

U.S. PATENT DOCUMENTS

| | | | | |
|---|---|---|---|---|
| 4,603,403 A | * | 7/1986 | Toda ...................... | 365/189.05 |
| 5,235,685 A | * | 8/1993 | Caldara et al. ............. | 710/313 |
| 5,577,236 A | | 11/1996 | Johnson et al. | |
| 5,675,766 A | * | 10/1997 | Petersen ...................... | 711/154 |
| 5,946,712 A | | 8/1999 | Lu et al. | |
| 6,247,136 B1 | * | 6/2001 | MacWilliams et al. ..... | 713/401 |
| 6,330,683 B1 | * | 12/2001 | Jeddeloh ...................... | 713/401 |

FOREIGN PATENT DOCUMENTS

| JP | 8-123717 | | 5/1996 | | |
|---|---|---|---|---|---|
| JP | 08227377 A | * | 9/1996 | ........... | G06F/12/06 |

* cited by examiner

Primary Examiner—Thomas Lee
Assistant Examiner—Thuan Du
(74) Attorney, Agent, or Firm—McDermott, Will & Emery

(57) ABSTRACT

An interface unit includes a timing control circuit for extracting an effective data window by detecting a point of change in a transferred data, and determining strobe timing for taking in the data in accordance with the extracted effective window; and a strobe clock generating circuit for generating a strobe clock signal for taking in the data under control of the timing control circuit. Regardless of the system structure, accurate data transfer is achieved between any semiconductor devices in the system.

29 Claims, 38 Drawing Sheets

| | SET-UP/HOLD |
|---|---|
| QoS1 | 400ps/400ps |
| QoS2 | 600ps/600ps |
| QoS3 | 800ps/800ps |

| DEVICE (45aa) | BANK (45ab) | STROBE TIMING (45b) | EFFECTIVE DATA WINDOW (45c) |
|---|---|---|---|
| 1a | B0 | #a | EDWa (QoS3) |
| ⋮ | ⋮ | ⋮ | ⋮ |
| 1n | B0 | #b | EDWb (QoS3) |
| 1n | B1 | #c | EDWc (QoS3) |

↗ UTILIZED FOR STROBE TIMING DETECTION

| ADDRESS (INCLUDING DEVICE AND BANK) | 50 |
|---|---|
| #EADa | |
| ⋮ | |
| #EADp | |

F I G. 4 4
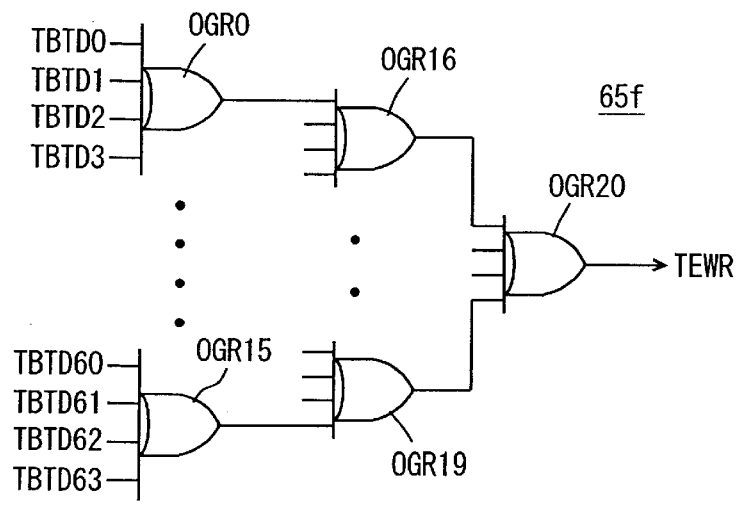
F I G. 4 5
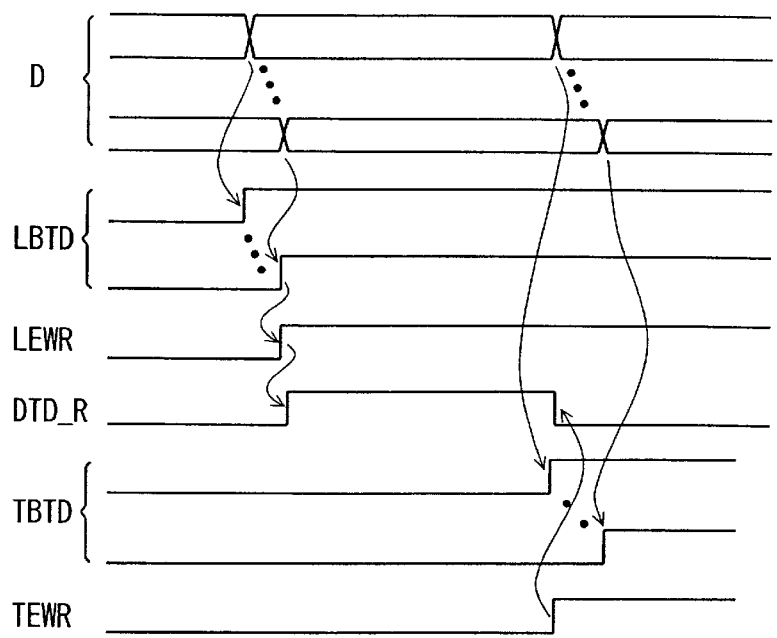

1.11 (GBIT/S)/PIN X 256 PINS = 284 GBIT/sec.

INTERFACE CIRCUIT DEVICE FOR PERFORMING DATA SAMPLING AT OPTIMUM STROBE TIMING BY USING STORED DATA WINDOW INFORMATION TO DETERMINE THE STROBE TIMING

BACKGROUND OF THE INVENTION

1. Field of the Invention

The present invention relates to an interface circuit such as a memory control device for controlling access to a memory device, and in particular to a bus interface circuit for rapidly taking in data in synchronization with a clock signal.

2. Description of the Background Art

FIG. 78 shows an example of a structure of a conventional data processing system. In FIG. 78, the conventional processing system includes a clock generator CG generating a system clock signal CLK, memory units MU0–MUn connected in parallel to a common bus CB and operating in synchronization with system clock signal CLK, a processor PC, such as a CPU (Central Processing Unit), for processing data stored in memory units MU0–MUn, and a memory controller MCR for transferring data requested of accessing by processor PC between memory units MU0–MUn and processor PC. Memory controller MCR operates in synchronization with system clock signal CLK as well.

In such processing system, for achieving fast data processing, a system clock rate has been increased, and a fast bus interface has been defined for fast data transfer via the common bus CB between memory controller MCR and memory units MU0–MUm. As typical examples of such a fast interface, there are an interface of DDR (Double Data Rate) specification that data are transferred in synchronization with both the rising and falling edges of system clock signal CLK, and an interface of Rambus specification that the clock signal and data are transferred in the same direction. By utilizing such a fast interface, the efficiency of data transfer on common bus CB is improved, and a waiting time of processor PC is reduced so that the system performance is improved.

FIG. 79 shows a relationship in timing between the data and the system clock signal in the DDR mode. In the DDR mode, the data is sampled in synchronization with the rising edge and the falling edge of clock signal CLK. Data D0 sampled at the rising edge of clock signal CLK has a set-up time, tsu, and a hold time, th, with respect to clock signal CLK. Likewise, data D1 sampled at the falling edge of clock signal CLK has set-up time, tsu, and hold time, th, with respect to the falling edge of clock signal CLK. The "sampling" means the timing at which memory controller MCR takes in the data, or the operation of taking the data into the memory unit.

Usually, data read from memory units MU0–MUn is transferred in synchronization with clock signal CLK. As clock signal CLK becomes faster and a cycle time T thereof becomes shorter, the set-up time, tsu, and hold time, th, of data D also become shorter. When clock signal CLK has a duty ratio of 50, a sum of set-up time, tsu, and hold time, th, can take the value of up to T/2. For example, if clock signal CLK has a frequency of 100 MHz, clock signal CLK has a period T of 10 ns (nano seconds) so that the set-up time, tsu, and hold time, th, can take the values of up to 5 ns. However, these specification values are of the order of pico-seconds. For ensuring such small specification values of the short set-up time and hold time, it is necessary to determine whether the specification values are accurately satisfied or not, and an expensive tester is required for such determination, resulting in increased cost of the memory unit.

According to the interface of the Rambus specification, the width and the data transfer rate of the data bus are fixedly determined. Therefore, a system designer cannot freely determine the transfer rate and the data bus width so that flexibility in design is considerably low.

Where memory controller MCR and memory units MU0–MUn as shown in FIG. 78 are assembled on-board, the impedance of common bus CB (data bus) changes in accordance with the number of on-board memory units, and may also change due to variations in arrangement of on-board wiring lines. If such changes occur in impedance of the common bus (data bus), no timing margin is present in receiving the data by memory controller MCR even if the set-up time and the hold time are set to the values within the specification values, respectively. Due to such less timing margin, it may be impossible to take in accurate data in many cases. As clock signal CLK becomes faster, an eye pattern (effective data period) of data D becomes shorter.

Therefore, as shown in FIG. 79, failures occur in the set-up margin and the hold margin for data when variations in propagation delay occur among the memory units in data transfer. For matching the impedances of the on-board wiring lines with each other, if wiring lines of equal lengths may be arranged between the memory units and the memory controller, the board must have a multi-layered structure, and the wiring must be made in a three-dimensional structure so that the circuit-board becomes expensive.

FIG. 80 schematically illustrates a timing relationship of data transfer between memory controller MCR and memory unit MU in the memory system shown in FIG. 78. In FIG. 80, each of memory controller MCR and memory unit MU includes a delayed locked loop (DLL) for generating an internal clock signal in accordance with the clock signal sent from clock generator CG. The clock signal generated by clock generator CG is transmitted as a clock signal Cy to memory controller MCR, and to memory unit MU as a clock signal Ct with a delay by a period Tskew due to a propagation delay on the clock signal line.

In memory unit MU, an output circuit outputs data Dt in accordance with the internal clock signal from DLL. Memory unit MU outputs data Dt from its output circuit with a delay of time Tt relative to the rising of the internal clock signal from DLL. Data Dt from memory unit MU reaches memory controller MCR after elapsing of a propagation delay time Tf. In memory controller MCR, a register takes in supplied data Dr in accordance with the internal clock signal generated from its internal DLL. When the register takes in data Dr that is sent from memory unit MU and arrives at memory controller MCR, the data is sampled into the register upon elapsing of set-up time Ts.

FIG. 81 is a signal waveform diagram representing operations of the system shown in FIG. 80. The clock signal generated from clock generator CG has a cycle period of Tcycle. Memory unit MU outputs effective data in accordance with clock signal Ct with a delay of time Tt. Data Dt from memory unit MU arrives at memory controller MCR via the data bus after time Tf. Data Dr arriving at memory controller MCR is sampled into the register in accordance with clock signal Cr upon elapsing of set-up time Ts.

Therefore, the propagation time Tf changes in accordance with the wiring length between memory unit MU and memory controller MCR. Propagation delay Tskew of the clock signal changes in accordance with the distance between clock generator CG and memory unit MU as well. Therefore, even with the DLL for outputting data Dt from memory unit MU in synchronization with the clock signal, set-up time Ts differs for a different length of the path from the output circuit of memory unit MU to the register of memory controller MCR. Thus, the timing margin for taking in the data becomes inadequate, and the memory system capable of accurate data transfer cannot be achieved.

In the structure with the memory modules assembled on-board, the impedance of the data bus locally changes depending on the number of the on-board memory modules. Therefore, it is extremely difficult to make a propagation delay on a signal transfer path, which extends from the clock generator through the memory module, data line and input pad to the register (receiver) of the controller, equal for all the memory modules (memory chips). Accordingly, it is difficult to achieve the on-board memory system, in which fast and accurate data transfer can be achieved under fast operation environments.

As shown in FIG. 80, memory unit MU is configured to output the data, synchronized in phase with clock signal CLK as much as possible, by using DLL for reducing the delay with respect to the supplied clock signal. However, provision of such DLL in memory unit MU increases the chip area of memory unit MU as well as power consumption, and in addition, the memory unit becomes expensive due to increase in chip area.

The following problems arise if the margin for data take-in timing at the memory controller changes in accordance with the position/number of the chips or modules in an on-board system. Specifically, if an error occurs in the data taken by the memory controller, it is difficult to determine whether the cause of this error is present in the data transfer path itself or in the memory unit (or chip). Thus, it is difficult to detect and eliminate the cause of error at the board level.

Further, in a multi-processor system in which a plurality of processors (CPUs) are connected in parallel to a data bus and access memory devices via a memory controller, such system is configured on-board. When data transfer is performed using a fast clock signal close to, e.g., 1 GHz in such on-board multi-processor system, margins of the set-up time and hold time for data sampling become extremely small and data cannot be transferred fast and accurately, resulting in a problem similar to that of the memory system already described above.

A similar problem occurs in a multiprocessor system, in which a plurality of processors are coupled in parallel to a common data bus, and access a common memory without control of a memory controller. Particularly, in the case where the system is expanded so that the number of processors increases or an impedance of the data bus increases, a skew of data with respect to a clock signal changes to impair the reliability of the system, resulting in low expandability of the system.

SUMMARY OF THE INVENTION

An object of the invention is to provide an interface circuit, which can accurately transfer data to any one of semiconductor devices in a system.

Another object of the invention is to provide an interface circuit, which can implement an on-board system allowing fast and accurate data transfer.

Still another object of the invention is to provide an interface circuit, which can ensure a sufficient set-up time and a sufficient hold time of data for each of on-board units when assembled on-board.

Yet another object of the invention is to provide an interface circuit, which can rapidly and accurately transfer data without increasing a cost of units in a system.

Further another object of the invention is to provide an interface circuit, which allows accurate identification of a cause of error even at the on-board level.

A further object of the invention is to provide an interface circuit for achieving an inexpensive system allowing fast and accurate data transfer regardless of the structure of the on-board system.

A particular object of the invention is to provide an inexpensive memory control device capable of fast and accurate data transfer.

An interface circuit according to the invention includes: production/storage circuitry for detecting a point of change in data on a data line, producing effective window information indicating an effective period of the data in accordance with a result of the detection, and storing the effective window information; strobe timing determining circuitry for determining a strobe timing for taking in data on the data line in accordance with the effective window information stored in the production/storage circuitry; and clock producing circuitry for producing a clock signal for taking in the data in accordance with the strobe timing determined by the strobe timing determining circuitry.

An interface circuit according to another aspect of the present invention includes: transition point detecting circuitry for detecting a point of transition in data on a data line; producing circuitry for producing effective window information indicating an effective period of the data in accordance with a transition point detected by the transition point detecting circuitry; determining circuitry for determining whether a width of the effective window satisfies a first condition; and storage circuitry for storing an address and a data pattern of the data when the determining circuitry determines that the first condition is satisfied.

An interface circuit according to still another aspect of the present invention includes: effective window extracting circuitry for detecting a point of change in data on a data line, and producing an effective window signal indicating an effective period of the data in accordance with a result of the detection; effective window width detecting circuitry for detecting an effective period width of the effective window signal using a reference clock signal, and storing a result of the detection; strobe timing storing circuitry for determining a strobe timing for the data on the data line from the effective window width information detected by the effective window width detecting circuitry, and storing the determined strobe timing; and strobe signal producing circuitry for producing a strobe signal for the data on the data line in accordance with the strobe timing stored in the strobe timing storing circuitry.

In the interface circuit, the effective window width of the data on the data line is detected, and the strobe timing for the data is determined in accordance with the detected effective window. Thereby, data strobe (sampling) can be performed at the optimum timing for the data on the data line. Even if a system constituent unit such as a memory device is assembled on a board and an impedance of a data transfer path changes in accordance with a system structure, the data can be accurately taken in.

When a detected effective window width does not satisfy predetermined conditions, conditions that would reduce the set-up/hold margins can be detected, so that the system can be made stable. By storing the pattern and address of the data when the margin is reduced, it can be determined whether the cause of failure is present in the data transfer device or on the data transfer path. When the cause of failure concentrates in the addresses of a specific memory chip, it can be determined that the cause of failure is present in that memory device (chip).

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 44 schematically shows a structure of a fastest change detecting circuit shown in FIG. 36;

FIG. 45 is a signal waveform diagram representing operations of the circuits shown in FIG. 36;

DESCRIPTION OF THE PREFERRED EMBODIMENTS

First Embodiment

Figure 1:
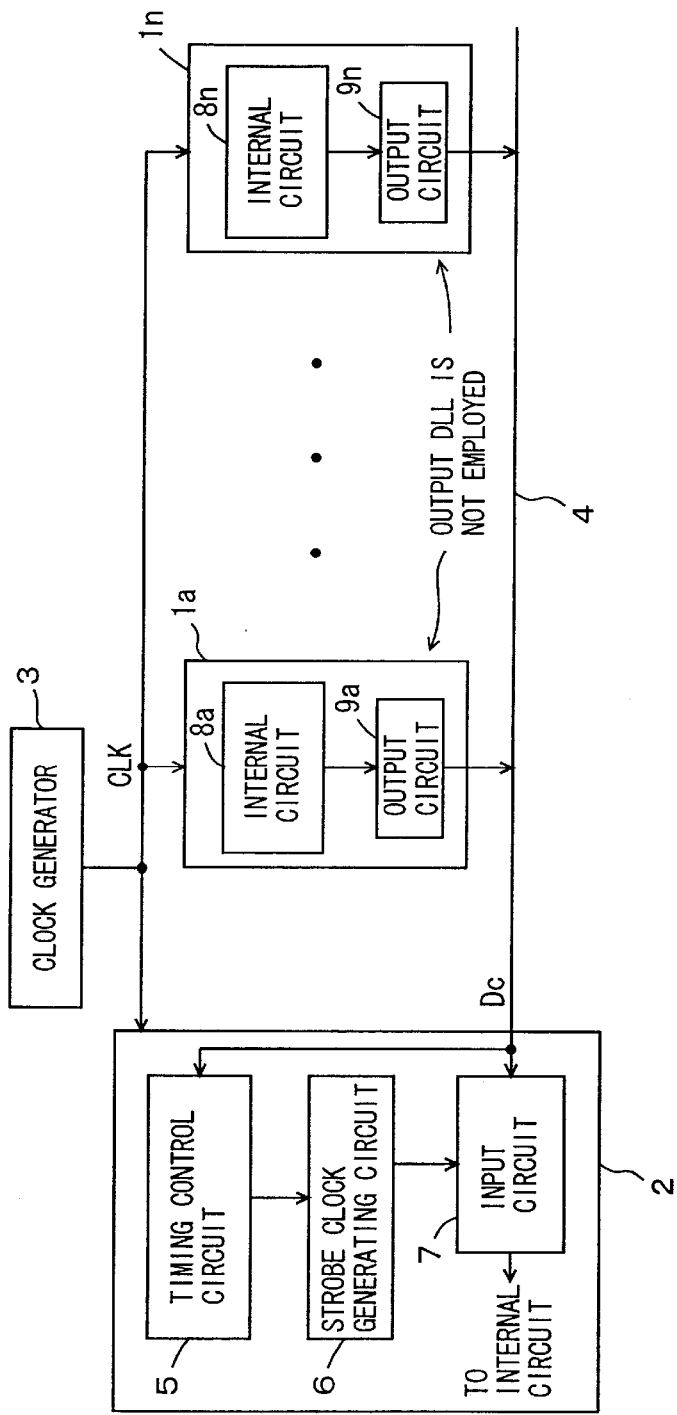
FIG. 1 schematically shows a structure of a memory system according to a first embodiment of the invention.

FIG. 1 schematically shows a structure of a memory system including a memory control device according to the present invention. In FIG. 1, the memory system includes: memory devices 1a–1n connected in parallel to a common data bus 4; a memory control unit 2 for accessing memory devices 1a–1n; and a clock generator 3 for applying a basic timing signal (a system clock referred to as a "clock signal" hereinafter) to memory devices 1a–1n and memory control unit. The memory devices 1a–1n may be chips, or may be modules.

When each of memory devices 1a–1n is formed of a single chip, memory devices 1a–1n include internal circuits 8a–8n each including a memory cell array and a memory cell select circuit, and output circuits 9a–9n outputting data onto common data line 4 in synchronization with an internal clock signal. Memory devices 1a–1n do not contain an outputting DLL. Output circuits 9a–9n output data in synchronization with clock signal CLK applied from clock generator 3. In the case where each of memory devices 1a–1n is formed of a module, the internal circuit includes a plurality of memory chips, and the output circuit is included in a bus interface circuit provided common to these memory chips.

Since a DLL for producing an output clock signal is not required in memory devices 1a–1n, the power consumption and the chip area of memory devices 1a–1n are reduced, and the cost of each of memory devices 1a–1n is reduced. Each of internal circuits 8a–8n, of which internal structures will be described later, includes a plurality of banks. The "banks" each are a memory circuit which can be driven to an active state (selected state of a memory cell) independently of other bank (s). In the case where each of memory devices 1a–1n is formed of a single chip, the memory circuit is a memory array or a memory mat. In the case where each of memory devices 1a–1n is a memory module, the memory circuit includes a predetermined number of memory chips.

Memory control unit 2 includes: a timing control circuit 5 which stores data take-in timing information for each of memory devices 1a–1n in a register circuit, and controls the data take-in timing in accordance with the stored timing information; a strobe clock generating circuit 6 which is controlled by timing control circuit 5 to generate a strobe clock signal for taking in data; and an input circuit 7 which takes in data applied on common data bus 4, and transmits the taken-in data to an internal circuit in accordance with the strobe clock signal received from strobe clock generating circuit 6.

Memory control unit 2 detects an effective window of the data for each of memory devices 1a–1n, and so generates a strobe clock signal as to optimize the set-up time and the hold time based on the detected effective window information.

Figure 2:
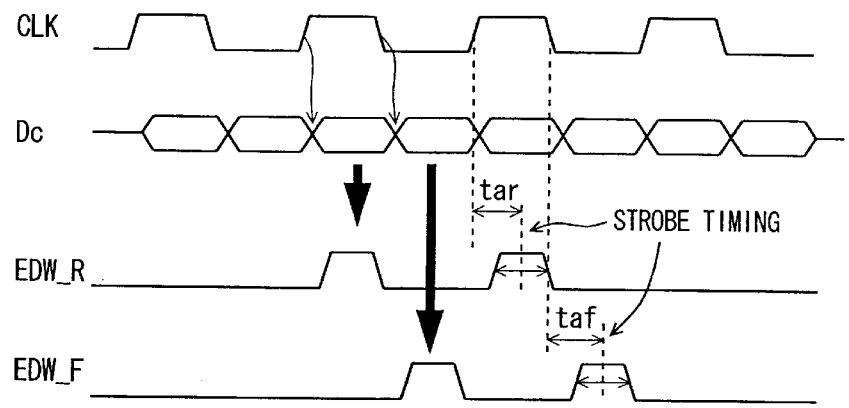
FIG. 2 illustrates an operation principle of the first embodiment of the invention.

FIG. 2 conceptually represents operations of timing control circuit 5 shown in FIG. 1. FIG. 2 shows the waveforms in the case where memory devices 1a–1n operate in a DDR (Double Data Rate) mode. However, the memory devices may operate in an SDR (Single Data Rate) mode to output data in synchronization with the rising of clock signal CLK, or may operate to output the data in an EDO (Extended Data Output) mode or a burst EDO mode. In the case of an EDO mode DRAM, the internal circuitry operates asynchronously with the clock signal. However, the control signals designating the operation mode of internal circuitry, i.e., a row address strobe signal/RAS and a column address strobe signal/CAS are applied from memory control unit 2 to memory devices 1a–1n in synchronization with clock signal CLK. Further, in memory control unit 2, the sampling of data is performed in synchronization with the clock signal, and therefore, the set-up/hold times for the clock signal must likewise be optimized. Referring to FIG. 2, conceptual description will now be given on the operations of the memory control unit according to the first embodiment of the invention.

Among memory devices 1a–1n, a memory device designated by memory control unit 2 outputs data in synchronization with clock signal CLK. This data is sent to memory control unit 2 via common data bus 4. Data Dc which arrives at memory control unit 2 has a pattern of H- and L-levels in accordance with the logic levels of the data bits, and forms a series of eye patterns which change in synchronization with the rising and falling of the clock signal. In memory control unit 2, timing control circuit 5 produces a signal EDW_R defining a window period for data Dc transmitted in synchronization with the rising of clock signal CLK, and a signal EDW_F defining an effective period of the data transmitted in synchronization with the falling of clock signal CLK. By using effective window defining signals EDW_R and EDW_F, the rising timing and falling timing of clock signal CLK are so adjusted by times Tar and Taf to optimize the set-up time and the hold time, respectively, whereby the strobing clock signals are produced.

The effective data window varies due to (1) a skew between data bits, (2) a difference in data bit transition time between H- and L-levels, (3) interference noises between data lines and (4) jitter of outputting clock signal. However, the DLL is not employed. Therefore, the influence in the above item (4) is not present, and a variation in effective window width due to jitter of the clock signal does not occur.

For easy detection of the effective window, data bits 1, 0, 1, 0 . . . are output to data pins numbered 0, 1, 2, 3, . . . , respectively. An output test pattern of memory devices 1a–1n may be set in a test mode, or such data pattern may be written in the memory devices and then may be read out. By detecting a change (transition) point of the data pattern, effective window designating signals EDW_R and EDW_F are produced, and the timing providing the optimum set-up/hold times with respect to these valid or effective windows is stored in registers. Thereafter, the strobe clock signal is produced in accordance with the strobe timing stored in the registers. Specific structures will now be described.

Figure 3:
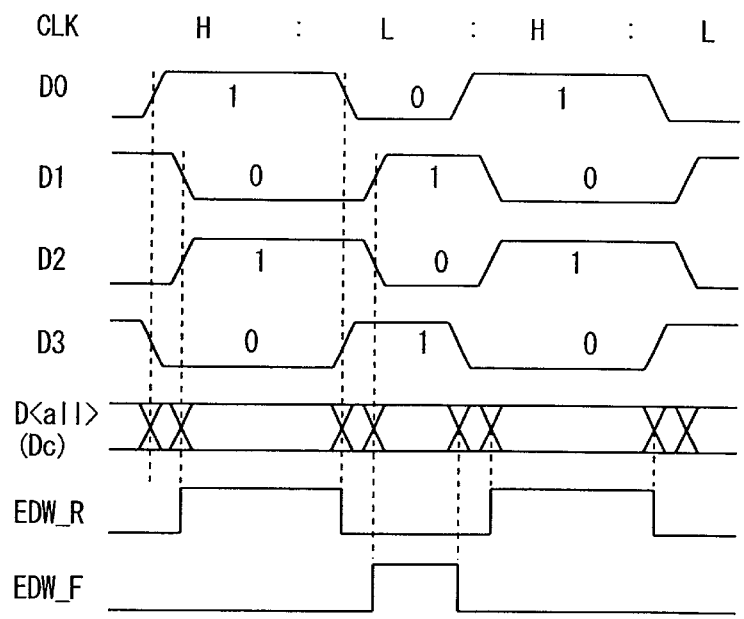
FIG. 3 is a signal waveform diagram representing an operation of detecting an effective data window in the first embodiment of the invention.

FIG. 3 conceptually represents an operation of extracting the effective data window signals. In the data pattern outputted in synchronization with clock signal CLK, data D0, D2, . . . outputted from even-numbered pin terminals are at the same logical level as clock signal CLK, and data D1, D3, . . . outputted from odd-numbered pin terminals are at the logical level opposite to that of clock signal CLK. In the DDR mode, data reading is performed with the rising edge of the clock signal being a leading edge. Therefore, the data pattern is written in the memory device in advance, and then the data pattern is sequentially read out. Alternatively, such a configuration may be employed that a register circuit or the like is provided at an output stage in the memory device and data of "0101 . . ." or "1010 . . ." are stored in the register circuit in the test mode, and the stored data are read out in place of memory cell data. In this configuration, the data stored in the register circuit are read out in response to a test mode designation signal. Further, such a configuration may be employed that a register circuit for storing data "10" or "01," for each data output terminal and the storage contents of the register circuit are alternately read out in the test mode. FIG. 3 shows data D0–D3 of 4 bits as a representative example. In the case where the data of 64 bits is transferred via common data bus 4, the effective data window signals which are detected for each four bits are successively compressed to produce an effective data window signal for the data of 64 bits.

In FIG. 3, the pattern of the data transferred when clock signal CLK rises to H-level is known in advance. After receiving this data pattern, the slowest change point among those of data bits D0–D3 is detected, and then the fastest change point among those of data bits D0–D3 is detected. In accordance with the data pattern transmitted upon rising of clock signal CLK, a time period from the slowest change point to the subsequent fastest change point is considered as the effective data window of the data signals transmitted in synchronization with the rising of clock signal CLK, and signal EDW_R is kept active for this time period.

At the time of falling of clock signal CLK, the data pattern to be transmitted is likewise known in advance. In this case, the slowest change point of the data bits and the subsequent fastest change point of data bits are likewise detected. A period between these change points is extracted as the effective data window of the data transmitted in synchronization with the falling of clock signal CLK, and effective data window signal EDW_F which is made active during this period is produced. By determining, in advance, a data bit pattern transmitted in synchronization with the rising and falling edges of clock signal CLK, it is possible to produce effective window signal EDW_R for the data transmitted in synchronization with the rising edge of clock signal CLK as well as effective window signal EDW_F for the data transmitted in synchronization with the falling of clock signal CLK.

Figure 4:
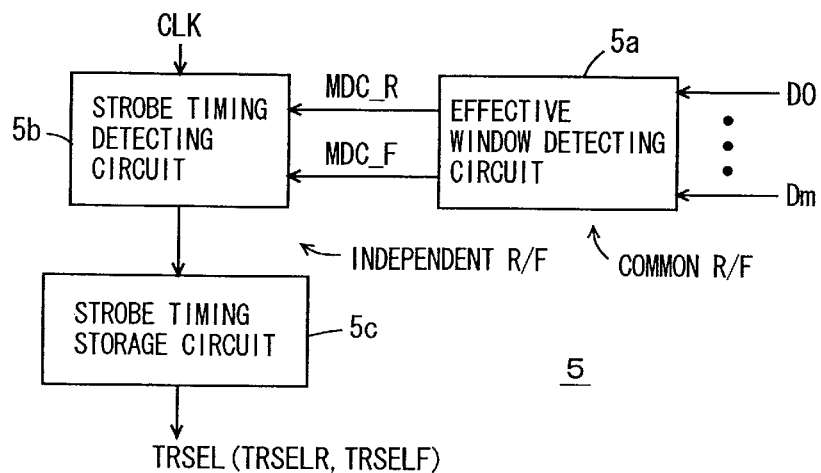
FIG. 4 schematically shows a structure of a timing control circuit shown in FIG. 1.

FIG. 4 schematically shows a structure of timing control circuit 5 included in control unit 2 shown in FIG. 1. In FIG. 4, timing control circuit 5 includes: an effective window detecting circuit 5a that receives data bits D0–Dm applied via common data bus 4, detects effective windows for both the rising and falling of clock signal CLK, and produces match detection signals (final effective data window detection signals) MDC_R and MDC_F indicating the detected effective window; a strobe timing detecting circuit 5b that, in accordance with clock signal CLK and match detection signals MDC_R and MDC_F generated from effective window detecting circuit 5a, extracts the strobe timing for data transferred in synchronization with the rising and falling edges of clock signal CLK; and a strobe timing storage circuit 5c which stores the strobe timing detected by strobe timing detecting circuit 5b, and applies a data strobe trigger signal TRSEL to strobe clock generating circuit 6 shown in FIG. 1.

Strobe timing storage circuit 5c stores the strobe timings at the rising edge and the falling edge for each of memory devices 1a–1n. If memory devices 1a–1n have a bank structure, strobe timing storage circuit 5c stores the strobe timings for each bank. Data strobe timing storage circuit 5c is formed of, e.g., a register file, of which contents can be read out and written in accordance with an address signal.

Figure 5:
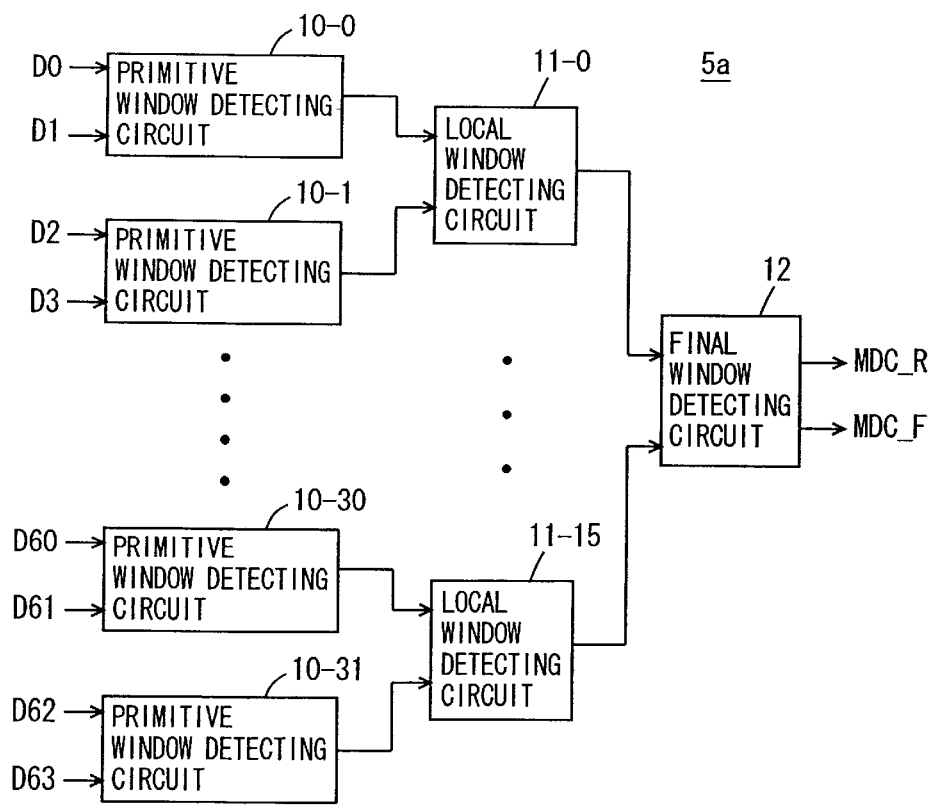
FIG. 5 schematically shows a structure of an effective window detecting circuit shown in FIG. 4.

FIG. 5 schematically shows a structure of effective window detecting circuit 5a shown in FIG. 4. FIG. 5 shows data D0–D63 of 64 bits as an example of data bits D0–Dm. In FIG. 5, effective window detecting circuit 5a includes: primitive window detecting circuits 10-0-10-31 provided for respective sets of data of 2 bits and each detecting a valid (effective) window of corresponding data bits; local window detecting circuits 11-0-11-15 each provided for a pair of adjacent two primitive window detecting circuits and detecting a period of matching of primitive windows detected by corresponding primitive window detecting circuits, for extracting a local window; and a final window detecting circuit 12 for producing final effective window detection signals (match signals) MDC_R and MDC_F for the data of 64 bits in accordance with the local window extraction signals produced from local window detecting circuits 11-0-11-15.

Primitive window detecting circuit 10-0 receives data bits D0 and D1, and primitive window detecting circuit 10-1 receives data bits D2 and D3. Primitive window detecting circuit 10-30 receives data bits D60 and D61, and primitive window detecting circuit 10-31 receives data bits D62 and D63. Each of primitive window detecting circuits 10-0-10-31 receives a data bit set of complementary data bits. Even-numbered data bits have the same logical level as the clock signal, and odd-numbered data bits have the logical level opposite to the logical level of the clock signal.

By utilizing these pairs of complementary data bits, the effective window can be detected easily as will be described later. Further, the data bits change in random directions in a normal operation. Therefore, by detecting the effective windows with the pairs of complementary data bits, a window for providing an optimum strobe timing can be detected as an average value.

Each of primitive window detecting circuits 10-0-10-31 detects both the effective window of data transferred in synchronization with the rising edge of clock signal CLK and the effective window of data transferred in synchronization with the falling edge of clock signal CLK.

Each of local window detecting circuits 11-0-11-15 detects the effective window for 4-bit data. More specifically, each of local window detecting circuits 11-0-11-15 detects the matching region of the primitive windows detected for corresponding 2-bit data, to detect an effective window for data of 4 bits. Each of them detects the effective window of the data transferred in synchronization with each of the rising and falling edges of clock signal CLK.

Final window detecting circuit 12 produces, in accordance with the local window detection signals from local window detecting circuits 11-0-11-15, final effective window detection signal (match detection signal) MDC_R for the data transferred in synchronization with the rising edge of clock signal CLK as well as final effective window detection signal (match detection signal) MDC_F for the data transferred in synchronization with the falling edge of clock signal CLK.

Figure 6:
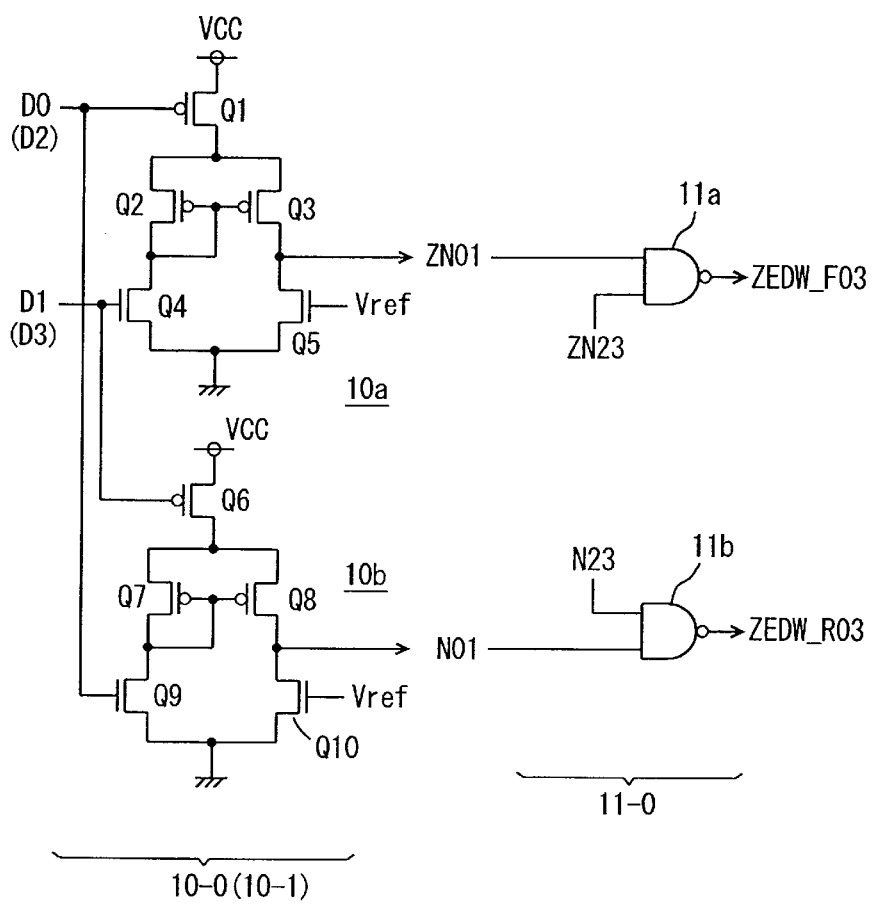
FIG. 6 shows, by way of example, a structure including a primitive window detecting circuit and a local window detecting circuit.

FIG. 6 shows, by way of example, the structures of the primitive window detecting circuit and the local window detecting circuit shown in FIG. 5. FIG. 5 shows, as a representative example, a structure of primitive window detecting circuit 10-0 and local window detecting circuit 11-0 provided for data bits D0 and D1.

In FIG. 6, primitive window detecting circuit 10-0 includes a current mirror type circuit 10a that detects an effective window of the bits of data transferred in synchronization with the falling edge of dock signal CLK, and a current mirror type circuit 10b that detects a valid (effective) window of the bits of data transferred in synchronization with the rising edge of clock signal CLK.

Current mirror circuit 10a includes: a P-channel MOS transistor (insulated gate type field effect transistor) Q1 having a source coupled to a power supply node and a gate receiving data bit D0; P-channel MOS transistors Q2 and Q3 supplied with a current from MOS transistor Q1 and forming a current mirror stage supplying the currents of the same magnitude; and N-channel MOS transistors Q4 and Q5 forming a differential stage for comparing data bit D1 with reference voltage Vref. A drain of MOS transistor Q4 is connected to a drain and a gate of P-channel MOS transistor Q2. A primitive window signal ZN01 is outputted from a connection node connecting MOS transistors Q3 and Q5. This primitive window signal ZN01 designates an effective window region of data bits D0 and D1 transferred in synchronization with the falling of clock signal CLK.

Current mirror type circuit 10b includes; a P-channel MOS transistor Q6 having a source connected to the power supply node and a gate receiving data bit D1; P-channel MOS transistors Q7 and Q8 supplied with a current from MOS transistor Q6 to operate as a current mirror stage; and N-channel MOS transistors Q9 and Q10 coupled between ground node and P-channel MOS transistors Q7 and Q8, respectively, to form a differential stage for comparing data bit D1 with reference voltage Vref MOS transistor Q9 has a drain connected to a drain and a gate of MOS transistor Q7, and receives data bit D0 on its gate. MOS transistor Q10 receives reference voltage Vref on its gate. A primitive window signal N01 is outputted from a connection node connecting MOS transistors Q8 and Q10. This primitive window signal N01 designates an effective window region of data bits transferred in synchronization with the rising edge of clock signal CLK.

Local window detecting circuit 11-0 includes an NAND circuit 11a that receives primitive window signal ZN01 from current mirror type circuit 10a and a primitive window signal ZN23 from primitive window detecting circuit 10-1 shown in FIG. 5, to produce a local window detection signal ZEDW_F03, and an NAND circuit 11b that receives primitive window signal N01 from current mirror type circuit 10b and a primitive window signal N23 from primitive window detecting circuit 10-1 shown in FIG. 5, to produce a local window detection signal ZEDW_R03.

Figure 7:
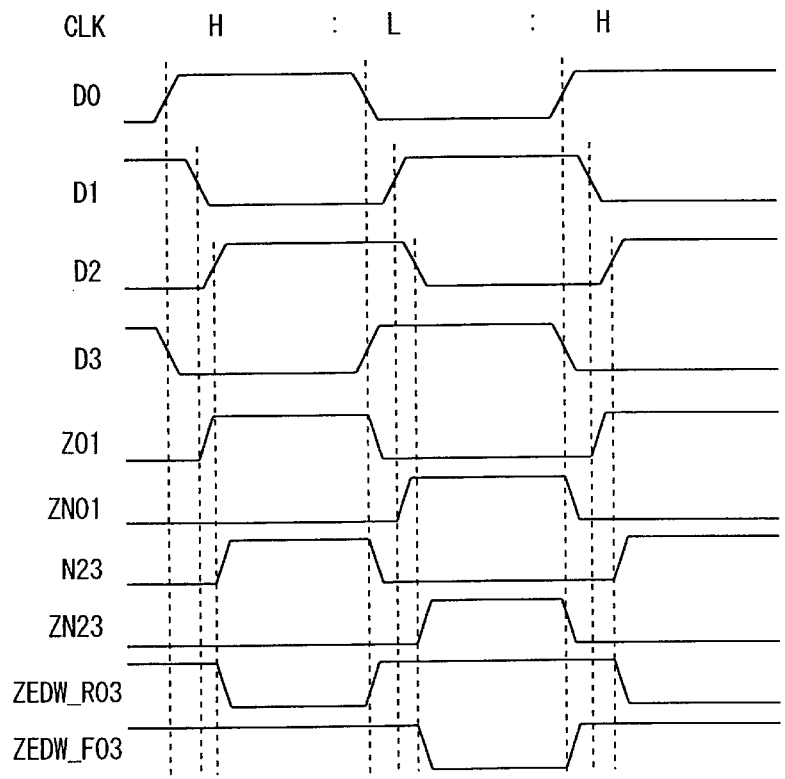
FIG. 7 is a signal waveform diagram representing operations of the circuits shown in FIG. 6.

Local window detection signal ZEDW_F03 indicates an effective window region of data bits D0–D3 transferred in synchronization with the falling edge of clock signal CLK. Local window detection signal ZEDW_R03 indicates an effective window region of data bits transferred in synchronization with the rising edge of clock signal CLK. Other primitive window detecting circuits 10-1-10-31 and other local window detecting circuits 11-1-11-15 shown in FIG. 5 have structures the same as those shown in FIG. 6 except for applied data bits and primitive window detection signals. Now, primitive window detecting circuit 10-0 and local window detecting circuit 11-0 shown in FIG. 6 will be described with reference to a signal waveform diagram of FIG. 7.

It is now assumed that data bits D0–D3 are transferred in synchronization with the rising of clock signal CLK. In the data transfer operation, data bits D0 and D2 are at the same logical level as clock signal CLK, and data bits D1 and D3 are at the logical level opposite to that of clock signal CLK. According to this data pattern, it is identified at which edge of clock signal CLK a data bit is transferred.

When data bit D0 rises, current mirror circuit 10a is deactivated, and primitive window detection signal ZN01 maintains L-level regardless of the voltage level of bit D1. While data bit D1 is at H-level, current supply transistor Q6 in current mirror type circuit 10b is off, and primitive window detection signal N01 is at L-level during that H-level period. When data bit D0 rises to H-level, and data bit D1 falls to L-level, current supply transistor Q6 in current mirror type circuit 10b is turned on, and primitive window detection signal N01 rises to H-level because data bit D0 is at a higher voltage level than reference voltage Vref.

For data bits D2 and D3, the logical levels of the primitive window detection signals are determined with data bits D2 and D3 replacing data bits D0 and D1 in the structure corresponding to primitive window detecting circuit 10-0 shown in FIG. 6. When data bit D3 attains L-level, current supply transistor Q6 in current mirror type circuit lob is turned on. When data bit D2 rises to H-level, primitive window detection signal N23 rises to H-level. Primitive window detection signal Z23 is at L-level when data bit D3 is at L-level. When data bit D2 rises to H-level, current supply transistor Q1 is turned off, and primitive window detection signal Z23 attains and keeps L-level.

In the case where the data is transferred in synchronization with the falling edge of clock signal CLK, and bit D0 falls to L-level, the output signal of current mirror type circuit 10a is at L-level. When bit D1 rises from L-level to H-level, primitive window detection signal ZN01 rises to H-level. When data bit D1 is at L-level, data bit D0 is at L-level, and primitive window detection signal N01 falls to L-level. When data bit D0 falls to L-level, and data bit D1 attains H-level, current supply transistor Q6 in current mirror type circuit 10b is turned off, and primitive window detection signal N01 maintains L-level.

Similar operations are performed on data bits D2 and D3. When data bit D3 falls to L-level, current supply transistor Q6 is turned off so that primitive window detection signal N23 falls to L-level. Even when data bit D3 rises to H-level, if data bit D2 is at H-level, current supply transistor Q1 in current mirror type circuit 10a is still off, and primitive window detection signal N23 maintains L-level. When data bit D2 falls to L-level, current supply transistor Q1 is turned on, and primitive window detection signal ZN23 rises to H-level because data bit D3 is at H-level. When data bit D2 rises to H-level, current supply transistor Q1 is turned off, and primitive window detection signal ZN23 falls to L-level. Primitive window detection signal ZN23 likewise falls to L-level owing to the differential amplification in current mirror type circuit 10a when data bit D3 attains L-level.

Local window detection signal ZEDW_R03 attains L-level when both primitive window detection signals N01 and N23 are at H-level. Local window detection signal ZEDW_F03 attains L-level when both primitive window detection signals ZN01 and ZN23 are at H-level.

The primitive window detection signal rises in response to the slowest change in data bits, and falls to L-level in response to the fastest change in data bits. Likewise, primitive window detection signals ZN01 and ZN23 rise to H-level in response to the slowest change in data bits, and becomes inactive in response to the fastest change in data bits. Therefore, by combining these primitive window detection signals by NAND circuits 11a and 11b, window detection signals ZEDW_F03 and ZEDW_R03 can be held in the active state at L-level only while all the four bits of data D0–D3 are in the definite state.

The local window detecting operation described above is executed on the remaining data bits in the circuits each processing four bits of data, and the respective local effective data windows are detected.

As described above, the complementary data bit pairs are used, and the logic levels of the data bits are determined in accordance with the trigger edges of the clock signal. Accordingly, the effective windows of the data bits transferred at both the rising and falling edges of the clock signal can be easily detected.

Figure 8:
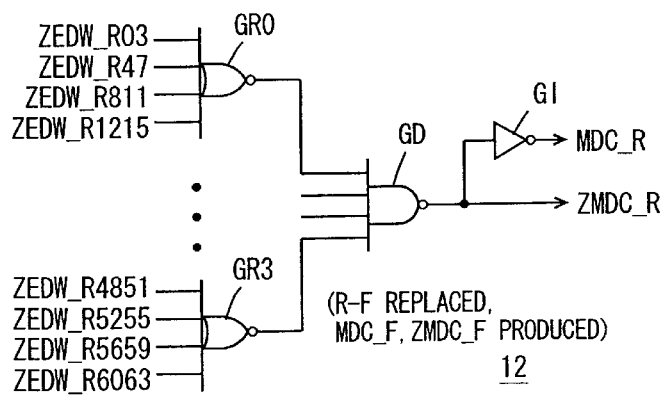
FIG. 8 shows a structure of a final window detecting circuit shown in FIG. 5.

FIG. 8 shows a structure of a portion of final window detecting circuit 12 shown in FIG. 5, for generating final effective data window detection signal (match detection signal) MDC_R. FIG. 8 shows a structure of the effective data window detecting circuit for data bits D0–D63, as an example. The data bits are 64 bits, and 16 local effective data window detection signals ZEDW_R03-ZEDW_R6063 are produced. The local valid window detection signals are grouped into sets each including four local valid window detection signals, and NOR gates GR0–GR3 are provided for the respective sets. More specifically, NOR gate GR0 receives local window detection signals ZEDW_R03-ZEDW_R1215 for data bits D0–D15. NOR gate GR3 receives local window detection signals ZEDW_R4851-ZEDW_R6063 for data bits D48–D63.

Final window detecting circuit 12 further includes four-input NAND gate GD receiving the output signals of NOR gates GR0–GR3. NAND gate GD produces final window detection signal ZMDC_R, and an inverter GI receives the output signal of NAND gate GD to produce final effective (valid) data window detection signal (match detecting signal) MDC_R.

Each of NOR gates GR0–GR3 generates a signal at H-level when all the received window detection signals attain L-level. Therefore, NOR gate GR0 generates a signal indicating the effective (valid) window region of data bits D0–D15, and NOR gate GR3 generates a signal indicating the effective (valid) window region of data bits D48–D63.

NAND gate GD generates a signal at L-level when all the received signals are at H-level. Therefore, final effective data window detection signal ZMDC_R outputted from NAND gate GD indicates the effective or valid data window region of data bits D0–D63.

By using signal ZEDW_F as the local window detection signal in the structure shown in FIG. 8, signals ZMDC_F and MDC_F indicating the final valid data window for the data, which in turn is transferred in synchronization with the falling edge of clock signal CLK, are produced. Thereby, the effective data window region of the applied data bits can be extracted. For the effective data window region thus extracted, the phase of clock signal CLK is so adjusted to produce the strobing clock signal to optimize the set-up/hold times.

Figure 9:
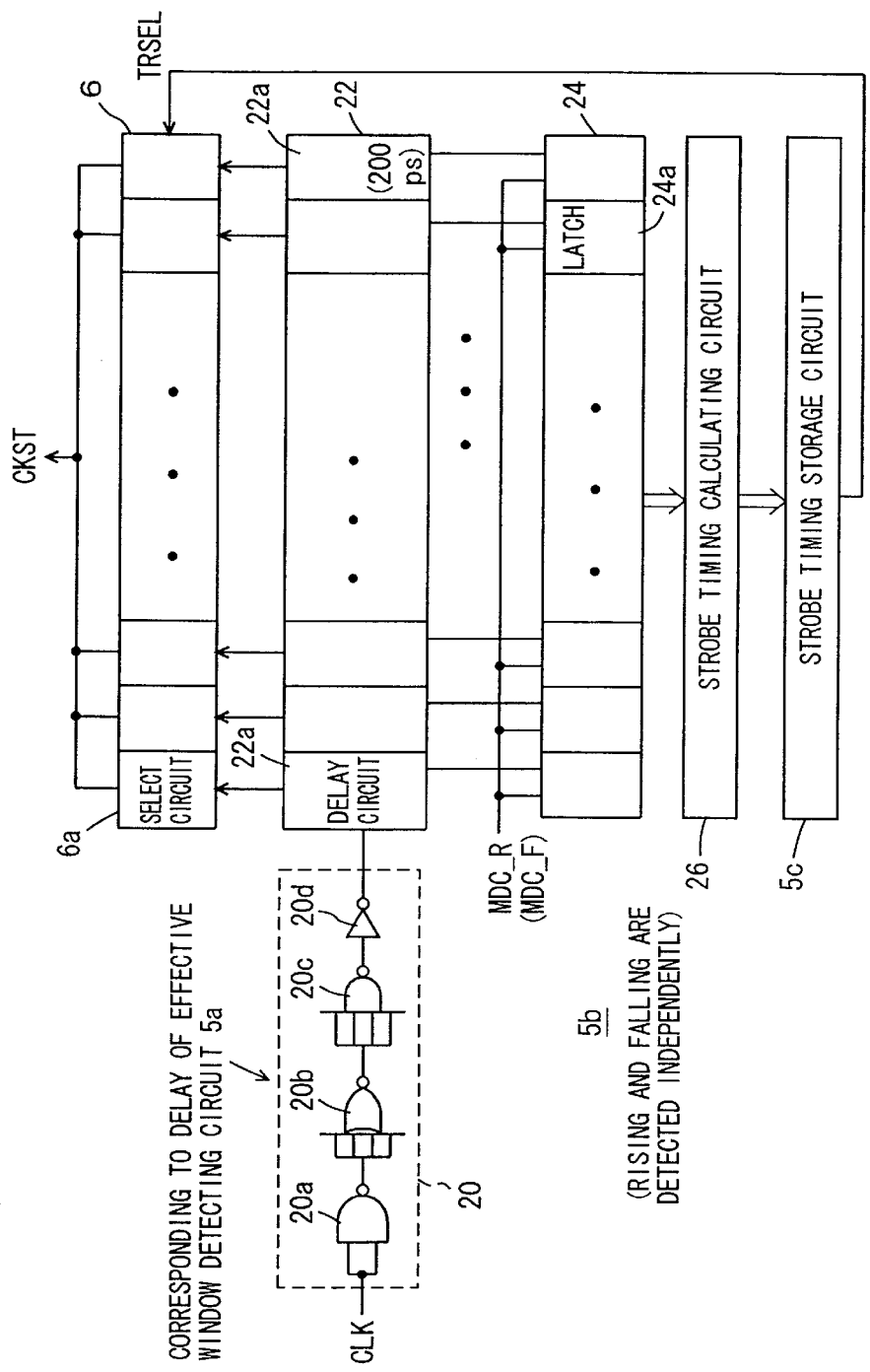
FIG. 9 schematically shows a structure of a strobe timing detecting circuit shown in FIG. 4.

FIG. 9 schematically shows a structure of strobe timing detecting circuit 5b shown in FIG. 4. In FIG. 9, strobe timing detecting circuit 5b includes: a timing adjusting circuit 20 for adjusting the timing of clock signal CLK in correspondence to the signal propagation delay at effective window detecting circuit 5a; a delay line 22 including a plurality of cascaded delay stages 22a each having a delay time of, e.g., 200 ps (pico seconds), for successively transmitting the clock signal received from timing adjusting circuit 20; a result register circuit 24 including latch circuits 24a provided corresponding to delay stages 22a on delay line 22, for comparing the phase of the final effective data window detection signal MDC_R (or MDC_F) and the phases of the output signals of corresponding delay stages 22a of delay line 22, and latching the results of the comparison; and a strobe timing calculating circuit 26 for calculating strobe timing in accordance with the signals stored in the latch circuits 24a. The strobe timing calculated by strobe timing calculating circuit 26 is stored in a strobe timing storage circuit 5c.

Strobe clock generating circuit 6 shown in FIGS. 1 and 9 includes select circuits 6a provided corresponding to respective delay stages 22a on delay line 22, and produces a strobe clock signal CKST by selecting the input clock signal of a specific delay stage 22a on delay line 22 in accordance with a data trigger select signal TRSEL produced based on the strobe timing information stored in strobe timing storage circuit 5c.

Figure 10:
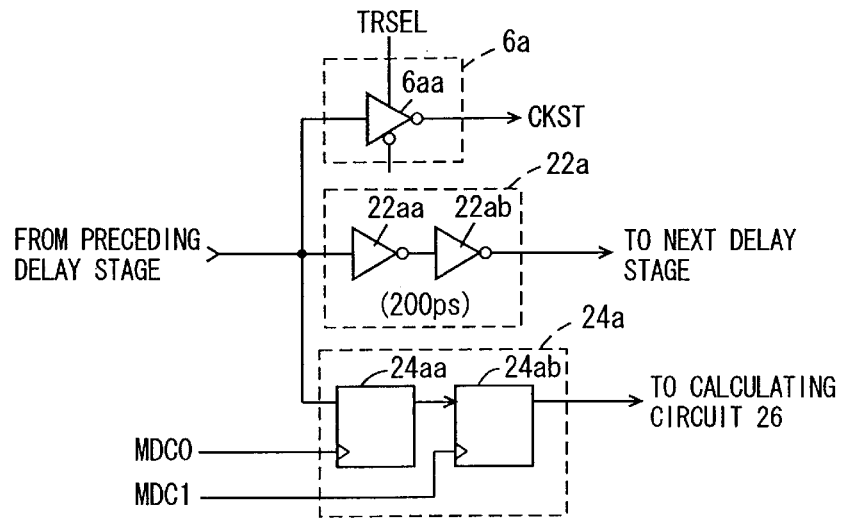
FIG. 10 shows a structure including a delay line, a clock select circuit and a first stage of a latch circuit shown in FIG. 9.

FIG. 10 shows, by way of example, structures of the delay stage on delay line 22, select circuit 6a in strobe clock generating circuit 6 and latch stage 24a of latch circuit 24. In FIG. 10, delay stage 22a includes delay inverter circuits 22aa and 22ab provided by even number of stages (two stages in FIG. 10) for delaying the clock signal received from a preceding stage. Delay stage 22a has a delay time of, e.g., 200 ps.

Latch stage 24a includes: a latch 24aa which latches an input clock signal of a corresponding delay stage 22a in response to final effective data window detection signal MDC0; and a latch 24ab which latches the latch output of latch 24aa in response to a transfer instructing signal MDC1 for application to strobe timing calculating circuit 26.

Select circuit 6a includes a tri-state inverter buffer circuit 6aa that produces strobe clock signal CKST by inverting the input clock signal of a corresponding delay stage 22a in response to data trigger select signal TRSEL from strobe timing storage circuit 5c. The reason why strobe clock signal CKST is produced by tri-state inverter buffer circuit 6aa is that the corresponding sampling circuit (input circuit) attains the latching state in synchronization with the falling of the clock signal (strobe clock signal). Select circuit 6a has the outputs wired-connected with each other.

Figure 11:
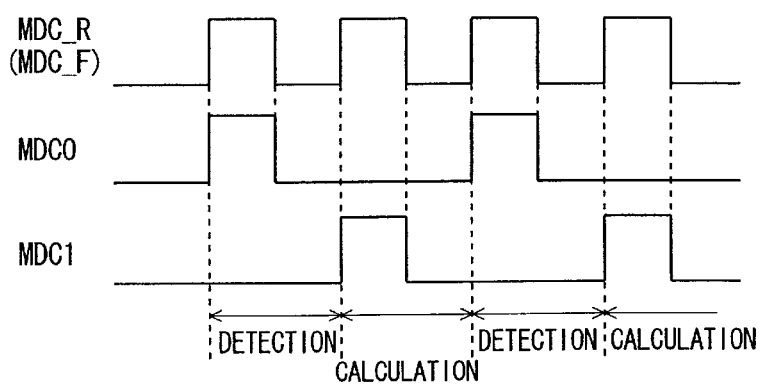
FIG. 11 is a timing chart representing operations of the circuits shown in FIG. 10.

FIG. 11 illustrates generation timing of signals MDC0 and MDC1 defining the latch timing of latch stage 24a shown in FIG. 10. As shown in FIG. 11, match detection signal MDC0 is produced in response to a first (leading) final effective data window detection signal MDC_R (or MDC_F). Transfer control signal MDC1 is produced in accordance with a second (subsequent) final effective data window detection signal MDC_R (or MDC_F). Based on match detection signal MDC0, the position of the effective data window is detected, and then the output of latch 24aa is transferred to latch 24ab in accordance with transfer control signal MDC1. Then, strobe timing calculating circuit 26 calculates the optimum strobe timing.

Figure 12A:
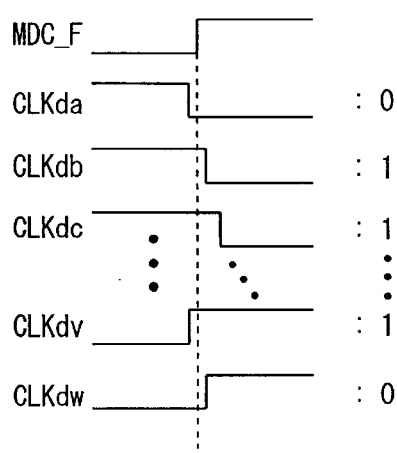
FIGS. 12A and 12B are signal waveform diagrams representing operations of a strobe timing detecting circuit shown in FIG. 9.

FIG. 12A is a waveform diagram showing a relationship in timing between final effective data window detection signal MDC_F and the delay line input clock signals. Input clock signals CLKda-CLKdw on the delay stages have phases shifted by a unit time (e.g., of 200 ps) from each other. It is now assumed that final effective data window detection signal MDC_F rises at a time between falling edges of delayed clock signals CLKda and CLKdb. In this case, latch stage 24a shown in FIG. 10 enters the latch state in synchronization with the rising of final effective data window detection signal MDC_F, and takes in and latches the corresponding delayed clock signal. Therefore, latch stage 24a corresponding to delayed clock signal CLKda latches "0". Latch stages 24a corresponding to delayed clock signals CLKdb-CLKdv latch "1" because the corresponding delayed clock signals are at H-level. The latch stage corresponding to delayed clock signal CLKdw stores "0".

Figure 12B:
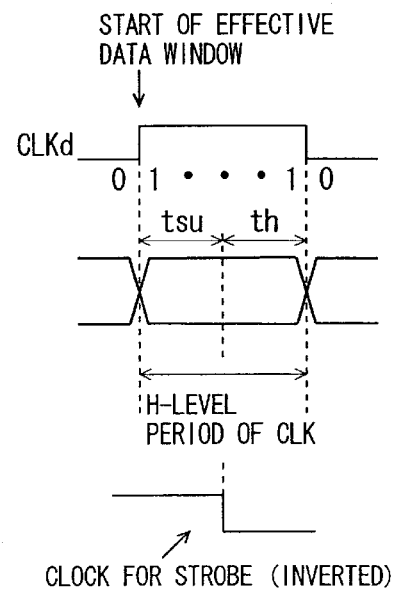

The number of the latch stages storing "1" corresponds to the period for which clock signal CLK (CLKd) is at H-level as shown in FIG. 12B. A phase shift between the effective data window start and clock signal CLK is detected, and the strobe timing is determined such that set-up time, tsu, and hold time, th, are made optimum. It is assumed that the number of latch stages storing "1" corresponds to a period for which clock signal CLK is at H-level, and also corresponds to the L-level period (assuming that the duty of clock signal CLK is 50%), and that the effective data window width is equal to the period for which the clock signal is at H-level. Based on this assumption, the strobe timing is determined such that the select circuit corresponding to the latch stage at the central position among the latch stages storing "1" is activated. The operation of determining the strobe timing will be described later.

Figure 13A:
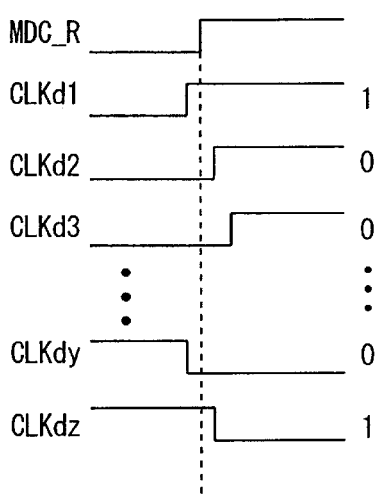
FIGS. 13A and 13B are signal waveform diagrams representing operations of the strobe timing detecting circuit shown in FIG. 9.

FIG. 13A shows a timing relationship between final effective data window detection signal MDC_R and the delayed clock signals. Delay line 22 generates delayed clock signals CLKd1-CLKd. It is now assumed that the final effective data window detection signal MDC_R rises to H-level at the time point between the rising edges of delayed clock signals CLKd1 and CLKd2. In this condition, at a more downstream delay stage on delay line 22, the rising of delayed clock signal is delayed more so that latch stage 24a provided corresponding to delayed clock signal CLKd1 stores "1", and delay stages 24a corresponding to respective delayed clock signals CLKd2-CLKdy store "0". Latch stage 24a corresponding to delayed clock signal CLKdz stores "1".

Figure 13B:
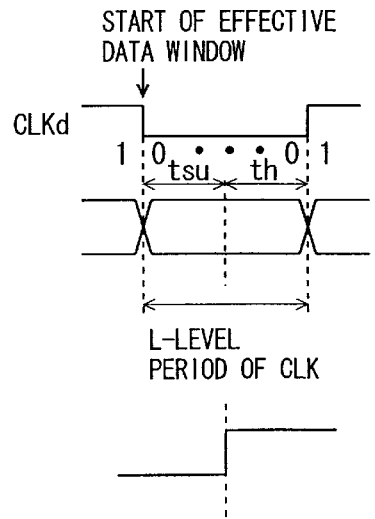

In this case, therefore, the number of latch stages storing "0" corresponds to the period for which delayed clock signal CLKd is at L-level, as shown in FIG. 13B. This period of L-level of dock signal CLK is uniquely determined in the memory system assembled on a board. In view of this period, the data strobe timing is determined so as to optimize set-up time, tsu, and hold time, th.

Figure 14:
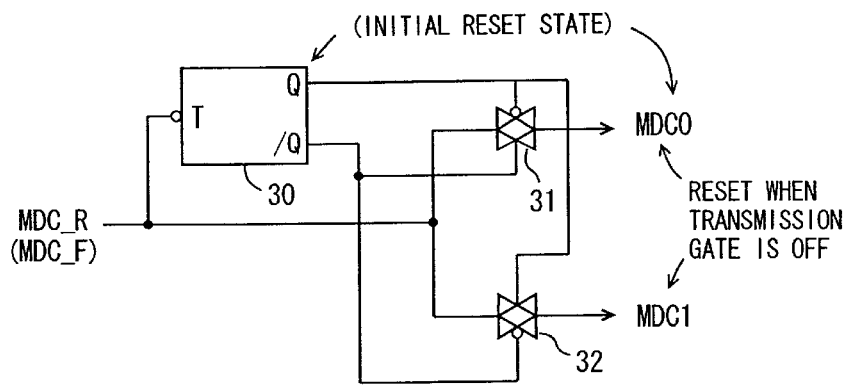
FIG. 14 schematically shows a structure of a latch timing signal generating portion shown in FIG. 10.

FIG. 14 shows, by way of example, a structure of a portion generating control signals MDC0 and MDC1 shown in FIG. 10. In FIG. 14, the match detecting signal generating portion includes: a T flip-flop 30 which changes its output state in response to the falling of final effective data window detection signal MDC_R (MDC_F); a transmission gate 31 which is turned on in accordance with complementary signals from outputs Q and /Q of T flip-flop 30, to produce match detection signal MDC0 from final effective data window detection signal MDC_R (or MDC_F); and a transmission gate 32 which is tuned on complementarily with transmission gate 31 in accordance with the complementary output signals from T flip-flop 30, to pass final effective data window detection signal MDC_R (or MDC_F) therethrough for generating transfer control signal MDC1.

Initially, T flip-flop 30 is in the reset state, and the signal outputted from its output Q is at L-level. Accordingly, match detection signal MDC0 is produced in accordance with final effective data window detection signal MDC_R (or MDC_F). When final effective data window detection signal MDC_R (or MDC_F) falls, the state of output signal of T flip-flop 30 changes, and transfer control signal MDC1 is produced in accordance with final effective data window detection signal MDC_R (or MDC_F). Thus, the phase information taken into the latch stages can be successively transferred.

Figure 15:
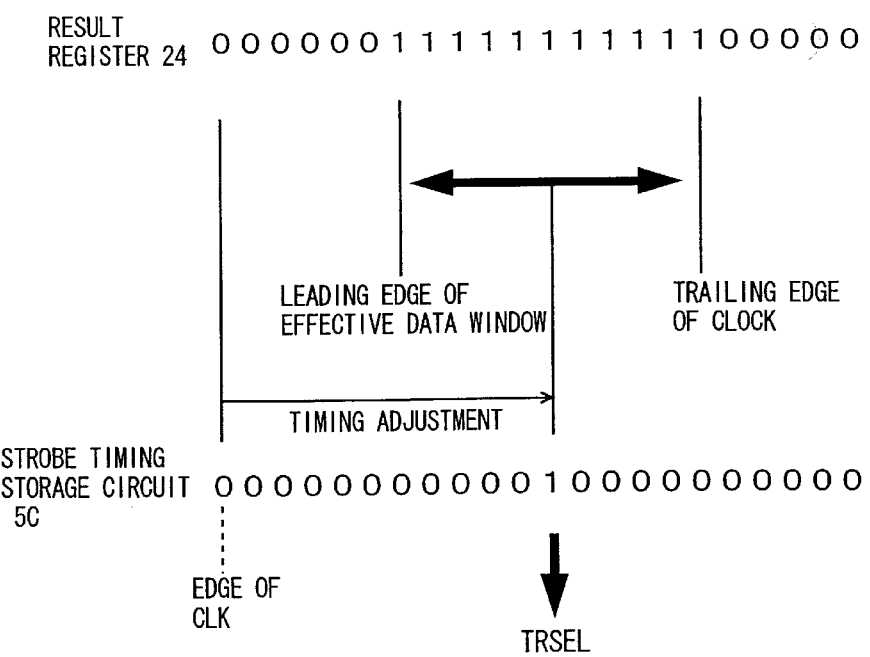
FIG. 15 shows, by way of example, contents stored in a result register and a strobe timing storing circuit.

Transmission gates 31 and 32 attain the output high-impedance state when they are off. For reliable initialization, resetting MOS transistors, rest to the ground voltage level when corresponding transmission gates 31 and 32 are off, may be provided FIG. 15 conceptually represents an operation of strobe timing calculating circuit 26 shown in FIG. 9. In FIG. 15, result register circuit 24 stores the position of the leading edge of the final effective data window detection signal relative to a corresponding edge (rising or falling edge) of clock signal CLK. More specifically, the position where a transition of data from "0" to "1" occurs in result register circuit 24 is the leading edge of the effective data window. The position where a transition of data from "1" to "0" occurs in result register circuit 24 is the position of the trailing edge of the clock signal corresponding to this effective data window.

When the effective data window is substantially equal to half the cycle of clock signal CLK (when the data transfer is performed in the DDR mode), the region where "1" successively appears corresponds to the period for which the definite data bits are transferred. The central position of the latch stages storing the value of "1" in result register circuit 24 is detected and stored in strobe timing storage circuit 5c. If the effective data region is substantially equal to half the cycle of clock signal CLK, the margins for the set-up time and hold time can be maximized by obtaining the above central region (because the set-up time is made equal to the hold time). A data trigger select signal TRSEL is generated from the register at the bit position stored in strobe timing storage circuit 5c. Corresponding select circuit 6a shown in FIG. 10 is turned on, and the delayed clock signal corresponding to the register position stored in strobe timing storage circuit 5c is selected to produce strobe clock signal CKST. Therefore, the edge of strobe clock signal CKST changes substantially at the central region of the effective data, and the corresponding effective data is sampled.

Figure 16:
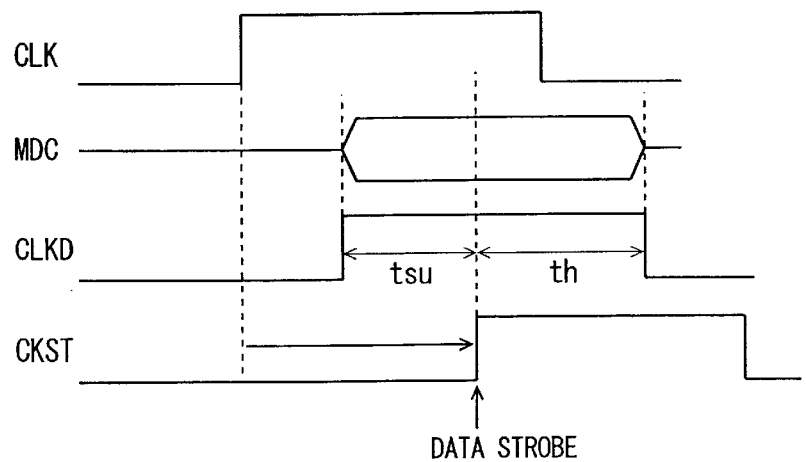
FIG. 16 shows a timing relationship between an effective data window and a strobe clock signal.

When the position of final effective data window detection signal MDC is shifted from clock signal CLK as shown in FIG. 16, a position of such a clock signal that changes at the same position as the leading edge of final effective data window detection signal MDC is detected (although an error due to a delay time, e.g., of 200 ps of the delay stage is present). The window of this clock signal is indicated by CLKD. The position of this clock signal window CLKD is stored in result register circuit 24. Data trigger select signal TRSEL is produced by calculating the strobe timing so that the edge may be present at the central position of clock signal window CLKD. Strobe clock signal CKST has an active (H-level) period substantially equal to the effective data window width, and the strobing of data can be performed substantially in the central region of the effective data, so that the margins for set-up time, tsu, and hold time, th, can be maximized.

Figure 17:
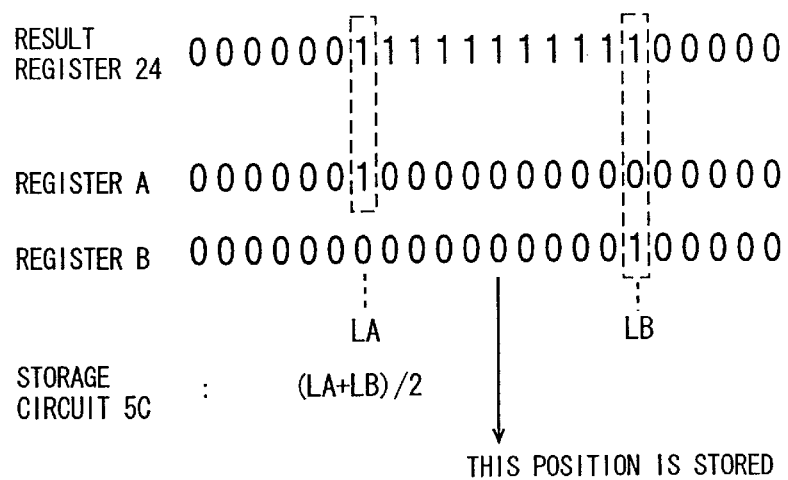
FIG. 17 represents a principle of operation of determining the strobe timing.

FIG. 17 illustrates a specific manner of calculating the strobe timing. Numbers are assigned to the respective latch stages included in result register circuit 24. It is now assumed that "1" is stored in and between latches LA and LB. In this case, register A stores the number LA of latch LA, and register B stores the number LB of last latch LB storing "1". The strobe timing is obtained form these latch numbers LA and LB by a relation of (LA+LB)/2. The register number (i.e., the select circuit) indicating the strobe timing is stored in storage circuit 5c.

In registers A and B, the leading and trailing positions of "1" may be stored utilizing hardware as described below. The output signals of the adjacent latches in result register 24 are detected, a point of change of "01" is detected, and a point of change of "10" is detected. Thus, the leading and trailing positions to be stored in registers A and B can be detected. In this case, each of registers A and B must have register circuits equal in number to the latch stages in result registers 24. Also, it is necessary to employ a gate circuit for detecting a set of "01" and a gate circuit for detecting a set of "10".

In this case, therefore, such a structure may be employed that a controller (not shown) merely obtains the numbers of the latches storing "1" in result register 24, and the detected latch numbers are stored in registers A and B for detecting the strobe timing. Strobe timing storage circuit 5c must store the strobe timing for each bank in each memory device, and a circuit controlling the storage on a bank basis may also execute the operation of calculating the values to be stored in registers A and B.

Figure 18A:
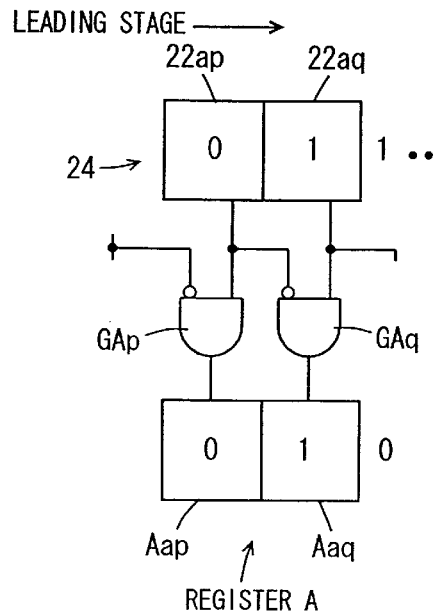
FIG. 18A shows, by way of example, a structure of a storage controller in a register A.
Figure 18B:
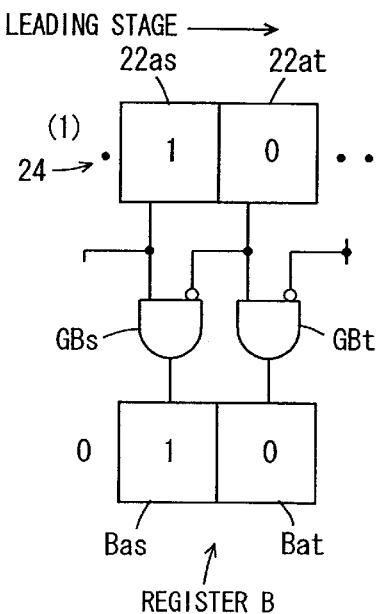
FIG. 18B shows an example of a structure of a storage controller in a register B.

FIG. 18A schematically shows a structure of a data storage control portion for register A, and FIG. 18B schematically shows a structure of a data storage control portion for register B.

In FIG. 18A, result register circuit 24 includes latch stages 22ap and 22aq. Gate circuits GAp and GAq are provided corresponding to latch stages 22ap and 22aq, respectively. The output signals of gate circuits GAp and GAq are applied to and stored in register circuits Aap and Aaq in register A, respectively. Gate circuit GAp receives the latch signal of corresponding latch stage 22ap and an inverted signal of the output signal of the latch in the preceding stage, and outputs a signal of "1" when both the received signals are "1". Gate circuit GAq receives the output signal of latch stage 22ap and the output signal of corresponding latch stage 22aq. Therefore, when latch stages 22ap and 22aq store "0" and "1", respectively, as shown in FIG. 18A, the output signal of gate circuit GAp attains L-level ("0"), and only the output signal of gate circuit GAq attains "1". Accordingly, the leading edge of the final effective data window region can be detected and stored in register A.

In FIG. 18B, gate circuits GBs and GBt are provided for latch stages 22as and 22at in result register circuit 24, respectively. Register circuits Bas and Bat are provided in register B for receiving the output signals of gate circuits GBs and GBt, respectively. Gate circuit GBt receives the output signal of corresponding latch stage 22at and an inverted signal of the output signal of the subsequent latch stage. Gate circuit GBs receives the output signal of corresponding latch stage 22as and an inverted signal of the output signal of subsequent latch stage 22at. Therefore, gate circuit GBs generates a signal of "1" when latch stages 22as and 22at store "1" and "0", respectively. Gate circuit GBt generates a signal of "0" because the output signal of latch stage 22at is "0". By utilizing the structure shown in FIG. 18B, the trailing edge of the final effective data window region can be detected and stored in register B.

A not shown control device detects the numbers of registers storing data of "1" in registers A and B. The strobe timing is determined based on the detected register numbers, and "1" is written into a corresponding register in storage circuit 5c under the control of the control circuit.

Figure 19:
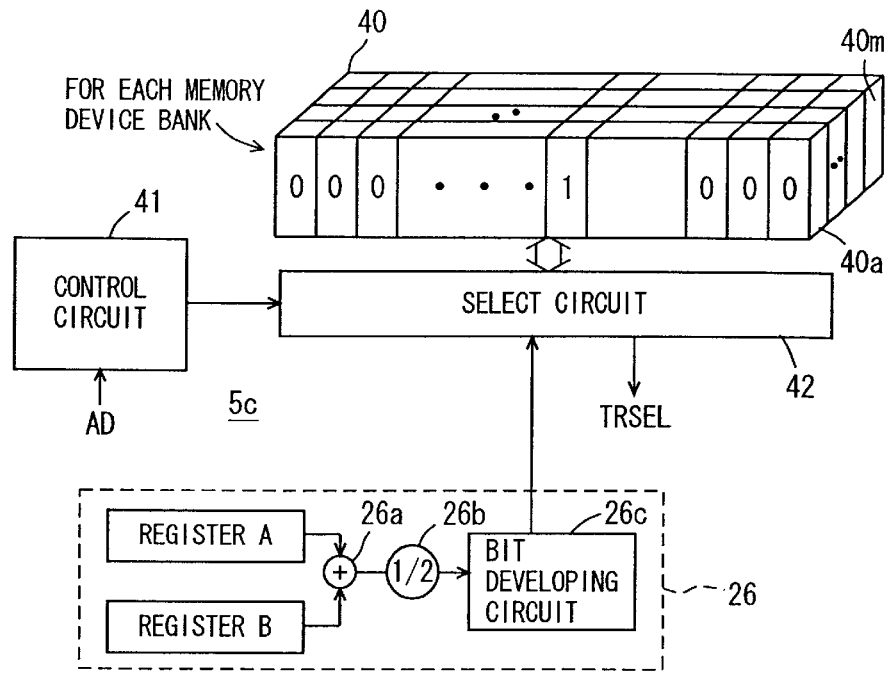
FIG. 19 schematically shows a structure of the strobe timing storing circuit shown in FIG. 9.

FIG. 19 shows, by way of example, the structures of strobe timing calculating circuit 26 and strobe timing storage circuit 5c. Referring to FIG. 19, strobe timing calculating circuit 26 includes an adder 26a for adding the leading edge latch number stored in register A and the trailing edge latch number stored in register B, a multiplier 26b for multiplying the sum obtained by adder 26a by ½, and a bit developing circuit 26c for performing bit development (expansion) of the output value of multiplier 26b in accordance with the number of delay stages on the delay line. These registers A and B store the numbers of latches corresponding to the leading edge position and the trailing edge position of the pulse width of the clock signal which in turn matches with the leading edge of the final effective data window detection signal, respectively. Adder 26a adds these latch numbers, and multiplier 26b multiplies the result by a factor of ½ so that the number of a latch stage corresponding to the clock signal having an edge at the central position is detected. Bit developing circuit 26c sets the register circuit, corresponding to the latch number applied from multiplier 26b, to 1, and also sets all the remaining register circuits to 0. Thus, it is possible to produce the select control signals for the clock select circuits provided corresponding to the respective delay stages on delay line 22.

Strobe timing storage circuit 5c includes a register circuit 40 including registers 40a–40m provided corresponding to the respective memory devices and banks, a select circuit 42 for selecting a register from register circuit 40, and a control circuit 41 for controlling the selecting operation of select circuit 42 in accordance with address signal AD. Each of registers 40a–40m includes unit registers corresponding to the respective clock select circuits included in strobe clock generating circuit 6. The bit width of each of registers 40a–40m is equal to the bit width of data outputted from bit developing circuit 26c. Select circuit 42 selects a register, and the data applied from bit developing circuit 26c is written into the selected register. Thereby, the signal indicating the delayed clock select position for a bank in a memory device is stored.

In a normal operation, control circuit 41 controls, in accordance with address AD specifying a memory device and a bank, select circuit 42 to select the corresponding register in register circuit 40. Select circuit 42 produces data trigger select signal TRSEL, in which only one bit is "1" and the other bits are "0", and applies the bits of the data trigger select signal TRSEL in parallel to select circuit 6a of strobe clock generating circuit 6 shown in FIG. 9.

Registers A and B store the numbers of latch stages corresponding to the positions of the register circuits storing "1" in registers A and B shown in FIG. 17, respectively.

Modification of Strobe Timing Storage Circuit

Figure 20:
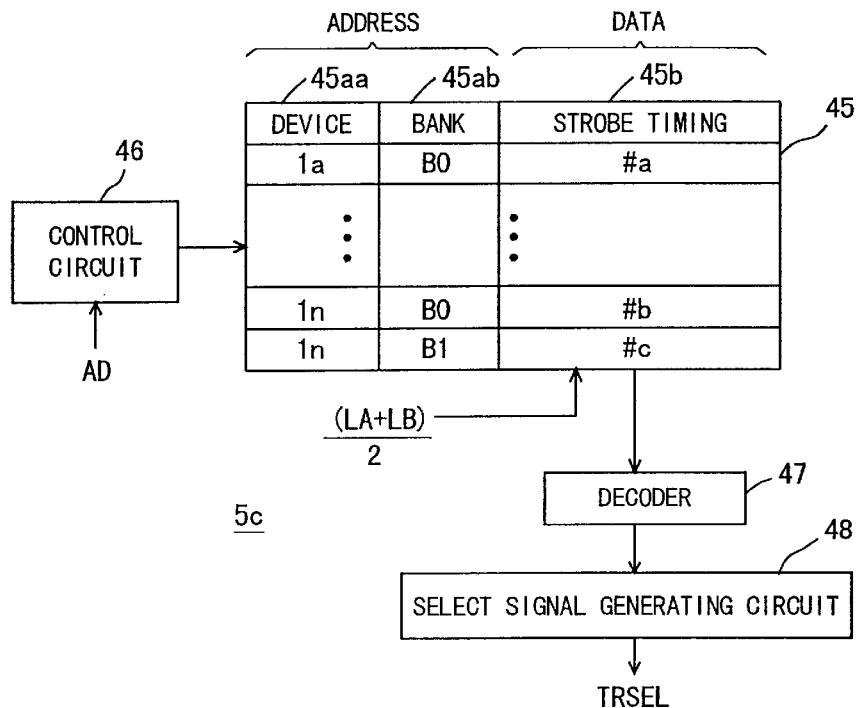
FIG. 20 shows another structure of a strobe timing storage circuit shown in FIG. 9.

FIG. 20 shows, by way of example, a modification of strobe timing storage circuit 5c. In FIG. 20, strobe timing storage circuit 5c includes a register circuit 45 for storing the strobe timing information for the memory devices and banks, a control circuit 46 for controlling write/read for register circuit 45, a decoder 47 for decoding the strobe timing information read from register circuit 45, and a select signal generating circuit 48 for generating data trigger select signal TRSEL in accordance with a decode signal from decoder 47.

Register circuit 45 stores a device name 45aa, a bank name 45ab and strobe timing information 45b in a linked fashion. With device name 45aa and bank name 45ab used as an address, a corresponding strobe timing (the position number of latch stage) may be stored. Register circuit 45 may be formed of a Content Addressable Memory (CAM) with device name 45aa and bank name 45ab used as a referring address for reading out the strobe timing information.

FIG. 20 shows, by way of example, a state where strobe timing information #a is stored for bank B0 of memory device la, and strobe timing information #b and #c are stored for banks B0 and B1 of memory device 1n, respectively. Strobe timing information 45b merely contains the position number, ((LA+LB)/2), of the latch stage. This reduces the bit width of register circuit 45. Decoder 47 decodes the strobe timing information to produce a signal specifying a plurality of clock select circuits. Select signal generating circuit 48 latches the output signal of decoder 47, and produces data trigger select signal TRSEL.

According to the structure shown in FIG. 20, register circuit 45 and decoder 47 are activated when a memory device is to be accessed. When one memory device is successively accessed, select signal generating circuit 48 automatically generates select signal TRSEL. Register 45 and decoder 47 can prepare for the next access, and can accommodate even switching between memory devices fast.

Control circuit 46 can access register circuit 45 in accordance with address signal AD specifying a device name and a bank name. When storing strobe information in register circuit 45, control circuit 46 enters the write mode, and writes the information ((LA+LB)/2) indicating the strobe timing into this register circuit in accordance with address signal AD.

Figure 21:
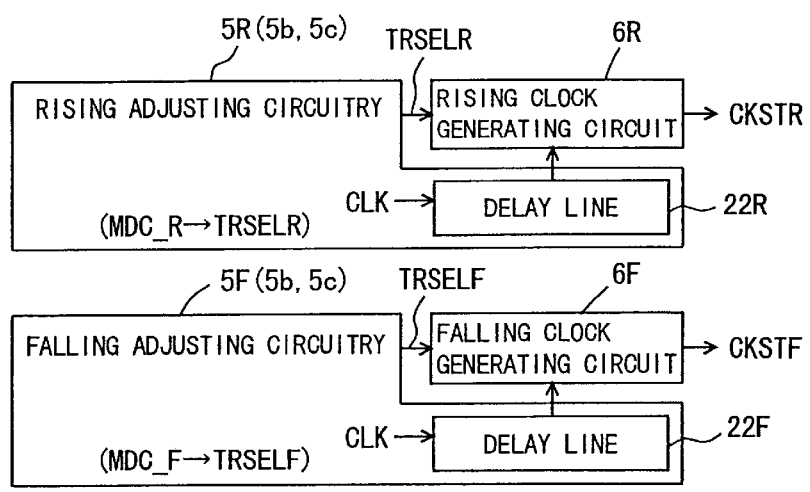
FIG. 21 shows more specifically structures of a timing control circuit and a strobe clock generating circuit shown in FIG. 1.

FIG. 21 shows a schematic structure of the clock generating portion. In FIG. 21, the clock generating portion includes a rising clock generating circuit 6R for producing a strobe clock signal CKSTR for data transferred in synchronization with the rising edge of clock signal CLK, a falling clock generating circuit 6F for producing a strobe clock signal CKSTF for data transferred in synchronization with the falling edge of clock signal CLK, rising adjusting circuitry 5R for producing data trigger select signal TRSELR for rising clock generating circuit 6R, and falling adjusting circuitry 5F for producing data trigger select signal TRSELF for falling clock generating circuit 6F.

Rising adjusting circuitry 5R includes a circuit for producing data trigger select signal TRSELR in accordance with the final effective data window detection signal shown in FIG. 9 et. seq. Therefore, rising adjusting circuitry 5R includes a delay line 22R for delaying clock signal CLK and a register circuit (not shown) for detecting the matching position in delay line 22R to store the detected position. Likewise, falling adjusting circuitry 5F includes strobe timing detecting circuit 5b and strobe timing storage circuit 5c, and further includes a delay line 22F for delaying clock signal CLK, a latch stage for detecting and storing the strobe timing in accordance with a delayed clock signal on delay line 22, and a register circuit for storing the detected latch stage position.

Rising clock generating circuit 6R selects a delayed clock signal from delay line 22R in accordance with data trigger select signal TRSELR, and produces strobe clock signal CKSTR. Falling clock generating circuit 6F selects a delayed clock signal from delay line 22F in accordance with data trigger select signal TRSELF, and produces strobe clock signal CKSTF.

Figure 22:
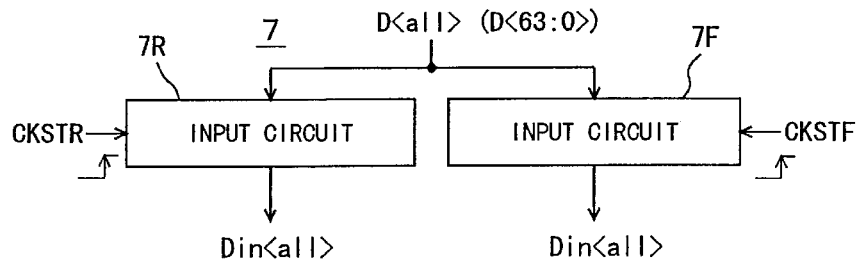
FIG. 22 schematically shows a structure of an input circuit shown in FIG. 1.

FIG. 22 shows a structure of the input circuit for taking in the data. In FIG. 22, input circuit 7 includes an input circuit 7R taking in (sampling) data bits D<all>, transmitted from a selected memory device, at the rising edge of strobe clock signal CKSTR, and an input circuit 7F taking in data bits D<all> in synchronization with the falling edge of strobe clock signal CKSTF. Input circuit 7F samples the data bits applied in synchronization with the rising edge of strobe clock signal CKSTF. In the case where data is formed of 64 bits D<63:0>, input circuits 7R and 7F produce internal data Din<all> and Din<all> each formed of 64 bits, respectively.

The internal data bits produced from input circuits 7R and 7F may be successively and internally transferred in parallel or may be successively transferred in series via a common internal data bus, depending on the internal structure of the control unit.

In input circuit 7, input circuits 7R and 7F are provided for strobe clock signals CKSTR and CKSTF, respectively. Owing to this arrangement, the data bits transferred in synchronization with the rising and falling edges of clock signal CLK can be sampled using input circuits 7R and 7F that operate slowly (i.e., at an alternate cycle of clock signal CLK).

The rising edge of each of strobe clock signals CKSTR and CKSTF determines the sampling timing (strobe timing). By determining the logic of the clock select circuit in accordance with the phase of the strobe clock signal, both input circuits 7R and 7F can perform sampling (strobing) of data in synchronization with the rising edge of the strobe clock signals as shown in FIGS. 12B and 13B. For example, in the case where the clock signal selected from the delay line falls in the central region of the effective data window region (clock cycle) as shown in FIG. 12B, the strobe clock signal may be produced using the tri-state inverter buffer circuit as shown in FIG. 10, whereby the strobe clock providing the strobe timing at the rising edge of this strobe clock signal can be produced. As shown in FIG. 13B, as for the strobe clock signal for the data transferred in synchronization with the rising edge, the select circuit is formed of a tri-state buffer because the rising edge of a corresponding clock signal selected from the delay line provides the strobe timing.

First Modification

Figure 23:
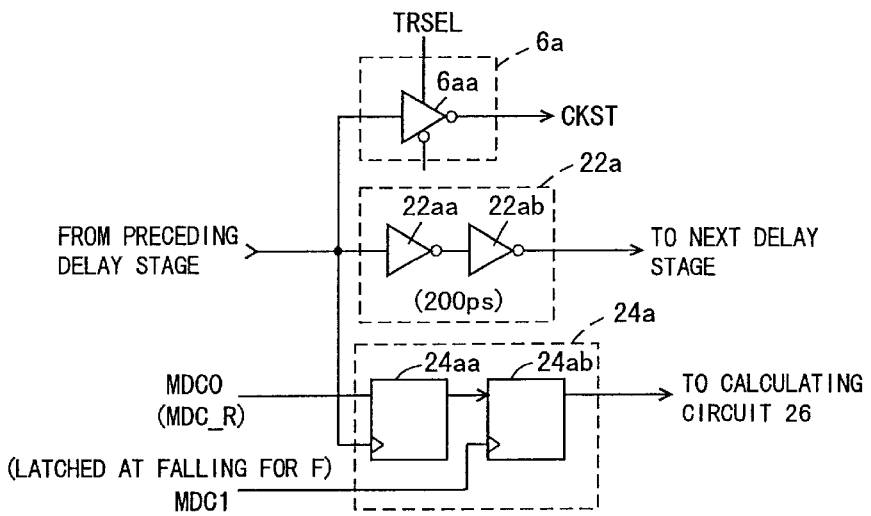
FIG. 23 schematically shows alternative structures of the delay line and the result register shown in FIG. 9.

FIG. 23 shows a structure of a first modification of the first embodiment of the invention. More specifically, FIG. 23 shows a structure of a main portion of the strobe timing detecting circuit. The structure shown in FIG. 23 differs from the structure shown in FIG. 10 in that latch 24aa in latch stage 24a latches received effective data window detection signal MDC0 (MDC_R) at the rising edge of the input clock signal of corresponding delay stage 22a. Structures other than the above are the same as those shown in FIG. 10. The structure shown in FIG. 23 detects the window for the data transferred in synchronization with the rising edge of clock signal CLK. For the data transferred in synchronization with the falling edge of clock signal CLK, latch 24aa latches final effective data window detection signal MDC_F in response to the falling of the input clock signal of a corresponding delay stage.

Figure 24A:
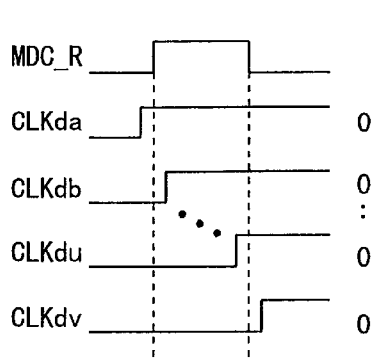
FIGS. 24A and 24B are timing charts representing operations of the circuits shown in FIG. 23.
Figure 24B:
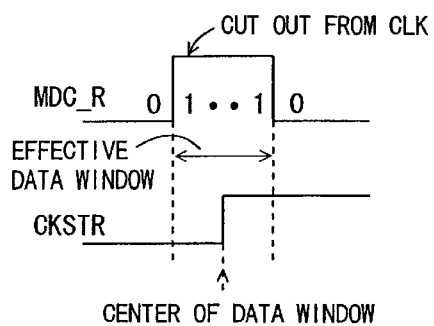

According to the structure shown in FIG. 23, final effective data window detection signal MDC_R is latched at the rising edge of a corresponding delayed clock signal CLKda. Therefore, in the case where final effective data window detection signal MDC_R rises at a time point between the rising edges of delayed clock signals CLKda and CLKdb, and final effective data window detection signal MDC_R falls at a time point between the falling edges of delayed clock signals CLKdu and CLKdv, "1" is stored in the latches corresponding to the H-level region of this effective data window detection signal MDC_R. The number of registers corresponds to the time width of the final effective data window. Therefore, as shown in FIG. 24B, the effective data window can be cut out from clock signal CLK.

Accordingly, the input clock signal of a delay stage corresponding to the latch in the central position among the latches storing "1", is selected as strobe clock signal CKSTR, whereby strobe clock signal CKSTR providing a strobe timing at the central region of the effective data window can be obtained. In this case, even if the width of effective data windows may differs for a different memory device, and may be smaller than half the cycle of clock signal CLK, it is possible to provide the strobe timing which can accurately make the set-up time and the hold time equal to each other, to maximize the margins for the set-up time and the hold time.

Figure 25A:
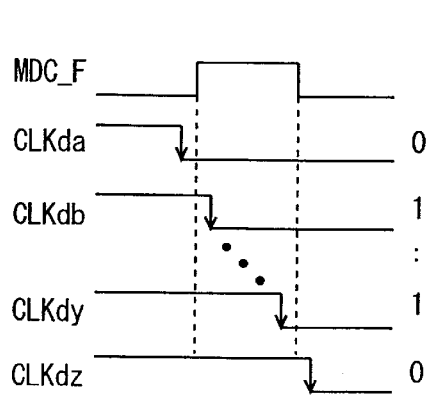
FIGS. 25A and 25B are timing charts representing operations of the circuits shown in FIG. 23.
Figure 25B:
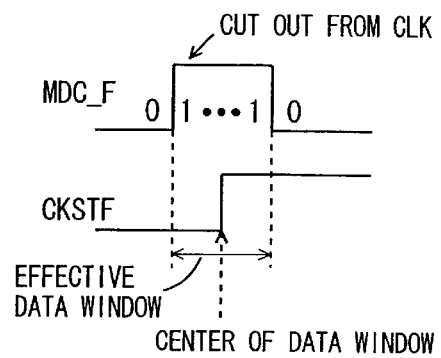

FIG. 25A represents a strobe timing detecting operation for the data transferred in synchronization with the falling edge of dock signal CLK. As shown in FIG. 25A, "1" is stored in each of latch stages corresponding to the period, for which final effective data window detection signal MDC_F is active. In this case, as shown in FIG. 25B, the latch stages between delayed clock signals CLKdb and CLKdy store "1", and the other latch stages store "0". Accordingly, even for the data transferred in synchronization with the falling of clock signal CLK, it is possible to produce strobe clock signal CKSTF providing the strobe timing at the central position of the effective data window width.

The delay time in delay line 22 may be equal to one cycle period of clock signal CLK. This can prevent such a situation that the match detecting operations are simultaneously performed in a plurality of portions.

In the first modification, structures other than the above can be the same as the structures of the strobe timing detecting circuit and strobe timing storage circuit already described with reference to FIGS. 19 and 20. It is possible to set the strobe timing according to the effective data window width.

Second Modification

Figure 26:
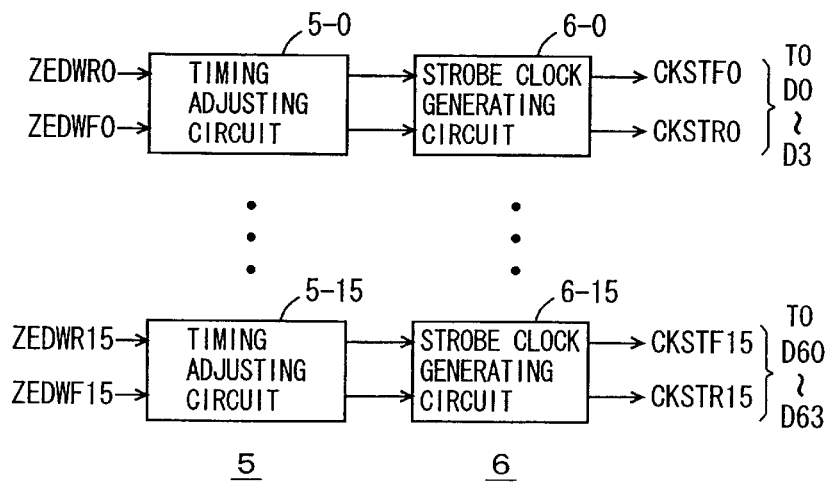
FIG. 26 schematically shows a structure of a modification of the first embodiment of the invention.

FIG. 26 schematically shows a structure of a second modification of the first embodiment of the invention. FIG. 26 shows, by way of example, a structure for the data of 64 bits D0–D63. The strobe timing is adjusted for each data of 4 bits. For this, timing control circuit 5 includes timing adjusting circuits each provided for data of 4 bits. Timing adjusting circuit 5-0 adjusts the strobe timing for data bits D0–D3 in accordance with local effective data window detection signals ZEDWR0 and ZEDWF0. Timing adjusting circuit 5-15 adjusts the strobe timing for data bits D60–D63 in accordance with local effective data window detection signals ZEDWR15 and ZEDWF15. In general, timing adjusting circuit 5-$i$ adjusts the strobe timing for data bits D($4i$)-D($4i+3$) in accordance with local effective data windows ZEDWRi and ZEDWFi.

Strobe clock generating circuits 6-0-6-15 generating the strobe clock signals are provided for timing adjusting circuits 5-0-5-15, respectively. Strobe clock generating circuit 6-0 produces strobe clock signals CKSTF0 and CKSTR0 for data bits D0–D3, and strobe clock generating circuit 6-15 generates strobe clock signals CKSTF15 and CKSTR15 for data bits D60–D63. As for the structure of timing adjusting circuits 5-0-5-15 as well as strobe clock generating circuits 6-0-6-15, local window detection signal ZEDW has only to be used in the foregoing structures instead of final effective data window detection signals MDC_R and MDC_F.

As shown in FIG. 26, adjustment of the strobe timing is performed for each data unit formed of four bits, whereby the data can be taken in more accurately.

Adjustment of the strobe timing for the data bits may be performed on a byte by byte basis, or may be performed on a basis of an even number of bytes. The multi-bit data may be divided into a plurality of sets of bits each having a common power supply pin provided therefor, and the strobe timing may be adjusted for each set.

According to the first embodiment of the invention, as described above, an effective data window is detected, and the timing of the strobe clock signal is adjusted in accordance with the effective data window, so that the data can be accurately taken in even when a signal propagation delay occurs in an on-board assembly. The memory device is not provided with a DLL, and a circuit for adjusting the data strobe timing is merely provided in a memory control unit. Therefore, the cost and current consumption of the memory device can be reduced.

Second Embodiment

Figure 27:
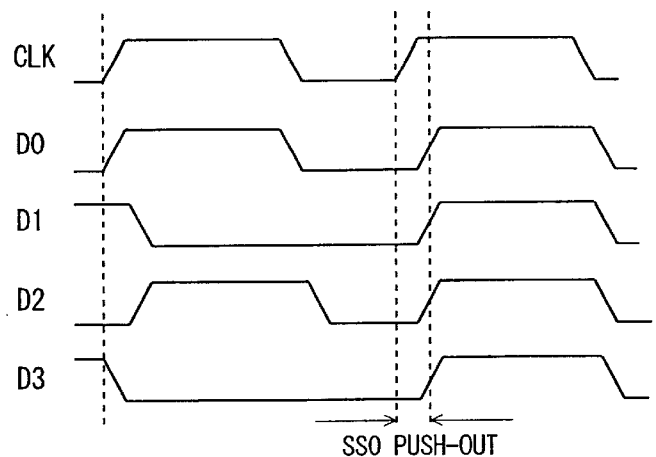
FIG. 27 represents an SSO push-out operation in a second embodiment of the invention.

FIG. 27 shows another example of the transfer data waveforms. In FIG. 27, all data bits D0–D3 rise from L-level to H-level in synchronization with the rising of clock signal CLK in SSO (Simultaneous Switching Output). In this SSO, rising of the data bits becomes slow. If the power supply of the memory device (i.e., power supply for driving an output circuit) does not have a sufficient current supply capability, the power supply voltage lowers when an output buffer for outputting the data bits operates. Therefore, fast rising of the data bits may become impossible. When all the data bits change from L-level to H-level, therefore, the point of change (transition) of the effective data window becomes retarded, and the window width becomes narrow (the effective data window is detected at the point of change of a complementary data pair).

Figure 28:
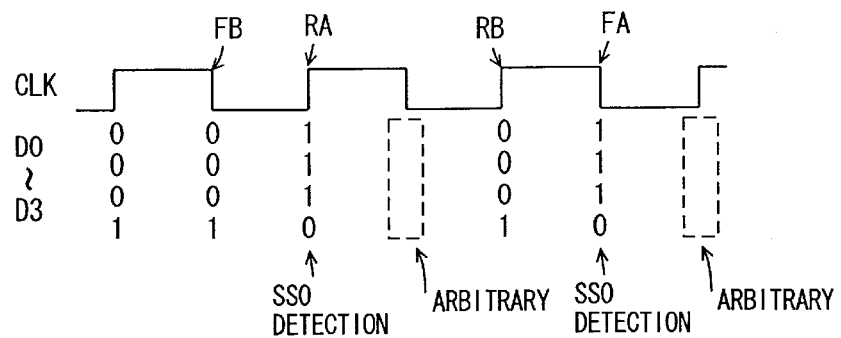
FIG. 28 represents an operation principle of the second embodiment of the invention.

FIG. 28 shows a data bit pattern which is applied when the SSO push-out is detected. FIG. 28 shows, by way of example, data of 4 bits. In the case where the SSO push-out is to be detected, data bits D0–D3 are set to "0001" at a falling edge FB of clock signal CLK preceding a rising edge RA of clock signal CLK. Then, data bits D0–D3 are set to "1110" at rising edge RA of clock signal CLK. The data bit pattern at the next falling edge of the clock signal is not restricted. This is because the trailing edge of the effective window is not required for detecting the SSO push-out, although the leading edge of the effective window must be detected.

Subsequently, data bits D0–D3 are set to "0001" at a rising edge RB of clock signal CLK, and then data bits D0–D3 are set to "1110" at a next falling edge FA of clock signal CLK. The data bit pattern at the next rising edge of clock signal CLK is not restricted. At rising edge RA and falling edge FA, the change positions of data bits are detected, and the SSO push-out is detected. In the case of 4-bit data as described above, only one bit is changed from H-level ("1") to L-level ("0"), and the remaining three bits are changed from L-level ("0") to H-level ("1"). This is done to cause the one data bit to change to L-level fastest to reliably detect the delay in rising.

Figure 29:
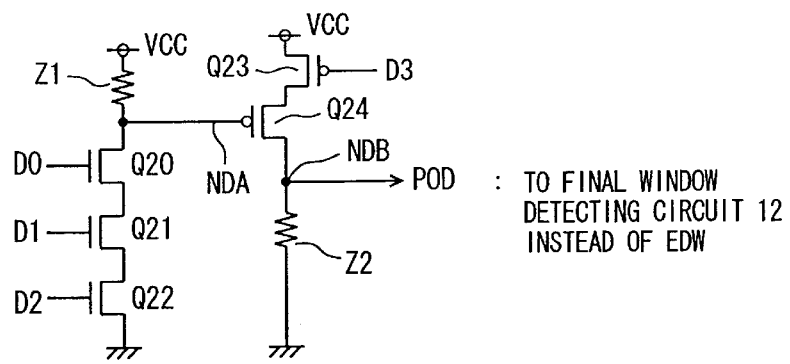
FIG. 29 shows, by way of example, a structure of a transition point detecting circuit in the second embodiment of the invention.

FIG. 29 shows, by way of example, a structure of the SSO push-out detecting portion for 4-bit data, and shows the structure for the case where data bit D3 changes from "1" to "0", and remaining data bits D0–D2 change from "0" to "1".

In FIG. 29, the push-out detecting portion includes: a pull-up resistance Z1 of a high resistance connected between the power supply node and a node NDA; N-channel MOS transistors Q20, Q21 and Q22 connected in series between node NDA and the ground node, and receiving data bits D0, D1 and D2 on their gates, respectively; P-channel MOS transistors Q23 and Q24 connected in series between the power supply node and a node NDB; and a pull-down resistance Z2 of a high resistance connected between node NDB and the ground node. MOS transistor Q23 receives data bit D3 on its gate, and MOS transistor Q24 has a gate connected to node NDA. A change detection signal POD at the time of push-out is generated from node NDB and applied to latch circuit 24 shown in FIG. 9.

Figure 30:
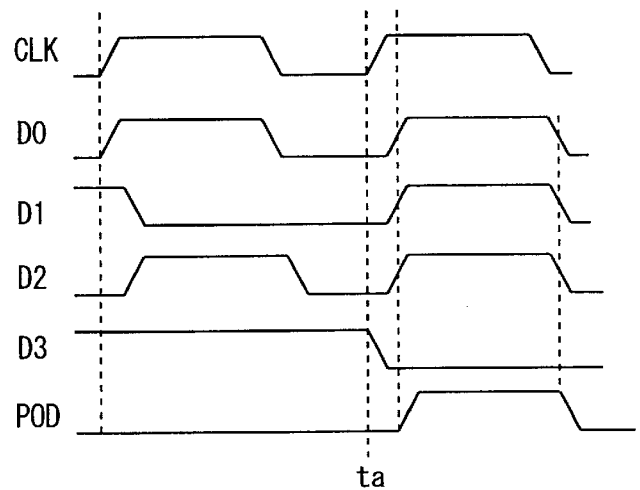
FIG. 30 is a signal waveform diagram representing operations of the circuits shown in FIG. 29.

FIG. 30 is a signal waveform diagram representing an operation of the SSO push-out detecting portion shown in FIG. 29. Referring to FIGS. 29 and 30, description will now be given on the SSO push-out detecting operation.

Before the rising edge of clock signal CLK at time ta, data bits D0–D2 are set to L-level, and data bit D3 is set to H-level. Then, data including data bits D0–D2 at H-level and data bit D3 at L-level is read from the memory device at the rising of clock signal CLK. In the SSO push-out operation, rising to H-level is slowed down so that data bits D0–D2 reach H-level after data bit D3 reaches L-level. At time ta, data bits D0–D2 in the SSO push-out detecting portion are at L-level, and all MOS transistors Q20–Q22 are off. Node NDA is already precharged to H-level by pull-up resistance Z1. Data bit D3 is at H-level, MOS transistor Q23 is off and MOS transistor Q24 is also off so that node NDB is maintained at the ground voltage level by pull-down resistance Z2.

When the transferred data bits change in synchronization with the rising of clock signal CLK at time ta, MOS transistor Q23 is first turned on, and then MOS transistors Q20–Q22 are turned on in accordance with data bits D0–D2, and responsively node NDA is discharged to the ground voltage level. When the potential on node NDA lowers to L-level, MOS transistor Q24 is turned on, and node NDB is charged via MOS transistors Q23 and Q24 so that push-out detection signal POD rises from L-level to H-level. Push-out detection signal POD falls to L-level when data bits D0–D3 change into a pattern other than "1110" in response to the falling of clock signal CLK.

Push-out detection signal POD is applied to latch circuit 24 shown in FIG. 9 for detecting a timing relationship between the leading edge of push-out detection signal POD and the rising or falling of clock signal CLK.

Figure 31:
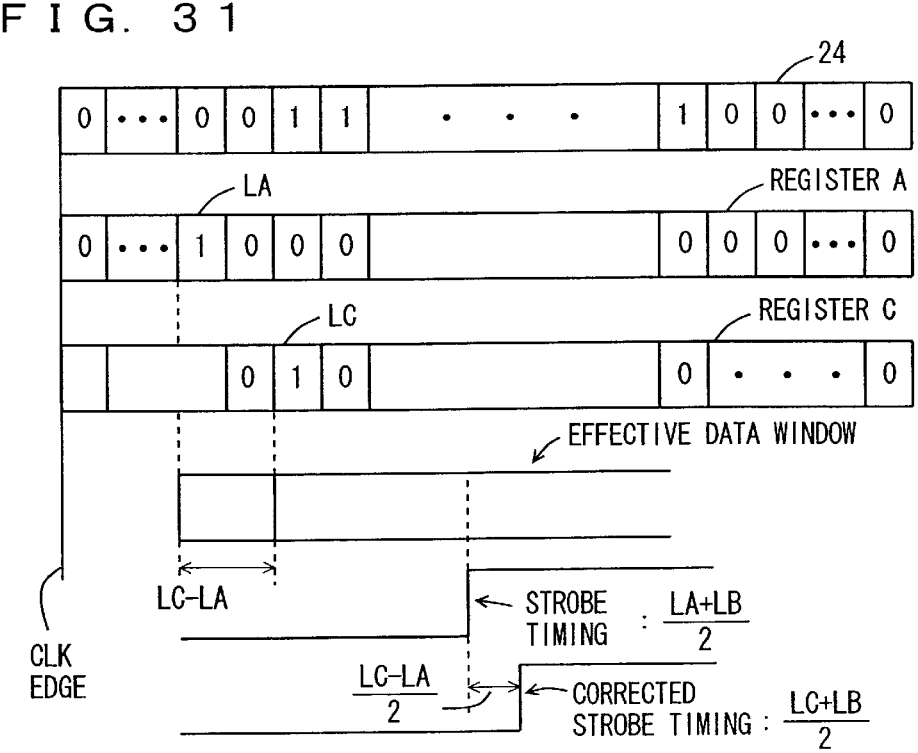
FIG. 31 schematically shows a structure of a strobe timing calculating circuit in the second embodiment of the invention.

FIG. 31 schematically represents an operation of correcting the effective data window. The latch stage in latch circuit 24 latches "1" or "0" depending on the timing relationship between the push-out detection signal POD and clock signal CLK. Register A stores "1" in latch stage LA in accordance with effective data window detection signal MDC (MDC_R or MDC_F), whereby the leading position of the effective data window is indicated. Register C stores "1" in latch stage LC corresponding to the leading edge of push-out detection signal POD. The other registers store "0". Correction of the effective data window and correction of strobe timing are performed based on the numbers of latches LA and LC storing "1" in registers A and C. The effective data window is corrected by shifting the position of its leading edge backward by (LC-LA). The strobe timing based on the effective data window detection signal is expressed by (LA+LB)/2. Therefore, the corrected strobe timing is expressed by (LC+LB)/2. The position of the trailing edge of the effective data window is not corrected because a speed-down occurs in the changing speed of the leading edge according to this push-out.

The SSO push-out detecting information may be stored for each memory device, and it may be determined whether a memory device satisfies a predetermined push-out condition or not. This can ensure the reliability of the memory system.

The SSO push-out is detected for each four bits. The detection signals are applied to final window detecting circuit 12. In a memory device operating in the above manner, the SSO push-out may be detected for each set of output circuits supplied with a power supply voltage from a common power supply line. Alternatively, the SSO push-out may be detected simultaneously for all the bits. In the case of, e.g., 64 bits, 63 bits are driven from "0" to "1", and the remaining 1 bit is driven from "1" to "0".

As described above, according to the second embodiment, the SSO push-out is detected to adjust the data strobing timing so that the reliability of the memory system is ensured (If the time of push-out is long, the data cannot be transferred in synchronization with a fast clock.) Further, the optimum strobe timing can be set for each memory device.

Third Embodiment

Figures 32, 33, 34:
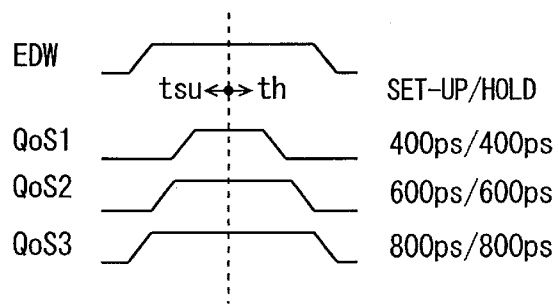
FIG. 32 shows signal qualities in a third embodiment of the invention.
FIG. 33 schematically shows a structure of the strobe timing storage circuit in the third embodiment of the invention.
FIG. 34 schematically shows a structure of an error register in the third embodiment of the invention.

FIG. 32 shows classification of effective data windows according to a third embodiment of the invention. In this third embodiment, the effective data window information is classified into three levels QoS1, QoS2 and QoS3. At level QoS1, both the set-up time and hold time are 400 ps. At level QoS2, both the set-up time and hold time are 600 ps. At level QoS3, both the set-up time and hold time are 800 ps.

By utilizing the structure shown in FIG. 23, the region of an effective data window can be cut out. With the structure shown in FIG. 23, the effective data window has a width equal to a distance between latch stages LB and LA in the latch circuit. For example, if the delay stage has a delay time of 200 ps, the effective data window has a width of 200·(LB-LA+1). The effective data window information corresponding to initialized level QoS3 is stored in the register circuit together with the strobe timing information linked thereto. In the start-up of the system, the effective data window of a system memory device is detected in an initial diagnosis mode. Depending on the system operation conditions, deterioration of the memory device or the like, the rising and falling of the data bit may become slow, in which case the width of the effective data window is reduced. When the width of effective data window decreases to level QoS2, the address is stored in an error register. When it attains level QoS1, it is determined that accurate sampling of data is impossible, and the memory control unit informs the system (CPU) of this failure to trigger a system reset. This prevents destruction of program data in the memory system such as a main memory storing the program data.

FIG. 33 shows a structure of a strobe timing storage circuit 45. Strobe timing storage circuit 45 includes a region 45aa for storing an address of a memory device, a region 45ab for storing a bank name (address) and a region 45b for storing a strobe timing. Effective data window EDW information at level QoS3 is stored being linked to the device name, bank name and strobe timing information. The effective data window is detected in the initial diagnosis mode in the system start-up operation. The value at level QoS3 is initialized to a fixed value. In each address (bank) of memory devices, a predetermined data pattern (the effective window detecting circuit detects an effective window width by using complementary bit pairs) is written and then is read out, and then the width of the effective data window for each address is detected utilizing the structure shown in FIG. 23. The width of each effective data window is compared with the width of the effective data window at level QoS3 or QoS2 which is initially set, and an error register 50 shown in FIG. 34 is accessed in accordance with the result of comparison. In the case of level QoS2 at which the effective data window is smaller than the width defined by level QoS3, address information #EAD including the address specifying the device and bank is stored in error register 50. When check of all the devices is completed, if a faulty, i.e., an effective data window at level QoS2 is found, the corresponding memory device is taken out from the board, and is solely tested. Then, the faulty address is accessed at a single chip level, and data writing/reading are performed. If this memory device operates accurately, it is determined that the cause of faulty is present in the data bus on the board.

Figure 35:
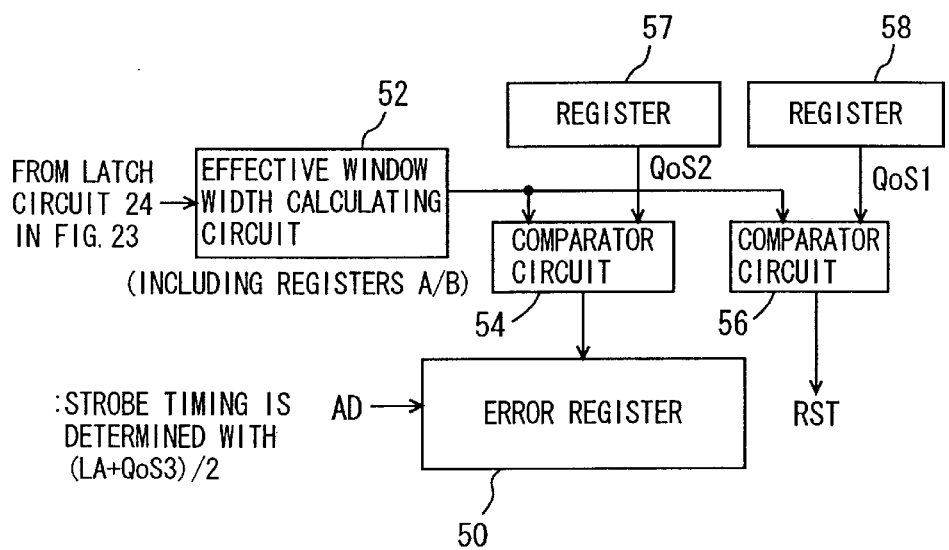
FIG. 35 schematically shows a structure of a main portion of the third embodiment of the invention.

FIG. 35 schematically shows a structure for detecting a margin of this data window. The structure shown in FIG. 35 includes: an effective window width calculating circuit 52 for calculating an effective window width in accordance with the latch signal from latch circuit 24 shown in FIG. 23; a comparator circuit 54 for comparing the effective window width calculated by effective window width calculating circuit 52 and the window width at level QoS2 read from register circuit 57; and a comparator circuit 56 for comparing the effective window width calculated by effective window width calculating circuit 52 and the effective window width corresponding to level QoS1 set in a register circuit 58.

Effective window width calculating circuit 52 includes registers A and B, and calculates effective data window width (LB-LA+1) from the leading and trailing positions of the latch stages in the latch stages storing "1" outputted from latch circuit 24. Comparator circuit 54 compares the window width corresponding to level QoS2 and the effective data window width calculated by effective window width calculating circuit 52. When comparator circuit 54 indicates that the effective data window width calculated by effective window width calculating circuit 52 is smaller than level QoS2, error register 50 stores a current address AD according to an error instructing signal generated from comparator circuit 54. When the effective data window width calculated by effective window width calculating circuit 52 is smaller than the effective window width corresponding to level QoS1, it is determined that the correct data transfer cannot be performed due to a less margin of window, and comparator circuit 56 produces reset signal RST for triggering the system reset.

The effective data window width (the number of latch stages) corresponding to level QoS1 applied to comparator circuit 56 is stored in register 58.

When the effective data window width is equal to or larger than 600 ps of the set-up/hold times defined by level QoS2, it is determined that the accurate operation can be performed. The following structure may be employed: In accordance with level QoS3, the effective data window width is initially set. In previously described detection of the strobe timing, the effective data window region having the time width defined by level QoS3 from the leading edge of the effective data window is detected, and the central point in this region is determined as the strobe timing. More specifically, the number of latch LA arranged corresponding to the leading position of the effective data window and the number of latch stages designated by level QoS3 are added, an average value of a result of the addition is obtained, and thus the number of the register stage applying the strobe timing can be specified.

The set-up/hold times at these levels may take values other than the above, and are merely required to be determined appropriately in accordance with a data transfer rate. This level detection data pattern is set in a complementary bit pattern form for detecting a window. This is because the effective data window detecting circuit can detect an effective data window only when a complementary data bit pattern is applied. Description will now be given on a structure wherein the margin of the set-up/hold can always be detected even in a general, normal operation mode.

First Modification

Figure 36:
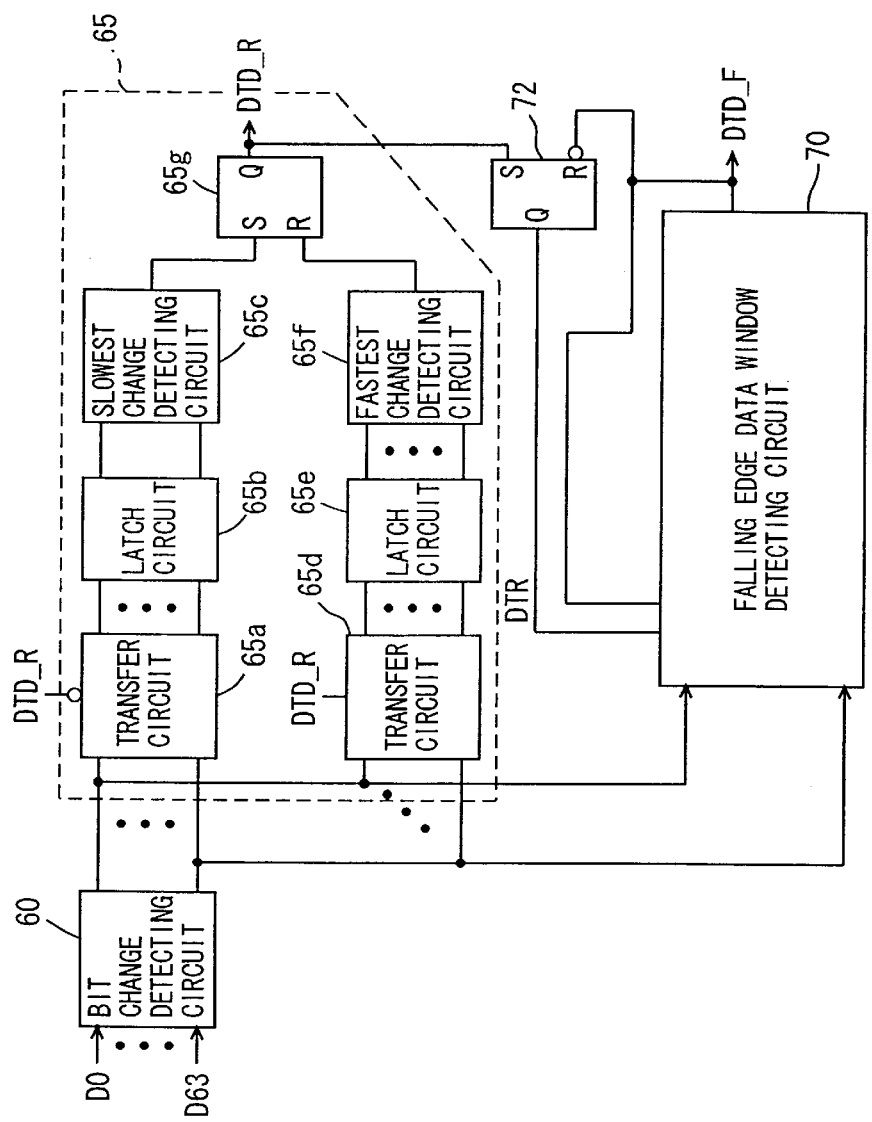
FIG. 36 schematically shows a modification of the third embodiment of the invention.

FIG. 36 schematically shows, by way of example, a modification of the effective data window detecting portion. In FIG. 36, the effective data window detecting portion includes: a bit change detecting circuit 60 for detecting the transition time of each of data bits D0–D3; a rising edge data window detecting circuit 65 for producing an effective data window detection signal DTD_R for data transferred in synchronization with the rising edge of the clock signal in accordance with the output signal of bit change detecting circuit 60; and a falling edge data window detecting circuit 70 for detecting the effective data window of data transferred in synchronization with the falling edge of the clock signal in accordance with the bit change detection signal generated from bit change detecting circuit 60.

Rising edge window detecting circuit 65 includes: a transfer circuit 65a for transferring the change detection signal generated from bit change detecting circuit 60 when effective data window detection signal DTD_R of data (rising edge data) transferred in synchronization with the rising edge of the clock signal; a latch circuit 65b latching the output signals of transfer circuit 65a; a slowest change detecting circuit 65c for detecting the slowest change point from the data latched by latch circuit 65b; a transfer circuit 65d for transferring an output signal of bit change detecting circuit 60 when effective data window detection signal DTD_R of the rising edge data is at H-level; a fastest change detecting circuit 65f for detecting the fastest change point in data bits D0–D63 in accordance with output signals of latch circuit 65e; and a set/reset flip-flop 65g set in response to the rising of the output signal of slowest change detecting circuit 65c and reset in response to the rising of the output signal of fastest change detecting circuit 65f for outputting effective data window detection signal DTD_R.

Falling edge data window detecting circuit 70 has a structure similar to rising edge data window detecting circuit 65, but is different therefrom in activation timing of the transfer circuits for the slowest change detecting circuit and the fastest change detecting circuit. For controlling the operation of falling edge data window detecting circuit 70, there is arranged a set/reset flip-flop 72 which is set in response to the rising edge of effective data window detection signal DTD_R, and is reset in response to the falling of effective data window detection signal DTD_F. The transfer circuits included in falling edge data window detecting circuit 70 are controlled in accordance with the signal generated at output Q of set/reset flip-flop 72 and effective data window detection signal DTD_F.

In the structure shown in FIG. 36, data is transferred in synchronization with the rising edge of the clock signal, and then data is transferred in synchronization with the falling edge of the clock signal. Transfer circuit 65a transfers the change detection signal, generated from bit change detecting circuit 60, to latch circuit 65b. Slowest change detecting circuit 65c detects the slowest change point in the data bits, and sets a set/reset flip-flop 65g. Transfer circuit 65d is activated in response to the rising of effective data window detection signal DTD_R, to transfer the output signal of bit change detecting circuit 60, to latch circuit 65e. Fastest change detecting circuit 65f detects the fastest change point in the bits of data latched by latch circuit 65e, and resets set/reset flip-flop 65g. Therefore, for the data transferred in synchronization with the rising edge of the clock signal, a period from the slowest change point in the data bits to the fastest change point in the same data bits is detected, and effective data window detection signal DTD_R is activated for this detected period.

In the falling edge data window detecting circuit 70, when effective data window detection signal DTD_R for the data, transferred in synchronization with the rising edge, is activated, set/reset flip-flop 72 is set, and output signal DTR thereof rises, and responsively falling edge data window detecting circuit 70 takes in the output signal of bit change detecting circuit 60. Then, the slowest change point and the fastest change point are detected in accordance with the bit change detection signals, and signal DTD_F is activated in accordance with the result of the detection. Thus, effective window for the data bits transferred in synchronization with the falling edge of the clock signal is detected.

Figure 37:
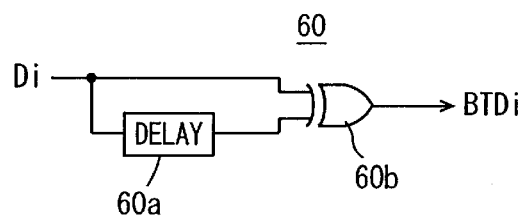
FIG. 37 schematically shows a structure of a bit change detecting circuit shown in FIG. 36.

FIG. 37 shows a structure of a bit change detector for data Di of one bit in bit change detecting circuit 60 shown in FIG. 36. In FIG. 37, the bit change detector in bit change detecting circuit 60 includes a delay circuit 60a for delaying data bit Di by a predetermined time, and an EXOR gate 60b receiving an output signal of delay circuit 60a and data bit Di. EXOR gate 60b generates bit change detection signal BTDi.

In the bit change detector shown in FIG. 37, when data bit Di changes, signals at different logical levels are applied to EXOR gate 60b for a period equal to the delay time of delay circuit 60a, and bit change detection signal BTDi is at H-level for the delay time period. Thereby, the change point of data bit Di can be detected.

Figure 38:
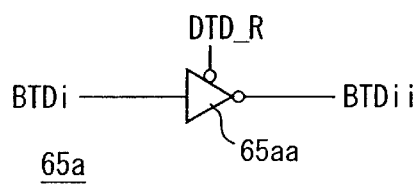
FIG. 38 schematically shows a structure of a transfer circuit shown in FIG. 36.

FIG. 38 shows a structure of transfer circuit 65a shown in FIG. 36. In FIG. 38, transfer circuit 65a includes a tri-state inverter buffer circuit provided corresponding to each bit change detection signal. FIG. 38 shows, as a representative, a tri-state inverter buffer 65aa provided for bit change detection signal BDTi. Tri-state inverter buffer 65aa is activated when effective data window detection signal DTD_R is at L-level, to produce an internal bit change detection signal BTDii in accordance with bit change detection signal BTDi.

Figure 39:
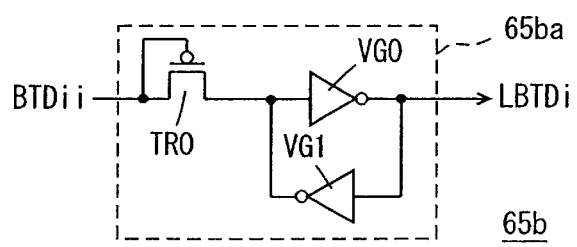
FIG. 39 schematically shows a structure of a latch circuit shown in FIG. 36.
Figure 40:
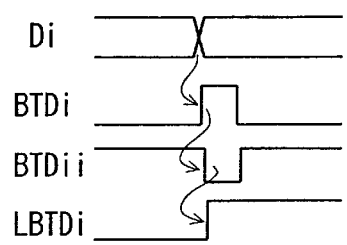
FIG. 40 is a timing chart representing operations of the circuits shown in FIGS. 37 to 39.

FIG. 39 shows, by way of example, a structure of latch circuit 65b shown in FIG. 36. FIG. 39 shows a structure for the data of one bit. In FIG. 39, latch circuit 65b includes an inverter latch 65ba for latching internal bit change detection signal BTDii outputted from corresponding tri-state inverter buffer circuit 65aa. Inverter latch 65ba includes a diode-connected P-channel MOS transistor TR0 for transmitting bit change detection signal BTDi when internal bit change detection signal BTDii is at L-level, an inverter VG0 inverting a signal applied from MOS transistor TR0, and an inverter VG1 for inverting an output signal of inverter VG0, for transmission to the input of inverter VG0. Inverter VG0 outputs a latch bit change detection signal LBTDi. Inverter latch 65ba is reset in the initial state such that latch bit change detection signal LBTDi is at H-level (a reset transistor is not shown). Operations of the circuits shown in FIGS. 37 to 39 will now be described with reference to a signal waveform diagram.

When data bit Di changes, bit change detection signal BTDi rises from L-level to H-level in bit change detecting circuit 60 shown in FIG. 37 for a period equal to the delay time of delay circuit 60a. When bit change detection signal BTDi rises, internal bit change detection signal BTDii from tri-state inverter buffer circuit 65aa falls from H-level to L-level. When internal bit change detection signal BTDii falls to L-level, MOS transistor TR0 in inverter latch 65ba is turned on, and latch bit change detection signal LBTDi generated from inverter VG0 rises to H-level. After internal bit change detection signal BTDii rises to H-level, MOS transistor TR0 maintains the off state, and latch bit change detection signal LBTDi maintains H-level.

Figure 41:
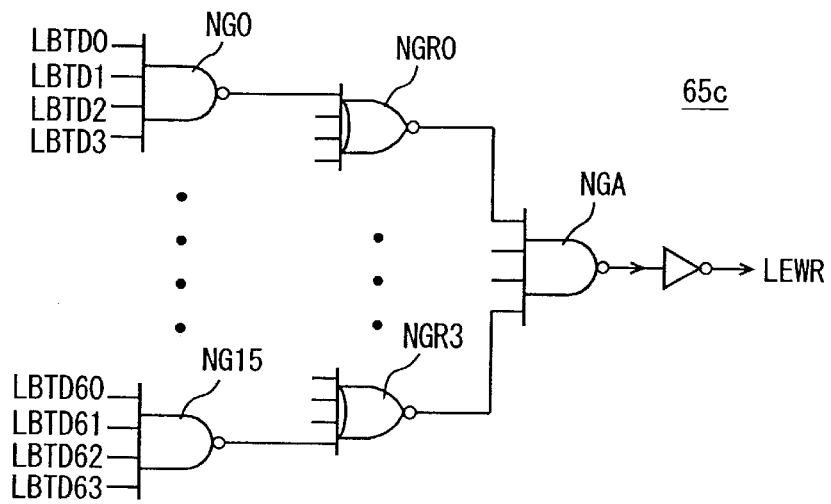
FIG. 41 schematically shows a structure of a slowest change detecting circuit shown in FIG. 36.

FIG. 41 schematically shows a structure of slowest change detecting circuit 65c shown in FIG. 36. In FIG. 41, slowest change detecting circuit 65c includes NAND circuits NG0–NG15 provided for respective signal sets each including four bits of latch bit change detection signals LBTD, four 4-input NOR circuits NGR0–NGR3, provided corresponding to circuit sets each including four NAND circuits of NAND circuits NG0–NG15, for receiving the output signals of the corresponding sets of four NAND circuits, and a 4-input NAND circuit NGA receiving output signals of NOR circuits NGR0–NGR3. NAND circuit NGA generates leading window change detection signal LEWR via an inverter.

Each of NAND circuits NG0–NG15 generates a signal at L-level when all the corresponding four inputs attain H-level. Each of NOR circuits NGR0–NGR3 generates a signal at H-level when all the corresponding four inputs attain L-level. Therefore, the output signal of each of NAND circuits NG0–NG15 falls to L-level in response to the slowest change in the corresponding bit change detection signals of four bits. Each of NOR circuits NGR0–NGR3 raises its output signal to H-level in response to the slowest rising in the output signals of corresponding four NAND circuits. NAND circuit NGA lowers its output signal to L-level in response to the slowest falling in the output signals of NOR circuits NGR0–NGR3. By inverting the output signal of NAND circuit NGA, leading window change detection signal LEWR is raised to H-level in accordance with the bit change detection signal changing the most slowly.

Figure 42:
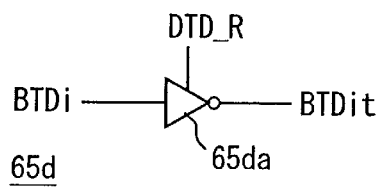
FIG. 42 schematically shows a structure of the transfer circuit shown in FIG. 36.

FIG. 42 shows a structure of transfer circuit 65d shown in FIG. 36. In FIG. 42, transfer circuit 65d includes a tri-state inverter buffer circuit 65da activated in response to H-level of data window detection signal DTD_R, to invert bit change detection signal BTDi for producing internal bit change detection signal BTDit.

The structure of transfer circuit 65d shown in FIG. 42 is the same as that of transfer circuit 65a shown in FIG. 38 except for that transfer circuit 65d is activated when transfer circuit 65a is deactivated. Thus, transfer circuit 65d is activated when the leading edge of the effective data window is detected, and the trailing edge of the effective data window is detected.

Figure 43:
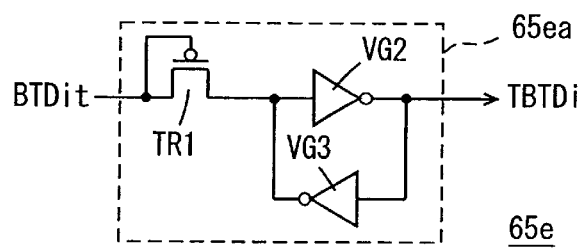
FIG. 43 schematically shows a structure of the latch circuit shown in FIG. 36.

FIG. 43 schematically shows a structure of latch circuit 65e shown in FIG. 36. In FIG. 43, latch circuit 65e includes: a diode-connected P-channel MOS transistor TR1 which receives internal bit change detection signal BTDit from corresponding tri-state inverter buffer circuit 65da; an inverter circuit VG2 which inverts a signal outputted from MOS transistor TR1 to produce a latch bit change detection signal TBTDi; and an inverter circuit VG3 which inverts an output signal of inverter circuit VG2 for transmission to an input of inverter circuit VG2. Transfer circuit 65ea is provided for each of the data bits.

FIG. 44 shows a structure of fastest change detecting circuit 65f shown in FIG. 36. Fastest change detecting circuit 65f in FIG. 44 includes: OR circuits OGR0–OGR15 provided corresponding to signal sets each including latch bit change detection signals of 4 bits; OR circuits OGR16–OGR19 provided for each four circuits of OR circuits OGR0–OGR15, and receiving an output signal of OR circuits of a corresponding set of four OR circuits; and a 4-input OR circuit OGR20 receiving the output signals of OR circuits OGR16–OGR20. OR circuit OGR20 generates a bit change detection signal TEWR OR circuit OGR0 receives latch bit change detection signals TBTD0–TBTD3 of 4 bits, and OR circuit OGR15 receives latch bit change detection signals TBTD60–TBTD63 of 4 bits. These OR circuits each raise an output signal thereof to H-level when a signal at H-level is supplied thereto. Accordingly, each of OR circuits OGR0–OGR15 detects the fastest bit change in the corresponding four data bits. Likewise, each of OR circuits OGR16–OGR19 raises its output signal to H-level in response to the fastest rising in the output signals of the corresponding four OR circuits. OR circuit OGR20 in the final stage raises its output signal TEWR to H-level in response to the fastest rising in the output signals of OR circuits OGR16–OGR19. Thereby, window change detection signal TEWR is driven to the active state at H-level in accordance with the fastest change in data bits D0–D63.

FIG. 45 is a signal waveform diagram representing an operation of rising edge data window detecting circuit 65 shown in FIGS. 37 to 44. Referring to FIG. 45, description will be given on the operation of rising edge data window detecting circuit 65 shown in FIGS. 37 to 44.

When data bit D changes, effective data window detection signal DTD_R is still at L-level, and transfer circuit 65a is turned on to transfer the bit change detection signal received from bit change detecting circuit 60 to latch circuit 65b. Leading window change detection signal LEWR from slowest change detecting circuit 65c rises to H-level in response to the slowest change of latch bit change detection signal LBTD (LBTDi). When the leading window change detection signal LEWR rises to H-level, set/reset flip-flop 65g shown in FIG. 36 is set, and effective data window detection signal DTD_R rises to H-level.

When effective data window detection signal DTD_R rises to H-level, transfer circuit 65a is deactivated, and all the bit change detection signals attain or keep L-level, and the data bits no longer change. When the data bits change subsequently, trailing edge window change detection signal TEWR from fastest change detecting circuit 65f rises to H-level in response to the fastest change of bit change detection signal TBTD (TBTDi). In response to activation of trailing edge window change detection signal TEWR, set/reset flip-flop 65g is reset, and effective data window detection signal DTD_R falls to L-level. Thus, effective data window of the data bits transferred in synchronization with the clock edge can be detected.

Figure 46:
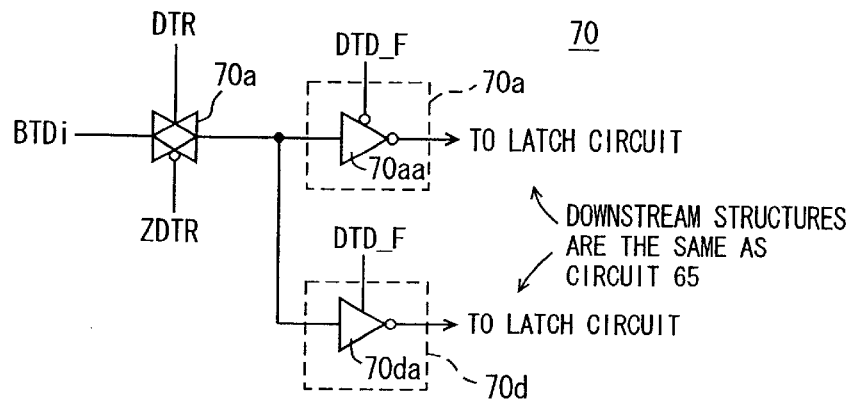
FIG. 46 schematically shows a structure of a falling edge data window detecting circuit shown in FIG. 36.

FIG. 46 shows a structure of an input portion of falling edge data window detecting circuit 70 shown in FIG. 36. In FIG. 46, falling edge data window detecting circuit 70 includes: a transmission gate 70i which transmits bit change detection signal BTDi generated from bit change detecting circuit 60 in response to period detection signal DTR and complementary period detection signal ZDTR from set/reset flip-flop 72 shown in FIG. 36; a transfer circuit 70a including a tri-state inverter buffer 70aa activated to invert a signal received through transmission gate 70i when effective data window detection signal DTD_F is at L-level; and a transfer circuit 70d which is activated to invert and transfer a bit change detection signal received through transmission gate 70i to a next latch stage when effective data window detection signal DTD_F is at H-level. Transfer circuit 70d includes a tri-state inverter buffer circuit 70da provided corresponding to data bit change detection signal BTDi and activated to invert the bit change detection signal when window detection signal DTD_F is at H-level.

The circuit structures of falling edge data window detecting circuits 70 arranged subsequent to transfer circuits 70a and 70d are the same as those of rising edge detecting circuit 65 shown in FIG. 36.

Figure 47:
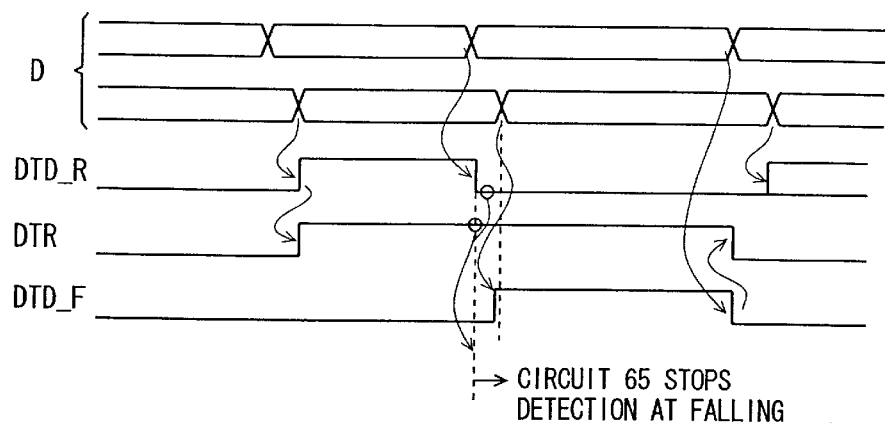
FIG. 47 is a signal waveform diagram representing a data window detecting operation in a modification of the third embodiment of the invention.

FIG. 47 is a signal waveform diagram representing operations of the data window detecting circuit shown in FIG. 46. Referring to FIG. 47, when the bits of data D change, effective data window detection signal DTD_R first rises to H-level in response to the slowest change of the data bits. When effective data window detection signal DTD_R rises to H-level, flip-flop 72 shown in FIG. 36 is set so that period detection signal DTR rises to H-level. When period detection signal DTR rises to H-level, transmission gate 70i shown in FIG. 46 is turned on to take bit change detection signal BTDi into falling edge data window detecting circuit 70. At this time point, all bit change detection signals BDTi are already changed to L-level, and the output signals of falling edge window detecting circuit 70 do not change. In response to the fastest change of data bits, effective data window detection signal DTD_R falls to L-level, and the effective window of the data transferred at the rising edge of the clock signal is detected. At this time point, transmission gate 70i is already on, and falling edge data window detecting circuit 70 performs the detecting operation to raise effective data window detection signal DTD_F to H-level in response to the slowest change of data bit.

When effective data window detection signal DTD_F rises to H-level, transfer circuit 70a is deactivated, and transfer circuit 70d is activated to wait for a next change in data bits. When data bits change again, a fastest change detecting circuit provided downstream the transfer circuit 70d extracts the fastest change of data bits, and effective data window detection signal DTD_F falls to L-level in response to this fastest change of data bits. When effective data window detection signal DTD_F falls to L-level, set/reset flip-flop 72 (see FIG. 36) is reset, and transmission gate 70i is turned off so that falling edge data window detecting circuit 70 is isolated from bit change detecting circuit 60.

Figure 48:
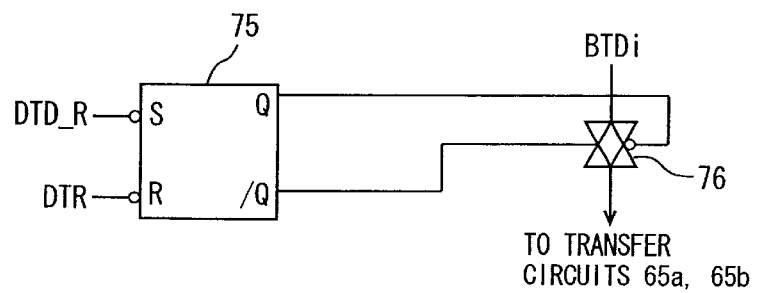
FIG. 48 shows a structure of an input portion of the rising edge data window detecting circuit shown in FIG. 36 in greater detail.

In the detecting operation of falling edge data window detecting circuit 70, such a situation may occur that effective data window detection signal DTD_R is at L-level, and transfer circuit 65a is activated to activate effective data window detection signal DTD_R. Therefore, as shown in FIG. 48, a flip-flop 75 is provided which is set at the falling of effective data window detection signal DTD_R, and is reset at the falling of period detection signal DTR. The output signal of flip-flop 75 is applied to a control gate of transmission gate 76 arranged at a stage preceding transfer circuits 65a and 66b. Thereby, the detecting operation of rising edge data window detecting circuit 65 can be stopped during the detecting operation of falling edge data detecting circuit 70.

By utilizing the structure shown in FIGS. 36 et. seq., an effective data window can be detected in accordance with arbitrary change in data bit. The width of the effective data window region is normally detected and the level determination of levels QoS1–QoS3 can always be performed so that the safety of the system can be ensured.

A desired, one clock cycle may be extracted for performing the window detecting operation. More specifically, effective data window detection signals DTD_R and DTD_F may be each activated once only in a period in which the effective window width is detected. The data strobe timing is already adjusted in the normal operation mode, and the detection of the effective data window is adapted to be performed in accordance with a test mode signal only for one clock cycle period, to implement such one clock cycle operation.

Second Modification

Figure 49:
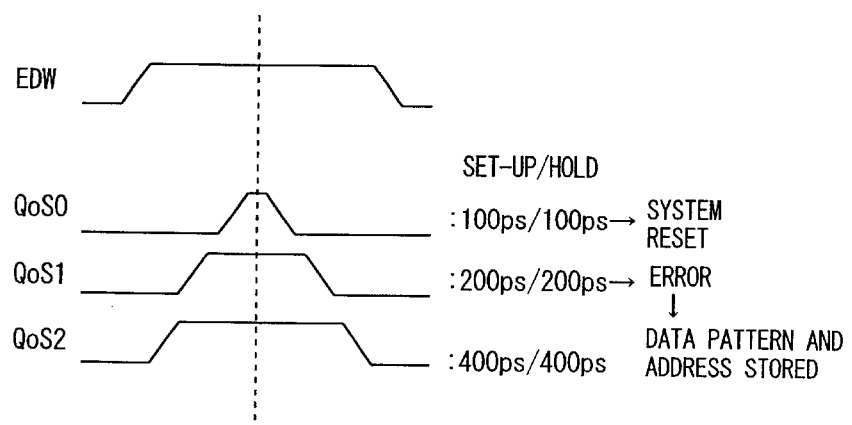
FIG. 49 shows, by way of example, signal qualities in a second modification of the third embodiment of the invention.

FIG. 49 shows a second modification of the third embodiment of the invention. In the second modification, as shown in FIG. 49, both the set-up time and the hold time at level QoS0 are set to 100 ps for margins of the set-up/hold times. At levels QoS1 and QoS2, the set-up/hold times are set to 200 ps and 400 ps, respectively, similarly to the foregoing third embodiment as shown in FIG. 32.

According to level QoS2, an initial effective data window width is set. When effective data window width lowers to level QoS1, the data pattern and the associated address are stored in the error register shown in FIG. 34. By utilizing the circuits shown in FIG. 36 et. seq., the effective data window of an arbitrary data pattern can be detected. When an effective data window lowers to level QoS0, the memory control unit signals the system (CPU) of the system reset.

When an operation is performed at level QoS1, data having a set-up or hold time between levels QoS0 and QoS1 is also transferred. In this case, erroneous determination of data "0" and "1" may occur. However, even such a memory system can be used for an application where a large amount of data is used, and partial error in determination of data "0" and "1" exerts only a small influence, such as graphic data.

The classes shown in FIGS. 32 and 49 determine the size of an effective data window, and the data transfer rate can be set based on the size of the determined effective data window.

Figure 50:
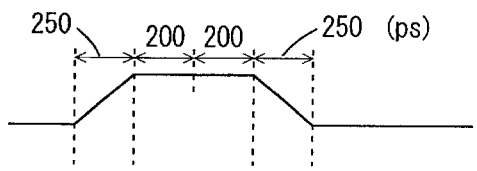
FIG. 50 shows, by way of example, a signal waveform with the signal quality shown in FIG. 49.

FIG. 50 shows an upper limit transferable waveform of signal waveforms in the case where the signal quality shown in FIG. 49 is used. In FIG. 50, each of the rising time and falling time of the signal is 250 ps. At down to level QoS1, the signal quality is ensured, and the data transfer can be performed accurately. Accordingly, both the set-up time and the hold time are 200 ps. Therefore, the data window of this signal is equal to 900 ps. The transfer rate in this case is equal to 1/900 ps=1.11 Gbits/sec.

The signal waveform shown in FIG. 50 is a waveform of an effective data window, and includes a signal skew between pins. Compared with this waveform, the set-up/hold times of the signal outputted from each pin are longer in a practical use, and the actual transfer rate may be lower than the foregoing value of 1.11 Gbits/sec.

Figure 51:
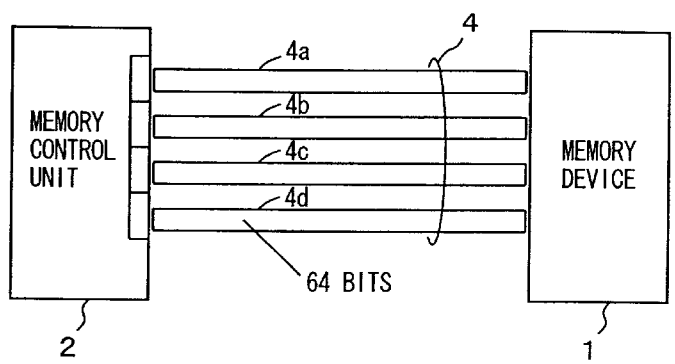
FIG. 51 shows a memory structure and a data transfer rate with the signal quality shown in FIG. 49.

FIG. 51 shows, by way of example, a structure of the memory system according to second modification of the third embodiment of the invention. In FIG. 51, memory control unit 2 and memory device 1 are coupled via common data bus 4. Common data bus 4 has sub-data buses 4a–4d each transferring data of 64 bits. In the case where memory device 1 is formed of memory module including four memory chips, the memory chips are arranged corresponding to sub-data buses 4a–4d, respectively, and each memory chip transfers data of 64 bits at a time.

In this memory system, the data transfer rate is equal to 1.11·256=284 Gbits/sec if the signal waveform shown in FIG. 50 is used. Accordingly, by appropriately determining the set-up/hold times at level QoS indicating this signal quality by a system designer, the effective window width of the transfer data is determined, and accordingly the data transfer rate of the memory system can be determined.

According to the third embodiment of the invention, the signal quality can be desirably set based on its set-up/hold times, and the system reset or storage of an error address is performed when the signal quality lowers. Therefore, the data transfer rate can be kept high without lowering the signal quality.

Fourth Embodiment

Figure 52:
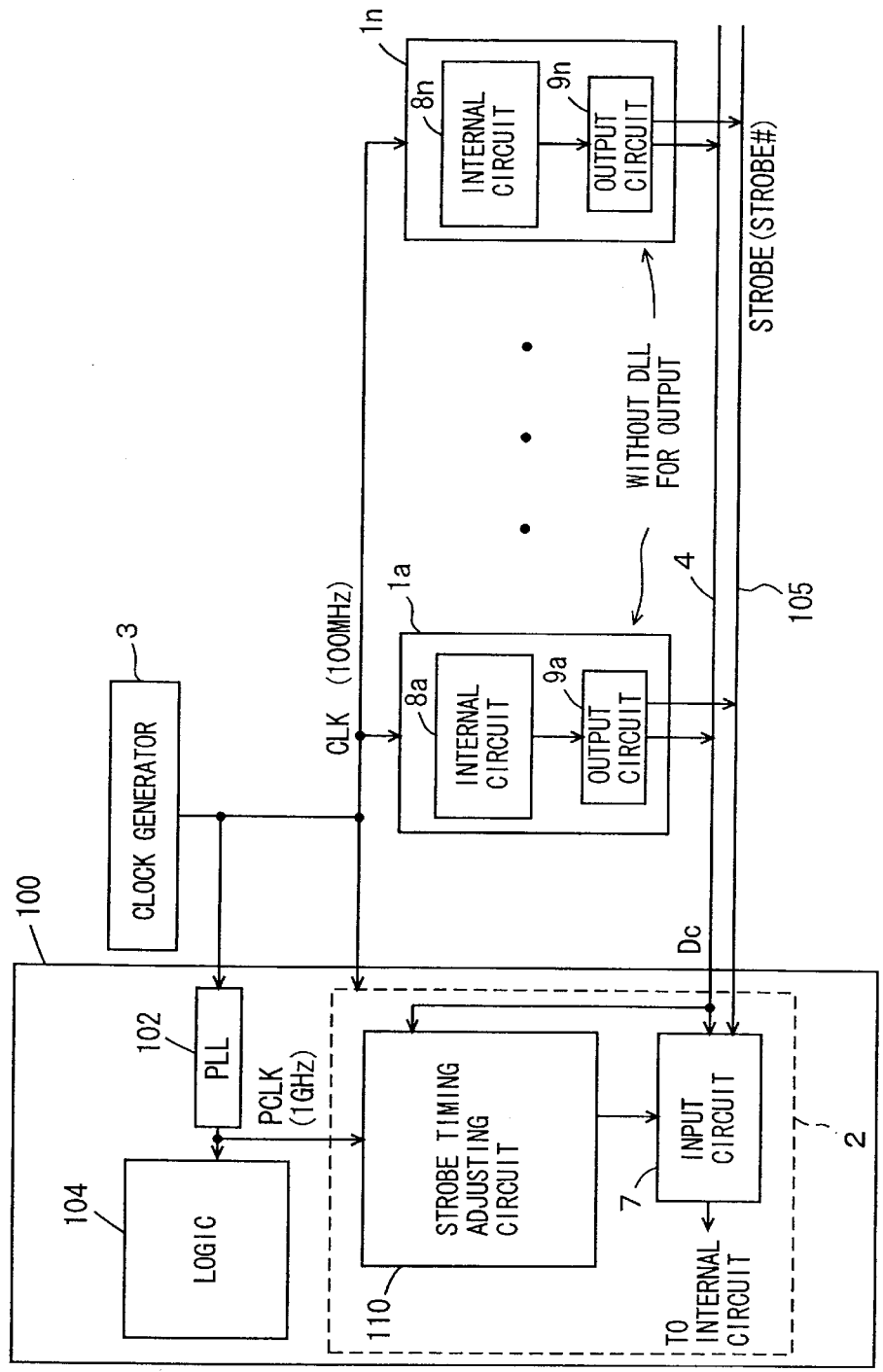
FIG. 52 schematically shows a structure of a system including a memory control device according to a fourth embodiment of the invention.

FIG. 52 schematically shows a whole structure of a data processing system according to a fourth embodiment of the invention. In this data processing system shown in FIG. 52, memory control unit 2 is integrated with a logic (or processor) 104 on the same chip. A processing device 100 also includes a PLL (Phase-Locked Loop Circuit) 102, which receives clock signal (system clock) CLK from clock generator 3, and produces an internal operation clock signal PCLK through frequency multiplication of system clock CLK. Internal operation clock signal PCLK generated from PLL 102 has a frequency of, e.g., 1 GHz, and determines the operation speed of logic 104. In other words, internal operation clock signal PCLK determines a processing cycle of logic 104, and logic 104 executes the processing in synchronization with this operation clock signal PCLK. Operation clock signal PCLK for logic, produced by PLL 102, is also supplied to a strobe timing adjusting circuit 110. Strobe timing adjusting circuit 110 receives data Dc read from memory devices 1a–1n, and detects the effective data period in accordance with operation clock signal PCLK for logic. Similarly to the first embodiment, strobe timing adjusting circuit 110 determines a strobe timing in accordance with the detected effective data period, and produces a strobe signal for taking data into input circuit 7.

At the same time as sending of data Dc onto data bus 4, output circuits 9a–9n in memory devices 1a–1n send therefrom a strobe signal STROBE (or STROBE#) designating the data taking-in timing. When data is outputted from memory device (1a–1n), strobe signal STROBE (or STROBE#) is produced by the same memory device (1a–1n) in synchronization with the output clock signal, and determines the timing at which the data are sampled. Accordingly, strobe signals STROBE (and STROBE#) transmitted onto a strobe signal line 105 and read data Dc are transmitted in the same direction to memory control unit 2. However, when memory devices 1a–1n are inserted into sockets, impedances of signals lines vary depending on the state of insertion into the socket, and the impedance of each signal line varies depending on an arrangement of wires on the board. Accordingly, a skew is present even between read data Dc and strobe signals STROBE (and STROBE#). Strobe signals STROBE and STROBE# are complementary to each other.

Figure 53:
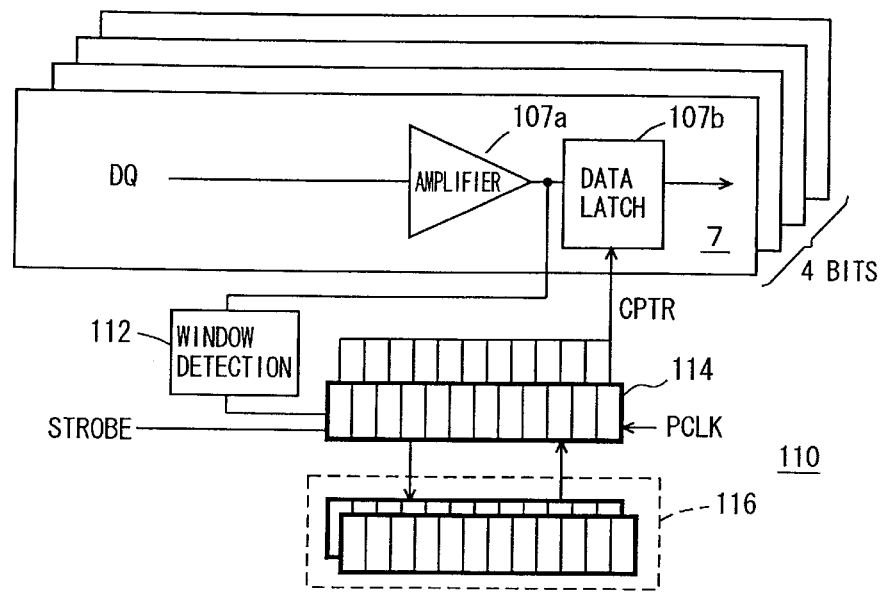
FIG. 53 schematically shows a structure of a main portion of a memory control unit shown in FIG. 52.

FIG. 53 schematically shows structures of strobe timing adjusting circuit 110 and the input circuit shown in FIG. 52. More specifically, FIG. 53 shows the structure of the input circuit and the strobe timing adjusting circuit for read data DQ of 4 bits. In the case where the memory device transfers data of 64 bits, the strobe timing may be adjusted for each 4 bits, as is done in the first embodiment already described. Also, the strobe timing may be adjusted a byte by byte basis, or on a unit of data bits associated with a common power supply pin. Further, strobe timing adjusting circuit 110 may adjust the timing commonly to the data of a total of 64 bits, similarly to the structure employing the final window detecting signal. The following description will be given on the case where the data is formed of four bits, for simplicity reason.

Input circuit 7 includes: an amplifier 107a which amplifies and converts data DQ transferred from the memory device into a signal at a CMOS level (digital value); and a data latch 107b which latches the output signal of amplifier 107a to produce an internal data bit in accordance with a modified strobe trigger signal CPTR supplied from strobe timing adjusting circuit 110. Since data DQ read from the memory device is transferred via data bus 4, data DQ is to be an analog signal due to distortion of its waveform or a small amplitude. Therefore, amplifier 107a is used to amplify and convert this analog signal of data DQ into a digital signal.

Strobe timing adjusting circuit 110 includes: a shifter/clock generating circuit 114 which receives output data bits of amplifier 107a and strobe signal STROBE to perform a shifting operation in accordance with processor internal operation clock signal PCLK, and produces modified strobe trigger signal CPTR in a normal data read mode; and a strobe timing calculating circuit 116 which determines an optimum strobe timing based on the effective window width of shifter/clock generating circuit 114 in a monitor mode, and sets the strobe timing in shifter/clock generating circuit 114 in accordance with the detected strobe timing. Strobe timing calculating circuit 116 includes a register circuit for determining the strobe timing. An operation of detecting the effective data window in this fourth embodiment will now be described.

In the effective data window detecting operation, data 010101 . . . is outputted from data terminals of pin numbers 0123 . . . , respectively, similarly to the first embodiment. These data bits are transferred at the rising and falling edges of clock signal CLK, and the logical level of data bit for each pin is inverted at every clock edge. Thus, the logical level of data bits outputted from the even-numbered pin terminals are always opposite to that of data bits outputted from the odd-numbered pin terminals.

Figure 54:
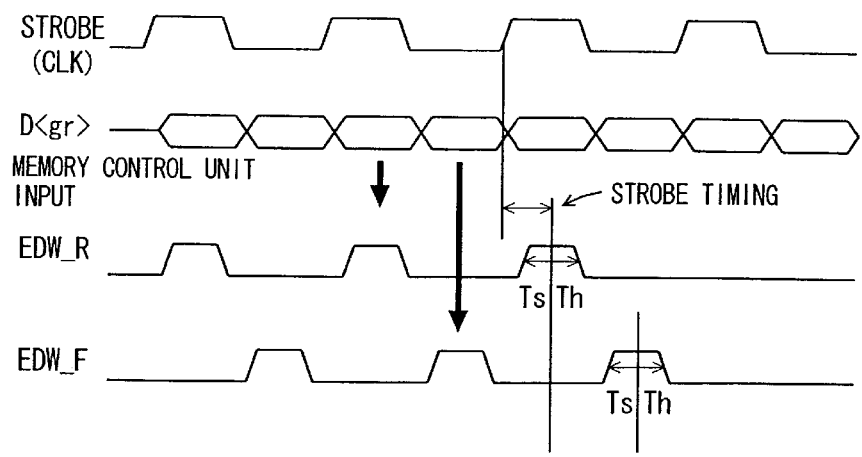
FIG. 54 shows an effective data window detecting operation in the fourth embodiment of the invention.

FIG. 54 schematically shows a relationship between the effective data window and the strobe signal. In synchronization with strobe signal STROBE, the memory device applies a data bit group D<gr> to the memory control unit. A skew due to change in signal line impedance or the like is present between strobe signal STROBE and data bit group D<gr>. Data bit group D<gr> is data of 4 bits, e.g., in the structure shown in FIG. 53, and has an eye pattern similar to that of the first embodiment. Strobe signal STROBE is phase-synchronized with clock signal CLK at the time of output from the memory device. In the memory device, the output circuit is activated by an output enable signal for sending out the clock signal together with data bits when the data read operation is performed.

Accordingly, the data bit, transmitted when strobe signal STROBE is at H-level, is the data bit that is transferred in synchronization with the rising of clock signal CLK. Also, the data bit, transferred when strobe signal STROBE is at L-level (i.e., when strobe signal STROBE# is at H-level), is the data bit that is transferred in synchronization with the falling edge of clock signal CLK. Effective data window detection signals EDW_R and EDW_F are detected during the periods of H-level and L-level of strobe signal STROBE, respectively. The central point of each of effective data window detection signals EDW_R and EDW_F is determined as strobe timing. Thereby, strobing of the data bit can be performed at the central point in the eye pattern, which in turn is formed by the data bits transferred in synchronization with strobe signal STROBE, and set-up time Ts(tsu) and hold time Th(th) can be made equal, so that the operation of taking in data can be accurately performed with sufficient margins.

Figure 55:
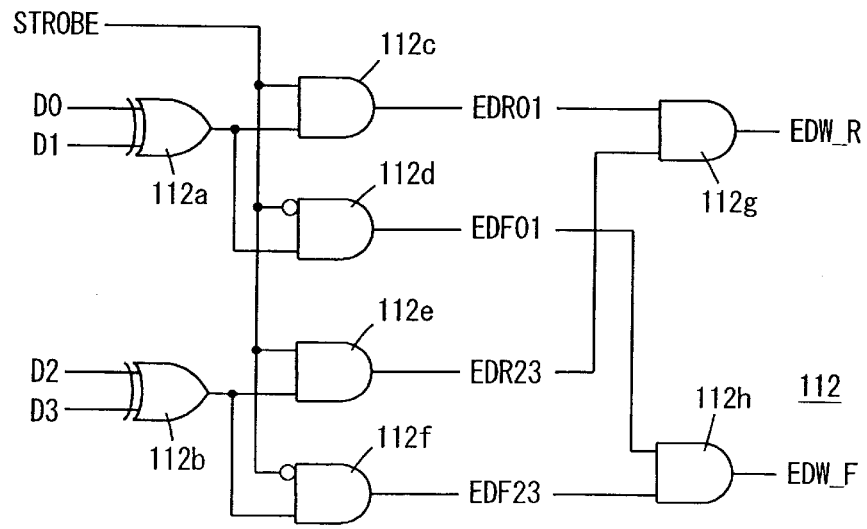
FIG. 55 shows a structure of an effective data window detecting portion shown in FIG. 53.

FIG. 55 shows an example of the structure of a window detecting circuit 112 shown in FIG. 53. Referring to FIG. 55, window detecting circuit 112 includes an EXOR circuit 112*a* receiving data bits D0 and D1, an EXOR circuit 112*b* receiving data bits D2 and D3, an AND circuit 112*c* receiving strobe signal STROBE and the output signal of EXOR circuit 112*a* to produce a primitive window detection signal EDR01, a gate circuit 112*d* receiving strobe signal STROBE and the output signal of EXOR circuit 112*a* to produce a primitive window detection signal EDF01, an AND circuit 112*e* receiving strobe signal STROBE and the output signal of EXOR circuit 112*b* to produce a primitive window detection signal EDR23, and an AND circuit 112*f* receiving strobe signal STROBE and the output signal of EXOR circuit 112*b* to produce a primitive window detection signal EDF23. When strobe signal STROBE is at L-level, gate circuits 112*d* and 112*f* are enabled to drive corresponding primitive window detection signals EDF01 and EDF23 to H-level in accordance with the output signals of corresponding EXOR circuits 122*a* and 122*b*, respectively.

EXOR circuits 112*a* and 112*b* are non-coincidence detecting circuits, and generate signals at H-level when paired data bits D0 and D1 are different in logic level and so are paired data bits D2 and D3, respectively.

Window detecting circuit 112 further includes an AND circuit 112*g* which receives primitive window detection signals EDR01 and EDR23 from AND circuits 112*c* and 112*e* to produce an effective window detection signal EDW__R, and an AND circuit 112*h* which receives primitive window detection signals EDF01 and EDF23 supplied from gate circuit 112*d* and 112*f*, respectively, to produce an effective window detection signal EDW__F.

Figure 56:
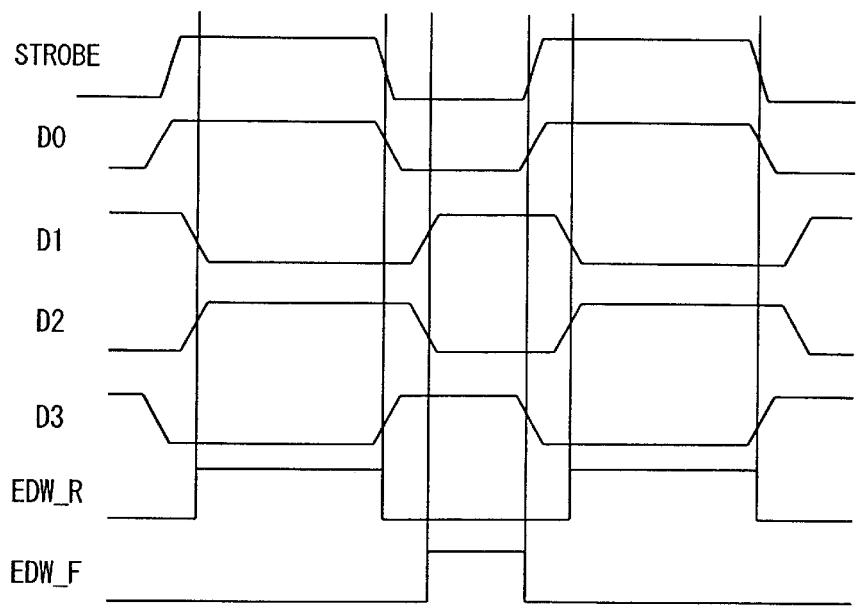
FIG. 56 is a signal waveform diagram representing an operation of circuits shown in FIG. 55.

Effective window detection signal EDW__R indicates the effective window region for the data bits transferred in synchronization with rising of clock signal CLK, and effective window detection signal EDW__F indicates the effective window region for the data bits transferred in synchronization with falling of clock signal CLK. An operation of window detecting circuit 112 shown in FIG. 55 will now be described with reference to a signal waveform diagram of FIG. 56.

Even-numbered bits D0 and D2 are opposite in logical level to odd-numbered data bits D1 and D3, and the logical levels thereof change at each of the rising and falling edges of the clock signal. This is the same as the structure of the first embodiment.

Each of EXOR circuits 112*a* and 112*b* outputs the signal at H-level when the received data bits are different in logical level from each other. Strobe signal STROBE for the data, which is transferred in synchronization with the rising of clock signal CLK, is at H-level. Therefore, effective window detection signal EDW__R is produced in accordance with primitive window detection signals EDR01 and EDR23 generated from AND circuits 112*c* and 112*e*, respectively. Strobe signal STROBE shown in FIG. 56 changes in the same manner as data bit D0. If strobe signal STROBE has the phase significantly shifted from all the data bits, the width of these effective windows are different correspondingly. In either case, the region where all the data bits are definite can be detected in a period of H-level of strobe signal STROBE.

When strobe signal STROBE is at L-level, gate circuits 112*d* and 112*f* produce primitive window detection signals EDF01 and EDF23 in accordance with the output signals of EXOR circuits 112*a* and 112*b*, respectively. In this case, effective window detection signal EDW__F supplied from AND circuit 112*h* is at H-level while all the data bits are in the definite state. In the monitor mode of determining the strobe timing, therefore, if the data bit pattern applied from the memory device is set to a checker-board pattern, the effective window detection signal can be kept active using the EXOR circuit while the data bits are in the definite state. By utilizing strobe signal STROBE, it is possible to detect the period, for which the data bits are in the definite state while strobe signal STROBE is active (at H-level or L-level). In the normal data reading mode, the optimum strobe timing can be set with reference to the strobe signal.

Modification of Window Detecting Circuit

Figure 57:
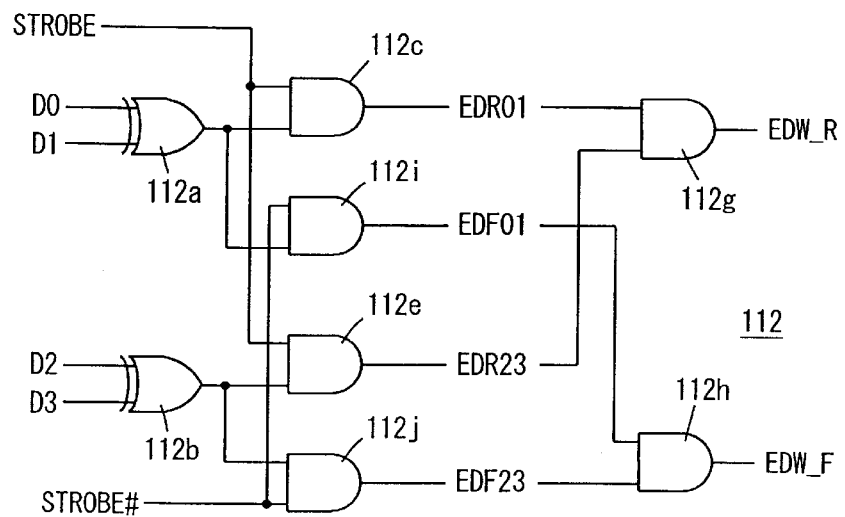
FIG. 57 shows, by way of example, a modification of the effective data window detecting portion shown in FIG. 53.

FIG. 57 shows a structure of a modification of window detecting circuit 112. Window detecting circuit 112 shown in FIG. 57 uses strobe signal STROBE and inverted signal STROBE# thereof AND circuits 112*i* and 112*j* each receiving complementary strobe signal STROBE# on its first input are employed instead of gate circuits 112*d* and 112*f* shown in FIG. 55. On second inputs, AND circuits 112*i* and 112*j* receive the output signals of EXOR circuits 112*a* and 112*b*, respectively. Structures other than the above are the substantially same as those shown in FIG. 55.

The structure shown in FIG. 57 utilizes strobe signals STROBE and STROBE# which are complementary to each other. For primitive window detection signals EDF01 and EDF23, complementary strobe signal STROBE# is utilized instead of strobe signal STROBE, whereby it is possible to provide equal gate delays to all the primitive window detection signals, so that the effective window detection can be performed accurately (because a delay corresponding to a gate of one stage for signal inversion in gate circuits 112*d* and 112*f* can be eliminated, and the influence by such a delay can be suppressed).

Figure 58:
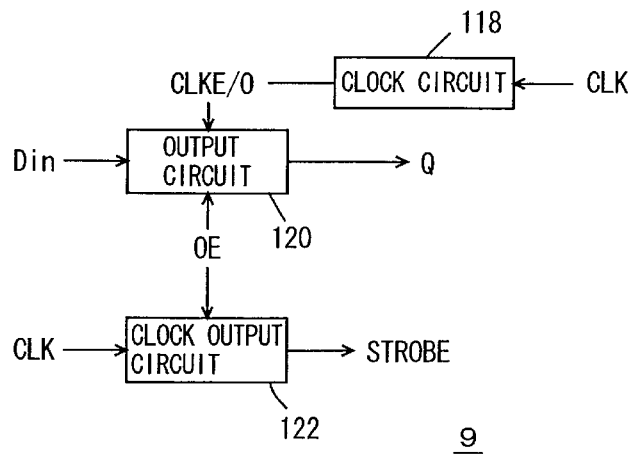
FIG. 58 schematically shows a structure of an output circuit of a memory device.

FIG. 58 schematically shows a structure of an output circuit 9 of the memory device. In FIG. 58, the memory device includes a clock circuit 118 for producing two-phase clock signals CLKE and CLKO (CLKE/O) changing in synchronization with the rising and falling of clock signal CLK, an output circuit 120 for successively transferring internal read data Din to produce external read data Q in accordance with clock signals CLKE/O generated from clock circuit 118 and an output enable signal OE, and a clock output circuit 122 for externally sending clock signal CLK to produce strobe signal STROBE when output enable signal OE is active.

Clock signals CLKE/O (CLKE, CLKO) attain H-level at the rising edge and the falling edge of clock signal CLK, respectively, and output circuit 120 serially outputs data of two bits, which are internally read in parallel, in accordance with complementary clock signals CLKE and CLKO. Thereby, data bits Q are outputted in synchronization with the rising and falling edges of clock signal CLK.

Clock output circuit 122 buffers and externally outputs clock signal CLK when output enable signal OE is active. Therefore, strobe signal STROBE is a signal synchronized, on the memory device side, with data bits Q. A skew occurs between strobe signal STROBE and data bits Q which arrive at the memory control unit due to a difference in impedance between signal wiring lines transmitting them.

The effective data window region is detected using strobe signal STROBE, so that it is possible to detect the region where the effective data is present within a period specified by the strobe signal. Thus, the effective data window region and the strobe timing can be determined more accurately. Also, it is possible to set the strobe timing with reference to the strobe signal in the normal data read mode.

Figure 59:
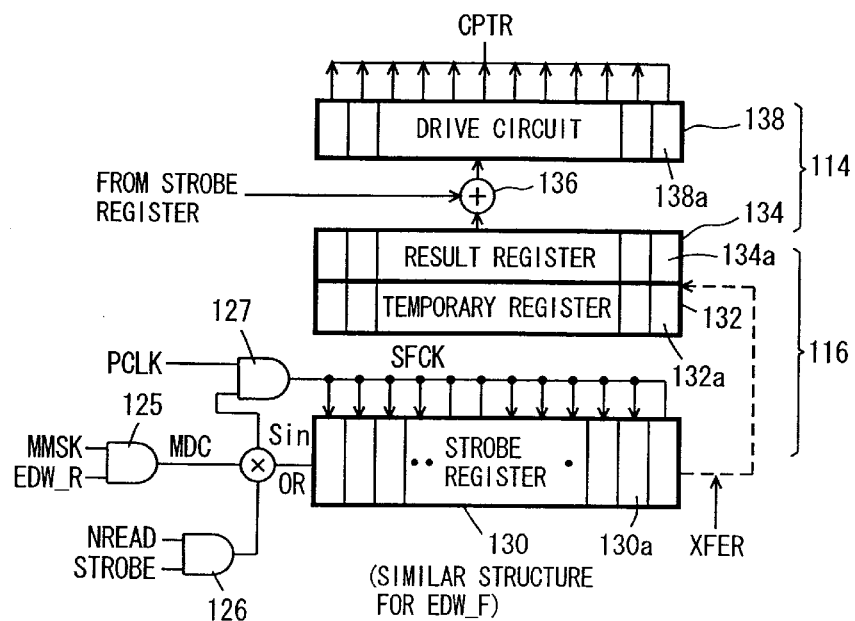
FIG. 59 shows more specifically a structure of a main portion of the memory control unit according to the fourth embodiment of the invention.

FIG. 59 schematically shows structures of a strobe trigger signal generating portion and a strobe timing calculating portion. In FIG. 59, the strobe timing calculating portion includes an AND circuit 125 receiving a monitor mask instructing signal MMSK, which is made active in the test mode, and effective window detection signal EDW_R, and an AND circuit 126 receiving a normal read instructing signal NREAD and strobe signal STROBE. The outputs of AND circuits 125 and 126 are wired-OR connected. AND circuit 125 produces a final effective window detection signal MDC.

The strobe timing calculating portion further includes an AND circuit 127 receiving processor internal operation clock signal PCLK and the output signal of AND circuit 125 or 126, to produce shift clock signal SFCK, and a strobe register 130 performing a shifting operation in synchronization with the rising and falling edges of shift clock signal SFCK. Strobe register 130 includes a plurality of shift circuits 130a which perform the shifting operation at the rising and falling edges of shift clock signal SFCK.

The strobe timing calculating portion further includes a temporary register 132 which receives and stores the data bit stored in each shift circuit 130a of strobe register 130 in response to a transfer instructing signal XFR. Temporary register 132 includes register circuits 132a provided corresponding to the respective shift circuits 130a of strobe register 130. The strobe timing is calculated using the data stored in temporary register 132. This calculation of the strobe timing may be performed utilizing software contained in a BIOS (basic I/O system) of the above-described processor, or dedicated hardware may be employed for the calculation.

The strobe timing calculating portion further includes a result register 134 for storing result data indicating the strobe timing, which is calculated from the data stored in temporary register 132, and a combining circuit 136 which combines the result data stored in result register 134 with the data stored in strobe register 130. Combining circuit 136 combines the bits stored in the respective shift circuits 130a of strobe register 130 with the corresponding data stored in register circuits 134a of result register 134 for application to a drive circuit 138. Drive circuit 138 includes tri-state drivers 138a provided corresponding to register circuits 134a of result register 134, respectively. The outputs of tri-state drivers 138a are wired-connected, and only one driver 138a produces modified strobe trigger signal CPTR. The other drivers 138a are kept in the output high-impedance state. In the structure shown in FIG. 59, strobe register 130 and temporary register 132 correspond to strobe timing calculating circuit 116. Result register 134, combining circuit 136 and drive circuit 138 correspond to shifter and clock signal generating circuit 114.

Figure 60:
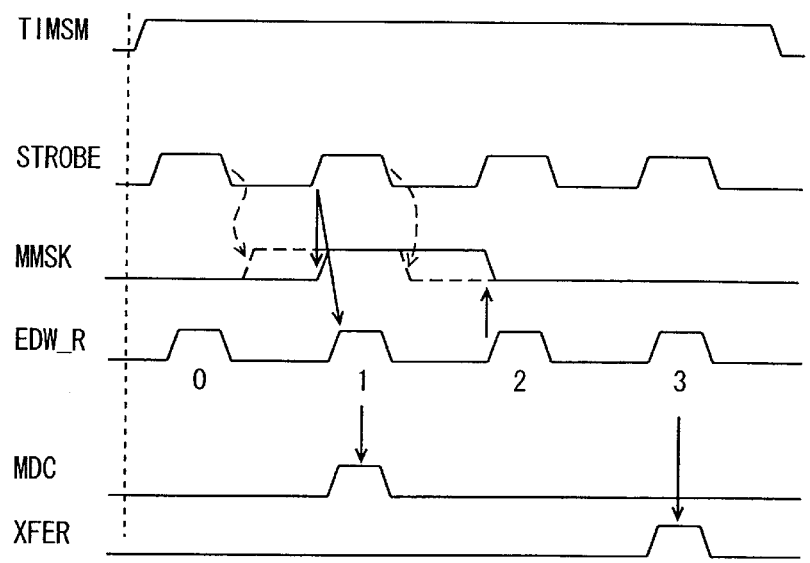
FIG. 60 is a signal waveform diagram representing an operation of the circuit shown in FIG. 59.

FIG. 60 illustrates timing of the operations of AND circuits 125 and 125 shown in FIG. 59. The operations of these AND circuits will now be described with reference to FIG. 60.

For setting the strobe timing in accordance with the effective data window, the test mode is started. In this test mode, a timing set mode instructing signal TIMSM is activated and attains H-level. When strobe signal STROBE is supplied after timing set mode instructing signal TIMSM is activated, a monitor mask instructing signal MMSK becomes active in response to the second rising of strobe signal STROBE. Thereby, AND circuit 125 produces the final effective window detection signal MDC in accordance with effective window detection signal EDW_R. Final effective window detection signal MDC is applied to strobe register 130, and is successively shifted in accordance with a shift clock signal SFCK applied from AND circuit 127. This monitor mask instructing signal MMSK falls to L-level in response to the next rising of effective window detection signal EDW_R. Accordingly, only one effective window detection signal EDW_R is extracted by monitor mask instructing signal MMSK. Only while final effective window detection signal MDC is produced in accordance with effective window detection signal EDW_R, shift clock signal SFCK is generated, and strobe register 130 performs the shifting operation. Only while final effective window detection signal MDC is at H-level, strobe register 130 performs the shift operation, and therefore the time width of the effective window region is detected based on the number of clock cycles of shift clock signal SFCK.

When the effective window detecting operation is completed, transfer instructing signal XFR is activated in accordance with effective window detection signal EDW_R, and the effective window region instruction bits stored in strobe register 130 are transferred to temporary register 132. The strobe timing calculation is performed using the data bits stored in temporary register 132.

In FIG. 59, the effective window is detected for the data transferred in synchronization with the rising edge of clock signal CLK. However, the detection of the effective window and the detection of the strobe timing are likewise performed for the data bits transferred in response to the falling of the clock signal. For the data bits transferred at the falling edge, effective window detection signal EDW_F is used instead of effective window detection signal EDW_R. Also, complementary strobe signal STROBE# is used instead of strobe signal STROBE.

In the test mode, normal read instructing signal NREAD is set to the active state of H-level and monitor mask instructing signal MMSK is set to L-level and a signal Sin is produced from strobe signal STROBE, and the strobe timing is determined by one strobe signal STROBE. In this state, data is read. If accurate data reading is performed, further detection of the effective window is no longer required.

If data cannot be effectively taken in according to strobe signal STROBE, or if it is required to determine more accurately the central position of the data window, the effective data window detecting operation is performed by setting timing set mode instructing signal TIMSM to H-level, and the strobe timing is modified to detect the optimum strobe timing. Accordingly, if the data cannot be accurately taken in even when the strobe timing is set in accordance with strobe signal STROBE, it can be determined that the cause of failure is not present in the memory, but is present in on-board wiring lines, because the data and the strobe signal are outputted in synchronization with each other.

Figure 61:
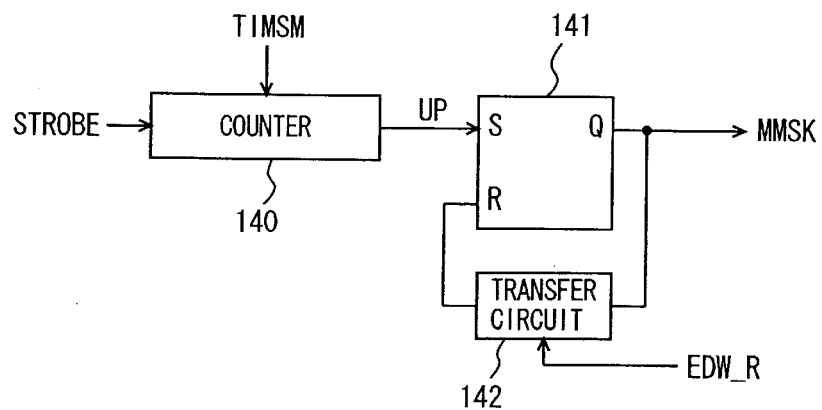
FIG. 61 schematically shows a structure of a monitor mask instructing signal generating portion shown in FIG. 59.

FIG. 61 shows an example of a structure of the monitor mask instructing signal generating portion shown in FIG. 59. In FIG. 61, the monitor mask instructing signal generating portion includes: a counter 140 which is activated to count strobe signal STROBE when timing set mode instructing signal TIMSM is active; a set/reset flip-flop 141 which is set in response to a count-up instructing signal UP generated from counter 140; and a transfer circuit 142 which transfers monitor mask instructing signal MMSK generated from set/reset flip-flop 141 in accordance with effective window detection signal EDW_R. Transfer circuit 142 applies the signal to a reset input of set/reset flip-flop 141. Transfer circuit 142 delays mask monitor instructing signal MMSK by a period of one effective window detection signal EDW_R.

Counter 140 counts the rising of strobe signal STROBE. When the count goes to 2, counter 140 activates count-up signal UP to set set/reset flip-flop 141. Responsively, monitor instructing signal MMSK is activated. When monitor mask instructing signal MMSK is activated, one effective window detection signal EDW_R is extracted, and final effective window detection signal MDC is produced. When third effective window detection signal EDW_R rises, the output signal of transfer circuit 142 attains H-level, and set/reset flip-flop 141 is reset. Thereby, only the second effective window detection signal EDW_R can be extracted.

In the above operation, second effective window detection signal EDW_R is extracted. This is for the following reason. In the data read operation, read data is transferred from the memory device in synchronization with strobe signal STROBE. Before this transfer of read data, the data bus is in the high-impedance state. For the first data, therefore, strobe signal STROBE becomes active, and the data bus line changes from the high impedance state to H- or L-level potential. For the subsequent data, the data bus line is driven to H- or L-level depending on the value of data bit from the definite state already driven to H- or L-level in accordance with the strobe signal. Thus, set-up time Ts for the initial data bit is longer than those for subsequent data bits. Since effective window detection signal EDW_R for the initial data bit has a long set-up time for the above reason, this signal is discarded, and second effective window detection signal EDW_R is extracted and is utilized as final effective window detection signal MDC.

Monitor mask instructing signal MMSK may be a signal which attains H-level at the first falling of strobe signal STROBE, and attains L-level at the next falling of strobe signal STROBE, as indicated by broken line shown in FIG. 60.

Counter 140 may be a frequency dividing circuit which halves the frequency of strobe signal STROBE.

Figure 62:
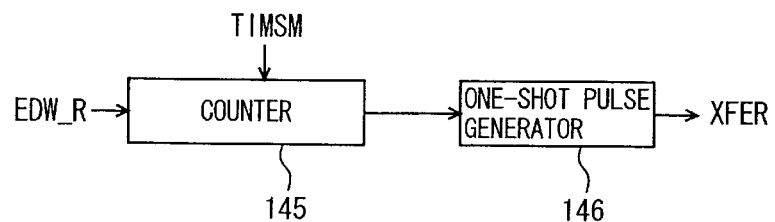
FIG. 62 schematically shows a structure of a transfer instructing signal generating portion shown in FIG. 59.

FIG. 62 schematically shows a structure of a transfer instruction signal generating portion. In FIG. 62, the transfer instructing signal generating portion includes: a counter 145 which is activated in response to activation of a timing set mode instructing signal TIMSM, and counts the rising of effective window detection signal EDW_R when activated; and a one-shot pulse generating circuit 146 which generates a transfer instructing signal XFR in a one-shot pulse signal form in accordance with the count-up instructing signal generated from counter 145. Counter 145 generates (activates) the count-up instructing signal when it counts the rising of effective window detection signal EDW_R four times when timing set mode instructing signal TIMSM is active. Therefore, information indicating the effective window can be transferred to temporary register 132 with a sufficient margin from strobe register 130, under the condition that the shift-in operation of final effective window detection signal MDC is completed in strobe register 130 and the contents held in strobe register 130 are fixed.

Figure 63:
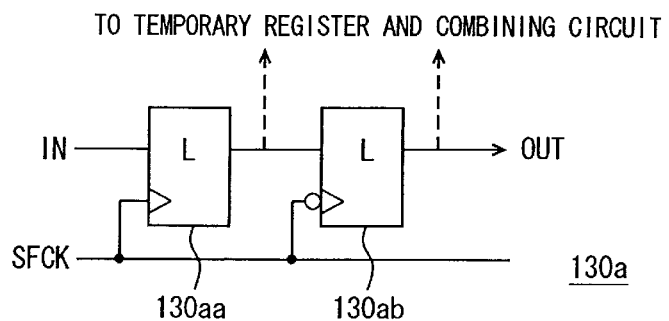
FIG. 63 schematically shows a structure of a register circuit of a strobe register shown in FIG. 59.

FIG. 63 schematically shows a structure of shift circuit 130*a* of strobe register 130 shown in FIG. 59. In FIG. 63, shift circuit 130*a* includes a latch circuit 130*aa* which takes in and latches an input signal IN in response to rising of shift clock signal SFCK, and a latch circuit 130*ab* which takes in and latches an output signal of latch circuit 130*aa* in response to the falling of shift clock signal SFCK. The output signals of these latch circuits 130*aa* and 130*ab* are both applied to temporary register 132 and combining circuit 136.

Figure 64:
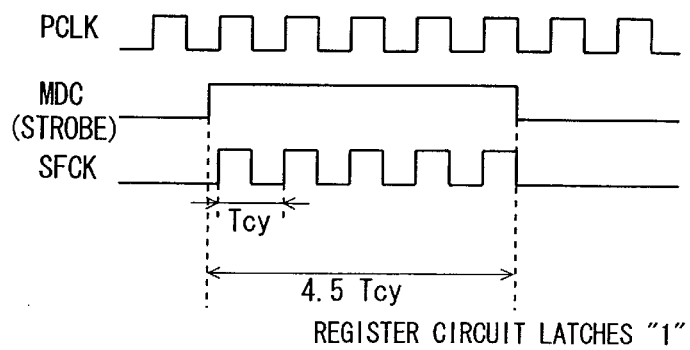
FIG. 64 is a timing chart representing operations of the strobe register shown in FIG. 59.

FIG. 64 is a signal waveform diagram representing an operation of strobe register 130 including shift circuit 130*a* shown in FIG. 63. Referring to FIG. 64, the operation of the strobe register shown in FIGS. 59 and 63 will now be described.

When effective window detection signal MDC attains H-level, shift clock signal SFCK generated from AND circuit 127 shown in FIG. 59 changes in synchronization with the processor internal operation clock signal PCLK. In synchronization with the rising and falling of shift clock signal SFCK, shift register circuits 130*aa* and 130*ab* of strobe register 130 successively transfer final effective window detection signal MDC. When final effective window detection signal MDC is at H-level, e.g., for a period of 4.5 clock cycles (4.5 Tcy) of the internal operation clock signal PCLK as shown in FIG. 64, shift clock signal SFCK also changes during a period of 4.5 cycles of operation clock signal PCLK. In strobe register 130, therefore, latch circuits 130*aa* and 130*ab* perform the shifting operation in synchronization with the falling and rising of shift clock signal SFCK, so that the output signals of nine latch circuits in total attain H-level. When effective window detection signal MDC falls to L-level, shift clock signal SFCK attains L-level, so that strobe register 130 does not perform the shifting operation. Therefore, the time width of effective window detection signal MDC can be detected by counting the number of "1" in the output signals of shift register circuits 130*a* included in strobe register 130. When normal read instructing signal NREAD is at H-level, the effective period of strobe signal STROBE is detected instead of that of effective window detection signal MDC.

Figure 65:
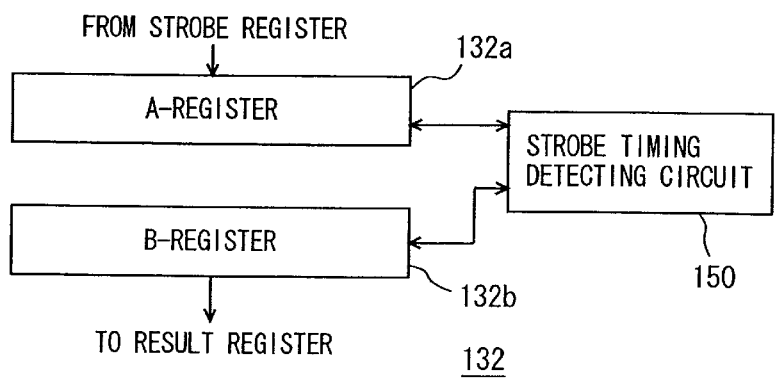
FIG. 65 schematically shows a structure of a temporary register shown in FIG. 59.

FIG. 65 schematically shows a structure of temporary register 132 shown in FIG. 59. This temporary register 132 includes an A-register 132*a* receiving data bits stored in the strobe register and a B-register 132*b* storing information indicating the strobe timing for application to the result register. A strobe timing detecting circuit 150 is coupled to A- and B-registers 132*a* and 132*b*. Strobe timing detecting circuit 150 obtains the central value of the effective window from the data bit values stored in A-register 132*a*, and stores the information indicating the central value in B-register 132*b*.

Figure 66:
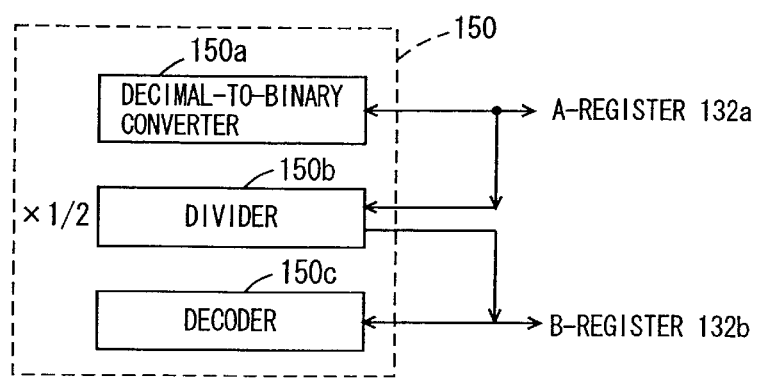
FIG. 66 schematically shows a structure of a strobe timing detecting circuit shown in FIG. 65.

FIG. 66 schematically shows a structure of strobe timing detecting circuit 150 shown in FIG. 65. Referring to FIG. 66, strobe timing detecting circuit 150 includes: a decimal-to-binary converter 150*a* for performing decimal-to-binary conversion of the data bits stored in A-register 132*a*; a divider 150*b* performing division of binary effective data window information stored in A-register 132*a* to store the result of division in B-register 132*b*; and a decoder 150*c* for decoding the result of division stored in B-register 132*b*, and setting the bit indicating the central position of the effective data window to "1" for storage in B-register 132*b*.

Divider 150*b* performs the division by a factor of 2 for detecting the central position of the effective data window. Strobe timing detecting circuit 150 may be configured to perform the arithmetic operation utilizing an arithmetic function (e.g., BIOS) of a logic (processor) integrated on the same chip with the memory controller.

Figure 67:
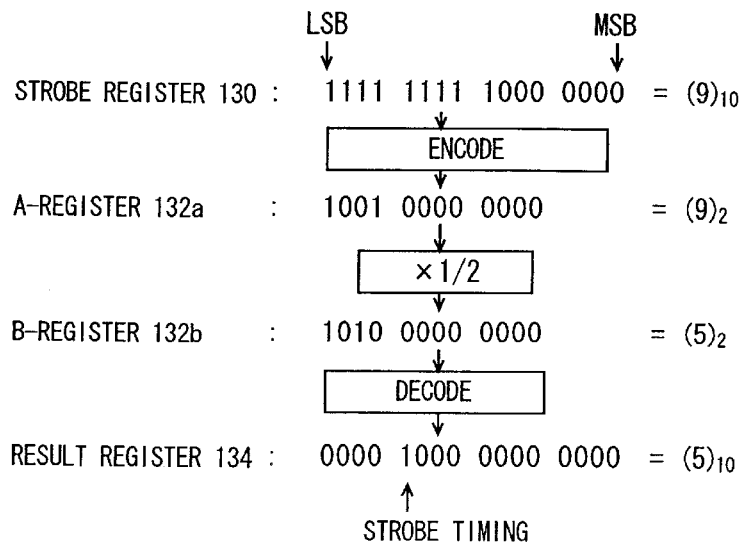
FIG. 67 represents an operation of the strobe timing detecting circuit shown in FIG. 65.

FIG. 67 shows an operation sequence of strobe timing detecting circuit 150 shown in FIG. 66. In FIG. 67, each of strobe register 130 and result register 134 includes a register circuit of 16 bits. The bit numbers of registers 130 and 134 may be appropriately determined depending on the frequency of the processor operation clock signal PCLK and the effective data window width.

First, strobe register 130 stores "1" according to the effective data window region. FIG. 67 shows the state where nine "1"s are stored. This state corresponds to the operation represent in FIG. 64, and therefore, the effective data window region corresponds to 4.5 cycles of operation clock signal PCLK.

The data bits stored in strobe register 130 are stored in A-register 132a in accordance with transfer instructing signal XFR. The data bits stored in A-register 132a are encoded by decimal-to-binary converter 150a for binary representation. The result (9) of this binary representation is stored in A-register 132a again. Subsequently, divider 150b divides the binary number (9) stored in A-register 132a. If the effective data window region is odd, the division result contains a fraction (0.5 smaller than 1). In this case, the fraction may be rounded up to 1 or down to 0. Such a structure may also be employed that divider 150b merely performs the shifting operation for rounding down the fraction. The division result ("5" in FIG. 67) of divider 150b is stored in B-register 132b. Thereby, B-register 132b stores binary data (5)2 indicating the vicinity of the central value of effective data window region. Data (5)2 stored in B-register 132b is decoded by decoder 150c to set the corresponding bit position to "1" and set all the remaining positions to "0". This decode result (5)10 is transferred to and stored in result register 134. In FIG. 67, therefore, the fifth bit in result register 134 takes the value of "1", and all the other bits take the value of "0". The position of "1" stored in result register 134 indicates the strobe timing. The data stored in result register 134 indicates the central position of the effective data window region. By using this, the strobe trigger signal is produced.

Figure 68:
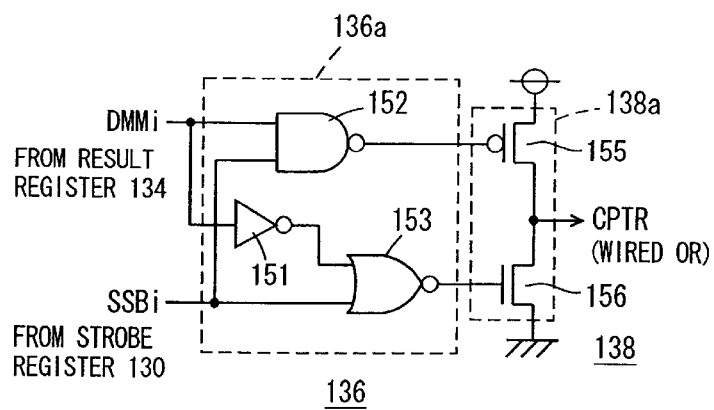
FIG. 68 schematically shows structures of combining circuit and one stage of drive circuit shown in FIG. 59.

FIG. 68 shows structures of one stage of each of combining circuit 136 and drive circuit 138 shown in FIG. 59. In FIG. 68, combining circuit 136 includes a combining stage 136a which is provided corresponding to register circuits 134a and 130a of result register 134 and strobe register 130. Combining stage 136a includes; an inverter 151 which inverts a storage bit DMMi received from the corresponding register circuit in result register 134; an NAND circuit 152 which receives an output bit SSBi of the corresponding register circuit in strobe register 130 and corresponding bit DDMi of result register 134; and an NOR circuit 153 which receives the output bit of inverter circuit 151 and corresponding data bit SSBi received from strobe register 130. In this combining stage 136a, when both the bits DMMi and SSBi are at H-level, the output signal of NAND circuit 152 attains L-level, and the output signal of NOR circuit 153 attains L-level. When the bit DMMi is at H-level and the bit SSBi is at L-level, the output signal of NOR circuit 153 attains H-level.

Figure 69:
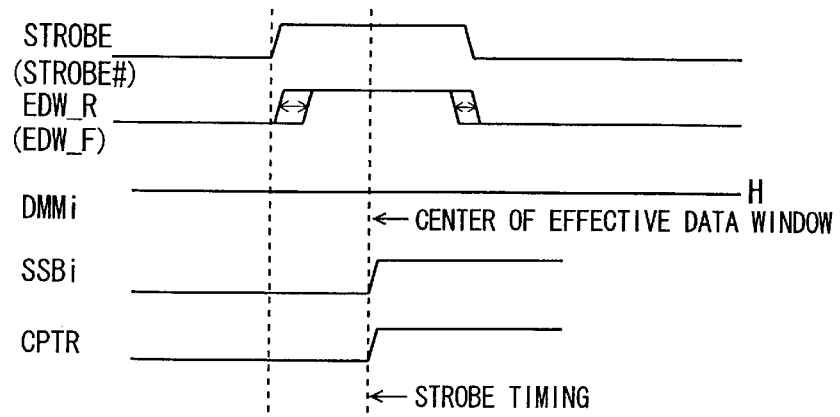
FIG. 69 is a signal waveform diagram representing an operation of the circuit shown in FIG. 68.

Drive circuit 138 includes a tri-state buffer (driver) 138a provided corresponding to each combining stage 136a. Tri-state buffer 138a includes a P-channel MOS transistor 155 receiving, on its gate, the output signal of NAND circuit 152, and an N-channel MOS transistor 156 receiving, on its gate, the output signal of NOR circuit 153. MOS transistors 155 and 156 are connected in series between a power supply node and a ground node. The output of tri-state buffer 138a is wired-OR connected, and generates modified strobe trigger signal CPTR. The operation of the circuits shown in FIG. 68 will now be described with reference to a signal waveform diagram of FIG. 69.

In the normal operation mode, normal read instructing signal NREAD is at H-level, and input signal Sin to be supplied to strobe register 130 is produced in accordance with the signal generated from AND circuit 126 shown in FIG. 59. When strobe signal STROBE rises to H-level, strobe signal STROBE is successively shifted into strobe register 130 shown in FIG. 59. Effective window detection signal EDW_R is already produced at the rising of strobe signal STROBE, and the width thereof does not exceed the width of the strobe signal (see FIGS. 57 or 55). In the normal operation mode, it is not particularly required to produce effective data window detection signal EDW_R. In accordance with the position indicating the central region of the effective data window, which was detected in the test mode, "1" is already set in the corresponding register circuit in result register 134. The structure for setting "1" in the result register can be similar to that of the first embodiment.

It is now assumed that the bit DMMi is set to H-level. Strobe register 130 shifts strobe signal STROBE in accordance with clock signal PCLK. When strobe signal STROBE is shifted into register circuit 130a corresponding to bit DMMi as a result of the shifting operation of strobe register 130, corresponding bit SSBi attains H-level. When bit SSBi is at L-level and bit DDMi is at H-level, tri-state buffer 138a is in the output high-impedance state. Likewise, when bit DDMi is at L-level, corresponding tri-state buffer 138a is in the output high-impedance state.

When bit SSBi rises to H-level and bit DMMi is at H-level, the output signal of NAND circuit 152 attains L-level. Therefore, P-channel MOS transistor 155 of tri-state buffer 138a is turned on, and modified strobe trigger signal CPTR rises to H-level. The timing of rising of modified strobe trigger signal CPTR corresponds to the central position region of the effective data window detection signal, and therefore the strobe signal can be produced at optimum timing.

For the data transferred in synchronization with the falling of clock signal CLK, the strobe timing is detected by similar operations using strobe signal STROBE# and effective window detection signal EDW_F. This is similar to the first embodiment. By the structure similar to that of the first embodiment, the strobe timing is set in the result register in correspondence to each bank of each memory device.

This strobe timing is detected for each bank of the memory device, and is stored as shown in FIGS. 19 and 20. For accessing a memory device, a signal indicating the corresponding strobe timing is read out from the timing storage region shown in FIG. 19 or 20, and is stored in the result register. Thereby, the data taking-in can be performed for each bank of each memory device at the optimum timing. Further, as shown in FIG. 26, the strobe timing may be adjusted on a four-bit basis, or on a basis of one or several byte(s), or may be adjusted collectively to all bits (i.e., 64 bits).

First Modification

In the structure shown in FIG. 59, generation of shift clock signal SFCK stops when strobe signal STROBE or effective window detection signal MDC attains L-level. Thereby, strobe register 130 stops the shifting operation. In the normal operation mode, when strobe register 130 does not perform the shifting operation, the bit SSBi may always be at H-level, and therefore modified strobe trigger signal CPTR may maintain H-level after strobe signal STROBE is shifted into strobe register 130. In view of this, a structure shown in FIG. 70 is utilized so that the activation timing of modified strobe trigger signal CPTR may be equal to that of strobe signal STROBE.

Figure 70:
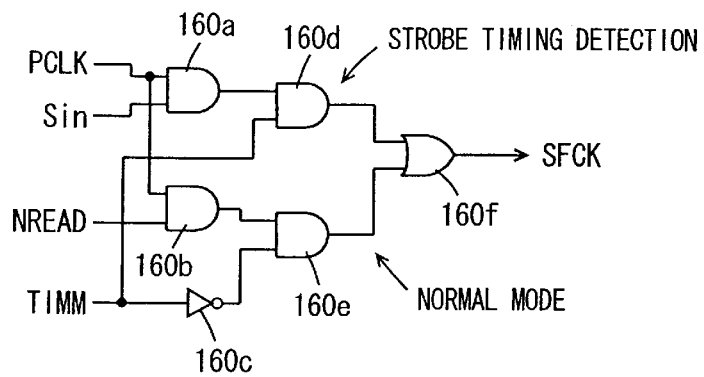
FIG. 70 show a structure of a first modification of a shift clock signal generating portion shown in FIG. 59.

FIG. 70 shows a structure of a modification of the shift clock generating portion. In FIG. 70, the shift clock generating portion includes; an AND circuit 160a receiving internal operation clock signal PCLK and shift-in signal Sin shown in FIG. 59; an AND circuit 160d receiving a timing set mode instructing signal TIMM and the output signal of AND circuit 160a; an AND circuit 160b receiving internal operation clock signal PCLK and normal read mode instructing signal NREAD; an inverter 160c inverting timing set mode instructing signal TIMM; an AND circuit 160e receiving the output signal of inverter 160c and the output signal of AND circuit 160b; and an OR circuit 160f receiving the output signals of AND circuits 160d and 160e, and produces shift clock signal SFCK.

When timing set mode instructing signal TIMM is at H-level, AND circuit 160d is enabled to produce shift clock signal SFCK through OR circuit 160f in accordance with the output signal of AND circuit 160a. In this case, therefore, generation of shift clock signal SFCK stops after signal Sin is shifted into the strobe register while strobe signal STROBE or effective window detection signal EDW_R (and EDW_F) is at H-level. In this state, the strobe timing is calculated.

In the normal operation mode, when data transferred from a memory device is to be taken in, timing mode set signal TIMM is at L-level, and normal read mode instructing signal NREAD is at H-level. Therefore, AND circuit 160e produces shift clock signal SFCK through OR circuit 160f in accordance with processor operation clock signal PCLK. Upon taking in data in the normal operation mode, the strobe register always performs the shifting operation in the data reading, and bit SSBi is at H-level for a period substantially equal to the period during which strobe signal STROBE is at H-level. Thereby, modified strobe trigger signal CPTR has a pulse width nearly equal to that of strobe signal STROBE.

For obtaining the central position of strobe signal STROBE, timing set mode instructing signal TIMM and normal read instructing signal NREAD are both set to H-level, and the strobe timing is detected similarly to the case of using the effective window detection signal.

Second Modification

Figure 71:
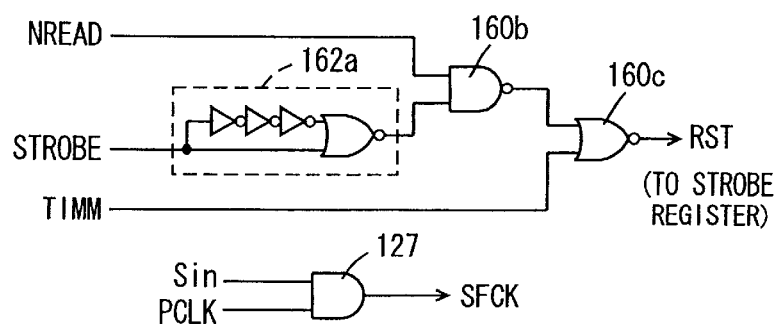
FIG. 71 show a structure of a second modification of the shift clock signal generating portion shown in FIG. 59.

FIG. 71 shows a structure of a second modification of the shift clock generating portion. Similarly to the structure shown in FIG. 59, the shift clock generating portion shown in FIG. 71 includes AND circuit 127 which receives signal Sin and processor operation clock signal PCLK, and produces shift clock signal SFCK. When normal read instructing signal NREAD is active, shift clock signal SFCK is generated (activated) for a period of strobe signal STROBE.

This shift clock generating portion further includes: a one-shot pulse generating portion 162a which generates a one shot pulse signal in response to falling of strobe signal STROBE; an NAND circuit 160b which receives the output signal of one-shot pulse generating circuit 162a and normal read instructing signal NREAD; and an NOR circuit 160c which receives timing set mode instructing signal TIMM and the output signal of NAND circuit 160c. NOR circuit 160c produces reset signal RST, which is in turn applied to strobe register 130.

When timing mode set signal TIMM is at H-level, reset signal RST generated from NOR circuit 160c is fixed to L-level. Therefore, strobe register 130 is reset by a controller or a processing unit (both not shown) after completion of the timing detecting operation. When timing mode set signal TIMM is at L-level, NOR circuit 160c operates as an inverter. When strobe signal STROBE falls to L-level while normal read instructing signal NREAD is at H-level, one-shot pulse generating circuit 160a generates a one shot pulse signal, and the output signal of NAND circuit 160b attains L-level. Thereby, reset signal RST generated from NOR circuit 160c attains H-level, so that all the data stored in strobe register 130 are reset to L-level. Therefore, reset signal RST attains H-level after generation of shift clock signal SFCK stops in accordance with strobe signal STROBE. The period for which modified strobe trigger signal CPTR is at H-level coincides with the period starting from strobe timing for the H-level period of strobe signal STROBE, and is equal, at maximum, to ½ times the period for which strobe signal STROBE is at H-level. When strobe signal STROBE falls to L-level, the effective data window detection signal is already at L-level, and the strobe trigger signal CPTR is kept at H-level for a period of the maximum effective data window region. Therefore, the foregoing structure can likewise provide the set-up time and the hold time for the data to be taken in, which are equal to each other.

The structure shown in FIGS. 70 and 71 is provided also for the data transferred in synchronization with the falling of clock signal CLK.

Instead of strobe signal STROBE, clock signal CLK may be used for determining the strobe timing. In the case of a burst EDODRAM or the like not outputting the strobe signal, data strobe timing can be determined with reference to the clock signal.

For storing the data indicating the strobe timing in the result data in correspondence to a selected memory device and bank in the normal mode, a structure similar to that of the first embodiment can be utilized.

According to the fourth embodiment of the invention, as described above, the strobe signal is use for detecting the definite periods of the strobe signal and the transferred data, and the transferred data can be taken at an accurate timing determined on the memory controller side without provision of a DLL in a memory device. Accordingly, it is not necessary to provide, in the memory device, a DLL which usually consumes a current ranging from 10 mA to 100 mA. Therefore, the current consumption of the system can be remarkably reduced. In particular, a current consumption can be significantly reduced in a system such as a server using thousands of memory devices.

Fifth Embodiment

Figure 72:
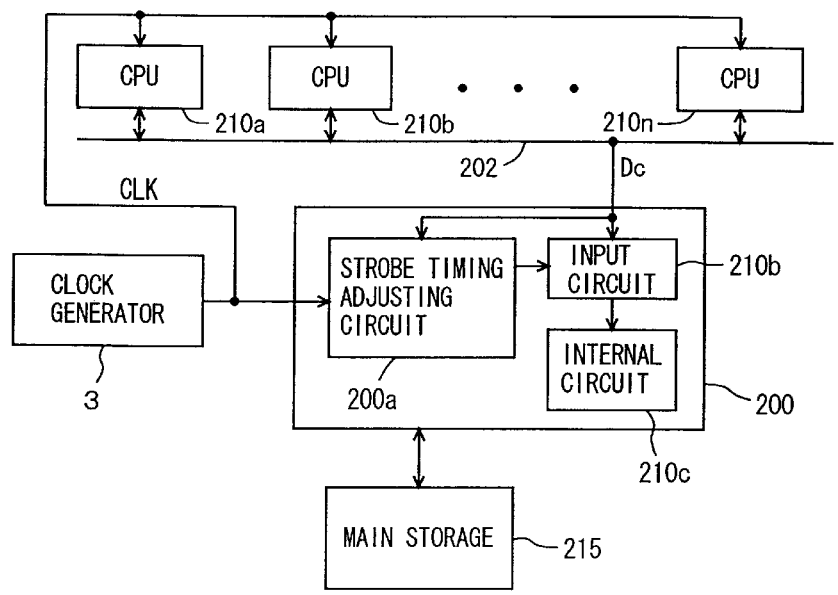
FIG. 72 schematically shows a structure of a processing system according to a fifth embodiment of the invention.

FIG. 72 schematically shows a structure of a processing system according to a fifth embodiment of the invention. In FIG. 72, the processing system includes a plurality of processors (CPUs) 210a–210n coupled in parallel to a common data bus 202, and a memory control device 200 for transferring data between processors 210a–210n and a main storage 215. Clock generator 3 commonly applies clock signal CLK to processors 210a–210n and memory control device 200.

Processors 210a–210n and memory control device 200 operate in synchronization with clock signal CLK, and therefore data is transferred onto common data bus 202 in synchronization with clock signal CLK. However, the impedance of data bus 202 changes in accordance with the number of processors connected thereto, and the distances from processors 210a–210n to memory controller 200 depend on the positions of the processors. Accordingly, upon taking-in of data sent from processors 210a–210n by memory control device 200, a skew occurs with respect to clock signal CLK, as already described in the foregoing embodiments. Particularly, in the case of system expansion, since the number of processors and the length of data bus increase, the impedance of the data bus (data transmission path) changes. In the case of system expansion, therefore, a large deviation occurs in data strobe timing, resulting in a problem that the system expandability is low.

Accordingly, memory control device 200 is provided with a strobe timing adjusting circuit 200a, which in turn adjusts the data strobe timing in input circuit 200b in accordance with data Dc sent from common data line 202 and the clock signal. Strobe timing adjusting circuit 200a corresponds to the combination of timing control circuit 5 and strobe clock generating circuit 6 shown in FIG. 1. At the time of test or initialization, a data window is detected in accordance with the input data and the clock signal CLK, and the strobe signal is produced from this data window.

Accordingly, a sufficient set-up margin and a sufficient hold margin can be ensured regardless of the position of the processor on a board, as can be done in the memory system already described with reference to FIG. 1, and the data from the processors can be accurately taken and written into main storage 215.

The data taken in by input circuit 210b is applied to internal circuit 210c, in which a processing such as conversion of the bit width of data is performed, and then is transferred to main storage 225.

Strobe timing adjusting circuit 200a has a structure corresponding to the timing adjusting circuits of the first to third embodiments shown in FIGS. 1 to 50, and therefore, has a function of evaluating a quality of the received data. Instead of the address specifying a memory device, a processor address specifying a process is used.

First Modification

Figure 73:
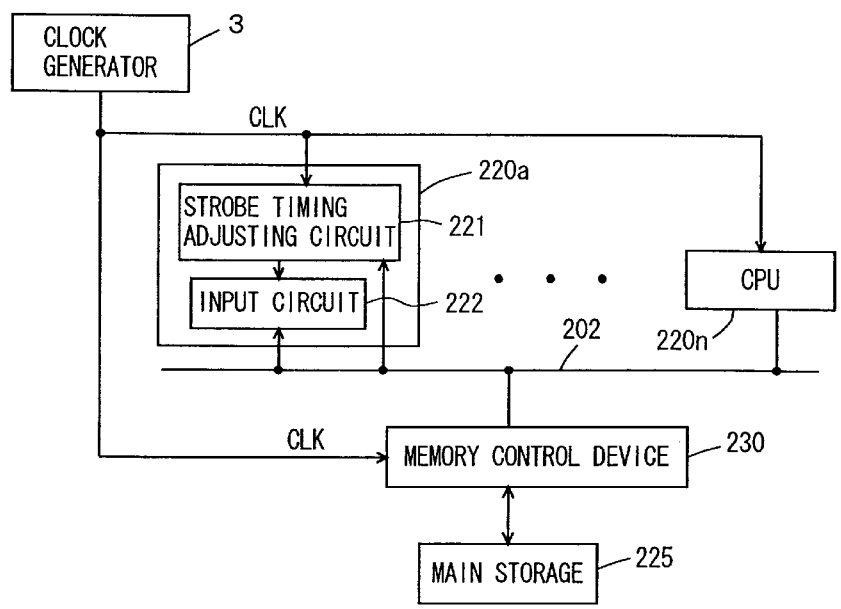
FIG. 73 schematically shows a structure of a first modification of the fifth embodiment.

FIG. 73 schematically shows a first modification of the fifth embodiment of the invention, and particularly shows a structure of a processing system. In FIG. 73, the processing system includes a plurality of processors 220a–220n coupled in parallel to common data bus 202, and a memory control device 230 for controlling data transfer between processors 220a–220n and a main storage 225. Processors 220a–220n and control device 230 commonly receive clock signal CLK from clock generator 3, and operate in synchronization with clock signal CLK.

In the structure shown in FIG. 73, each of processors 220a–220n is provided with a strobe timing adjusting circuit 221 for adjusting data strobe timing. Strobe timing adjusting circuit 221 has a structure similar to that of timing adjusting circuit 200a shown in FIG. 72, and strobes the data transferred from memory control device 230 via data bus 202 at an optimum timing. Accordingly, even in the case where distances from memory control device 230 to processors 220a–220n are varied and therefore the skew of data with respect to clock signal CLK is also varied, the data can be taken in accurately. In addition, in detecting the quality of data, processor 220 is not particularly required to store the addresses. When a data quality failure is detected, it is merely required to execute the system reset.

In the multiprocessor system, the processor is provided with a function of adjusting the strobe timing. Thereby, a processor added for system expansion can take in the data at the optimum timing so that the system expansion can be easily implemented.

Second Modification

Figure 74:
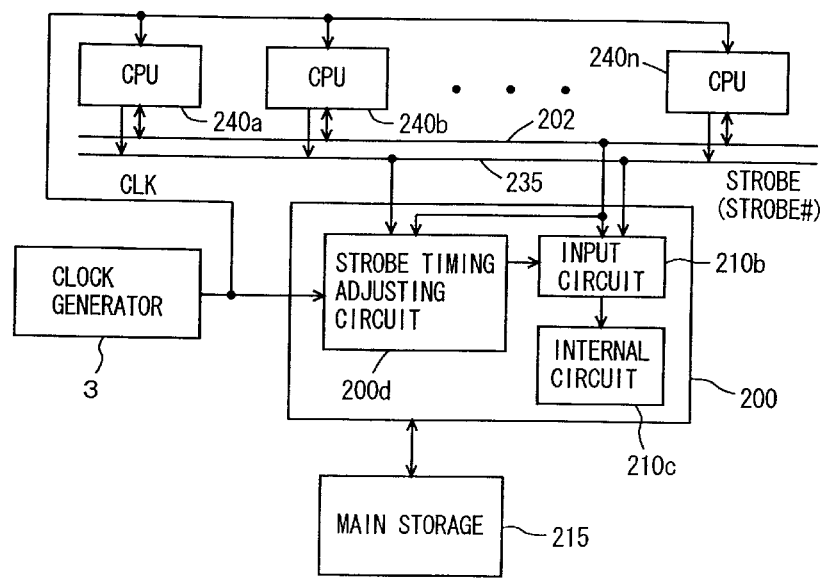
FIG. 74 schematically shows a structure of a processing system according to a second modification of the fifth embodiment.

FIG. 74 schematically shows another modification of the fifth embodiment of the invention, and particularly a structure of a processing system. In FIG. 74, the processing system includes a plurality of processors 240a–240n coupled in parallel to common bus 202, and memory control device 200 for controlling the data transfer between processors 240a–240n and main storage 215. Processors 240a–240n commonly receive clock signal CLK from clock generator 3.

In this structure of the second modification, processors 240a–240n apply strobe signal STROBE (and complementary strobe signal STROBE#) to memory control device 200 via a signal line 235. In memory control device 200, therefore, strobe timing adjusting circuit 200d produces data window indicating the effective data period in accordance with strobe signal STROBE and clock signal CLK. The structure of strobe timing adjusting circuit 200d is the same as that of timing adjusting circuit 110 shown in FIG. 52.

In the structure shown in FIG. 74, even if the distances from the processors to the memory control device are varied, strobe timing adjusting circuit 220d can strobe the data at the timings according to the distances to respective processors 240a–240n, and therefore the data transfer can be performed accurately.

Structures other than the above are substantially the same as those shown in FIG. 72, and the corresponding portions bear the same reference numbers.

Third Modification

Figure 75:
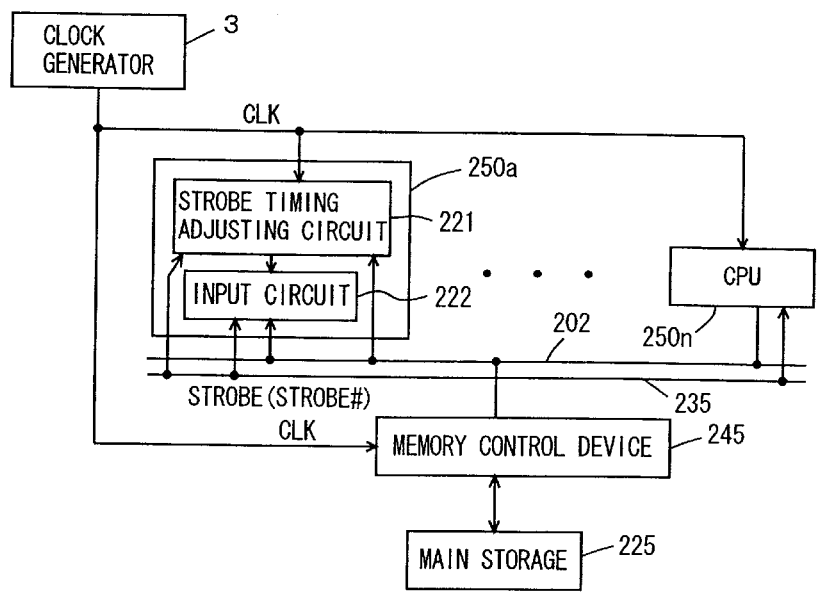
FIG. 75 schematically shows a structure of a processing system of a third modification of the fifth embodiment.

FIG. 75 shows a third modification of a fifth embodiment of the invention, and particularly a schematic structure of a processing system according to the third modification. The structure shown in FIG. 75 differs from the structure shown in FIG. 73 in the following point. Each of processors 250a–250n receives strobe signals STROBE and STROBE# from memory control device 245 via a signal line 235. In each of processors 250a–250n, a strobe timing adjusting circuit 221 adjusts the strobe timing for the data sent from memory control device 245 in accordance with clock signal CLK sent from clock generator 3 and strobe signals STROBE and STROBE#.

Accordingly, in the structure shown in FIG. 75, data can be taken in at accurate timing even if the distances from the processors to the memory controller are varied.

The structures shown in FIGS. 74 and 75 may be combined to implement accurate, bi-directional data transfer between the memory control device and the processors.

Fourth Modification

Figure 76:
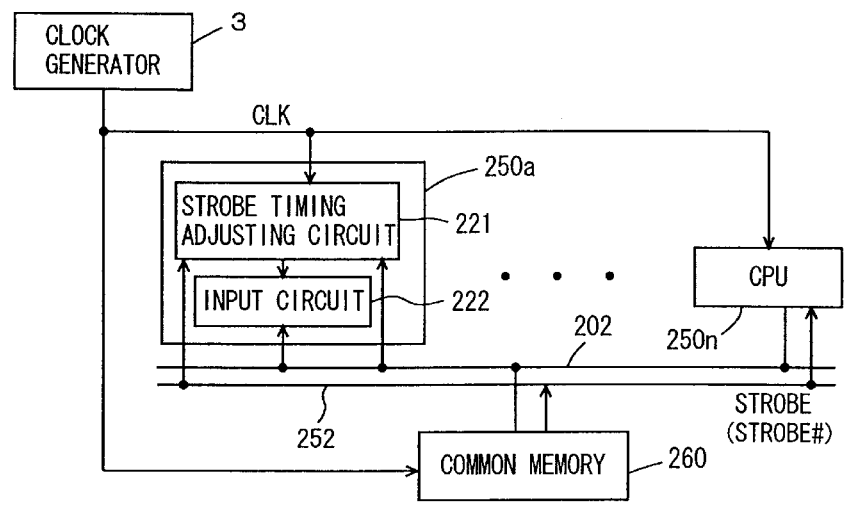
FIG. 76 schematically shows a structure of a processing system of a fourth modification of the fifth embodiment.

FIG. 76 schematically shows a structure of a fourth modification of the fifth embodiment according to the invention. In the structure shown in FIG. 76, a common memory 260 is connected to common data bus 202. In the data transfer operation, common memory 260 transfers strobe signals STROBE and STROBE# to processors 250a–250n via signal line 252 together with data. Common memory 260 operates in synchronization with the clock signal sent from clock generator 3.

The structure shown in FIG. 76 is equivalent to a structure obtained by eliminating the memory control device from the structure shown in FIG. 75, and access conflict on common memory 260 can be avoided by a bus arbiter.

Accordingly, in the structure shown in FIG. 76, strobe timing adjusting circuit 221 in each of processors 250a–250n can accurately compensate for deviation in strobe timing even when the distances between the common memory and the processors are varied, and accurate data taking in operation can be implemented. Thereby, each processor can take in the data without an influence of change in impedance of the data bus even after system expansion, and the system capable of fast operation can be implemented.

In the structure shown in FIG. 76, the strobe timing adjusting circuit may be configured to detect the change point of data for detecting the window indicating the effective data period, as shown in FIG. 72.

Fifth Modification

Figure 77:
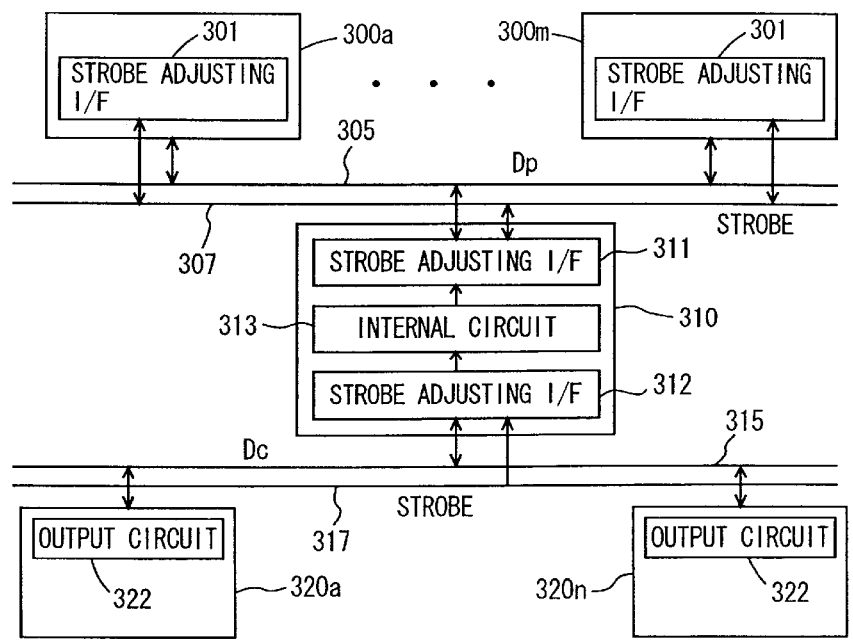
FIG. 77 schematically shows a structure of a processing system of a fifth modification of the fifth embodiment.
Figure 78:
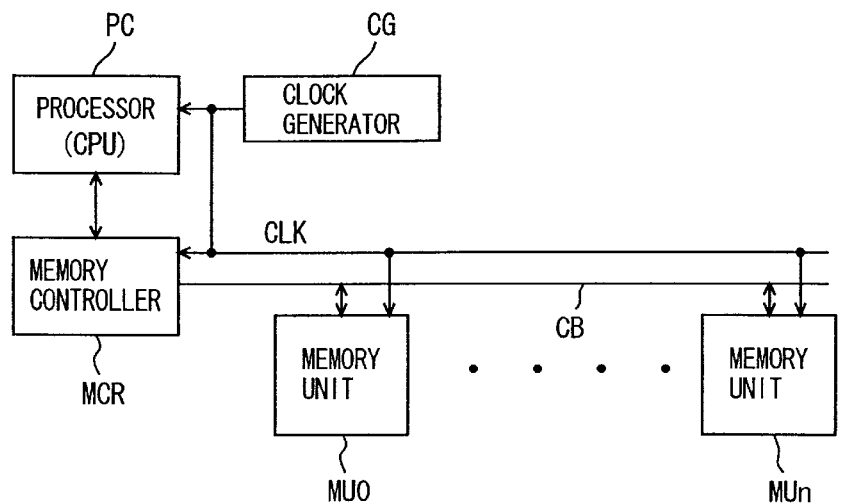
FIG. 78 schematically shows a structure of a conventional data processing system.
Figure 79:
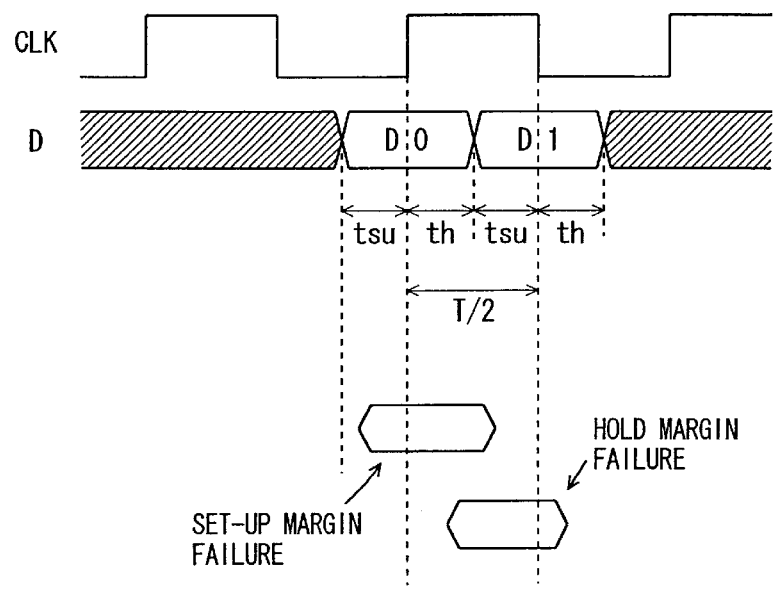
FIG. 79 is a timing chart representing operations of the data processing system shown in FIG. 78.
Figure 80:
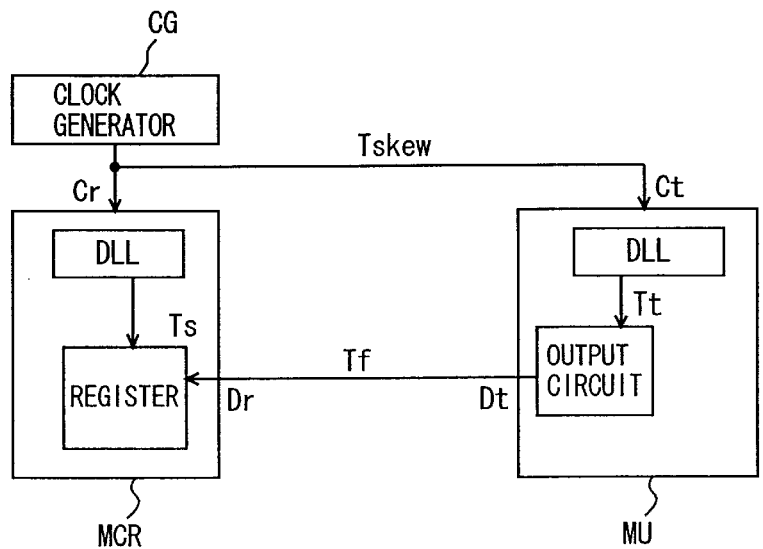
FIG. 80 shows signal transfer times in a conventional memory system.
Figure 81:
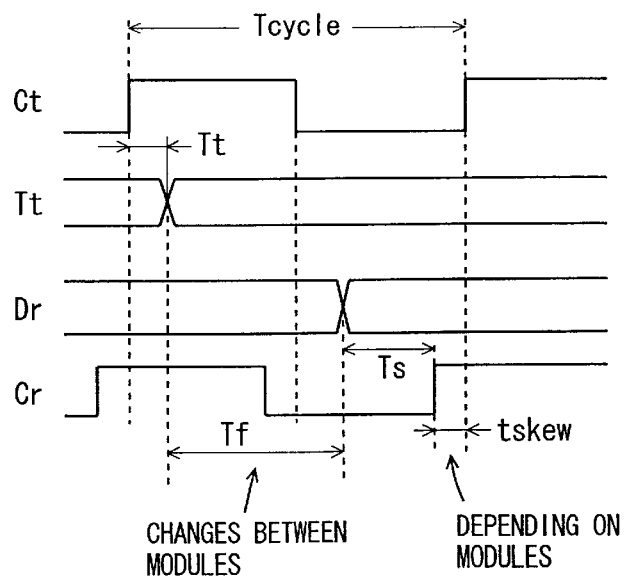
FIG. 81 is a timing chart representing operations of the memory system shown in FIG. 80.

FIG. 77 shows a fifth modification of the fifth embodiment of the invention, and particularly a schematic structure of the processing system. In FIG. 77, the processing system includes a plurality of processors 300a–300m coupled in parallel to a processor bus 305, a memory control device 310 coupled commonly to processors 300a–300m via processor bus 305, and memory devices 320a–320n coupled in parallel to a memory bus 315 for transferring data to and from memory control device 310.

Each of processors 300a–300m includes an interface circuit (I/F) circuit 301 with a strobe adjusting function for transferring strobe signal STROBE via a signal line 307 and transferring data via processor bus 305. Likewise, memory control device 310 includes an interface circuit 311 with a strobe adjusting function for transferring strobe signal STROBE via signal line 307 and transferring data via processor bus 305. Memory control device 310 further includes an interface circuit 312 with a strobe adjusting function for receiving strobe signal STROBE outputted from any of memory devices 320a–320n, and for transferring the data to or from a selected memory device via memory data bus 315.

For processors 300a–300m, strobe signal STROBE is transferred bidirectionally. When processors 300a–300m receive data from memory control device 310, strobe signal STROBE is transferred from memory control device 310 to processors 300a–300m via signal line 307. When processors 300a–300m each transfer data to memory control device 310, an associated interface circuit 301 transfers strobe signal STROBE to interface circuit 311 of memory control device 310 via signal line 307. Therefore, processors 300a–300m can accurately perform both the loading and storing of data.

In memory control device 310, internal circuit 313 determines the data transfer direction for transferring the data in the determined direction. Interface circuit 312 coupled to memory bus 315 receives strobe signal STROBE via signal line 317 from output circuit 322 of a selected (i.e., access-requested) memory device, and produces the effective data window for taking in (strobing) the data.

According to the structure shown in FIG. 77, data transfer can be accurately performed between the memory devices and the memory control device and between the memory control device and the processors. Thereby, the fast processing system having high expandability can be implemented.

The data transfer between the processors and the memory control device may be performed in a burst mode in synchronization with both the falling and rising edges of clock signal CLK. In this case, each interface circuit likewise adjust the strobe timing, and the data taking-in operation having a sufficient timing margin can be accurately performed even with a fast clock signal.

In the structure shown in FIG. 77, such a structure may be employed in which the edge of change of transferred data (received data) is detected for detection/production of the effective data window, similarly to the structure shown in FIG. 1.

According to the fifth embodiment, as described above, the strobe timing is adjusted for the data transferred between the memory control device and the processors or between the processors and the memory. Therefore, accurate strobe can be ensured for the processor data so that the system that is capable of fast operation and has high expandability can be implemented.

Other Examples of Application

Description has been given on the memory devices that perform the data transfer at the double data rate (DDR) mode. However, the memory device employed in the present invention may be a device, which in turn transfers the data in synchronization with one of the rising and falling edges of the clock signal, or in an EDO mode. Further, the memory device may be a flash memory.

According to the present invention, as described above, the data window is detected from the data on the data line for optimizing the data strobe timing, and therefore the data transfer can be performed accurately regardless of the system structure. In the case of a memory system, a DLL for producing a data outputting clock is not required, and therefore the chip area and the power consumption can be reduced. Further, the data window width is monitored on a data receiving side, so that transfer of erroneous data can be prevented, and the reliability of the system can be ensured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An interface circuit comprising:
   production/storage circuitry for detecting a point of change in data on a data line, producing effective window information indicating an effective period of said data in accordance with a result of detection, and storing said effective window information;
   strobe timing determining circuitry for determining a strobe timing for taking in data on said data line in accordance with the effective window information stored in said production/storage circuitry; and
   clock producing circuitry for producing a clock signal for taking in the data on said data line in accordance with the strobe timing determined by said strobe timing determining circuitry.

2. The interface circuit according to claim 1, wherein said data includes a plurality of bits, and
   said production/storage circuitry includes a circuit for detecting a slowest point of change and a subsequent fastest point of change in said plurality of bits and producing the effective window information.

3. The interface circuit according to claim 2, wherein said production/storage circuitry includes a circuit for detecting said point of change using a set of complementary data bits.

4. The interface circuit according to claim 1, wherein said interface circuit takes in the data on said data line in synchronization with rising and falling of said clock signal, and
   said production/storage circuitry includes a circuit for producing and storing the effective window information for each of said rising and falling.

5. The interface circuit according to claim 4, wherein said data on said data line is configured such that data bits in logical levels opposite to each other are outputted successively per bit; and said production/storage circuitry includes a circuit for producing the effective window information for each of said rising and falling based on successive change points of said data bits.

6. The interface circuit according to claim 1, wherein the data on said data line includes a plurality of bits, and said production/storage circuitry includes a circuit for detecting said effective window information for each set including a predetermined number of bits among said plurality of bits.

7. The interface circuit according to claim 6, wherein said production/storage circuitry further includes a circuit for combining the effective data windows detected by said detecting circuit to produce and store information indicating a final effective window for the data of said plurality of bits.

8. The interface circuit according to claim 6, wherein said production/storage circuitry further includes a circuit for storing the effective window information for each set including said predetermined number of bits, said strobe timing determining circuitry includes a circuit for determining the strobe timing for each set, and said clock producing circuitry includes a circuit for producing said clock signal for each set.

9. The interface circuit according to claim 1, wherein data read from a memory device is transmitted onto said data line, and said memory device includes a plurality of banks driven to an active state independently of each other, said production/storage circuitry includes a circuit for producing the effective window information for each of said plurality of banks, and said strobe timing determining circuitry includes a circuit for determining the strobe timing for each of said plurality of banks.

10. The interface circuit according to claim 1, wherein said production/storage circuitry includes:
    a plurality of cascaded delay stages each delaying a basic clock signal, and
    a plurality of latch stages provided corresponding to said plurality of delay stages for latching input signals of corresponding delay stages in accordance with the produced effective windows.

11. The interface circuit according to claim 10, wherein said strobe timing determining circuitry includes:
    a circuit for detecting a position of change in logical level of output signals of adjacent two latch stages among said plurality of latch stages, and
    a circuit for determining the data strobe timing in accordance with said position of change for storage; and said clock producing circuitry includes a circuit for selecting an input signal of a delay stage, among the delay stages, corresponding to the determined position corresponding to the data strobe timing.

12. The interface circuit according to claim 1, wherein said data has a plurality of bits, and said interface circuit further comprises:
    detection/storage circuitry for detecting a delay of change in data bits when said plurality of bits change in a same direction, and storing a result of detection; and
    circuitry for adjusting said effective window based on said result of detection stored in said detection/storage circuitry.

13. The interface circuit according to claim 12, wherein said detection/storage circuitry includes a circuit, provided for each set of a predetermined number of bits of said plurality of bits of the data, for detecting the delay for each set, with one of said predetermined number of bits changing to a first logical level while other bit(s) changing to a second logical level.

14. The interface circuit according to claim 1, further comprising:

condition determining circuitry for detecting a set-up time and a hold time from said effective window, and determining whether a result of the detection satisfies a predetermined condition; and circuitry for selectively storing an address and a data pattern of said data in accordance with a result of determination by said condition determining circuitry.

15. The interface circuit according to claim 14, wherein a plurality of semiconductor devices of components of a system are connected to said data line, and said interface circuit further comprises:
    circuitry for issuing a system reset signal for resetting the system when said condition determining circuitry determines that a first condition different from said predetermined condition is satisfied.

16. The interface circuit according to claim 1, wherein data is read onto said data line from a memory device, and said interface circuit is arranged in a memory control device for controlling an access to said memory device in accordance with an access request sent from a processor.

17. The interface circuit according to claim 1, wherein said data line is coupled to a processor and a memory controller controlling data transfer between a memory device and said processor in response to an access request sent from said processor, and said interface circuit is arranged at least one of said processor and said memory controller.

18. The interface circuit according to claim 1, wherein data is read onto said data line from a memory device, and said interface circuit is arranged in a semiconductor circuit device accessing said memory device.

19. An interface circuit comprising:

transition point detecting circuitry for detecting a point of transition in data on a data line;

producing circuitry for producing effective window information indicating an effective period of said data in accordance with the point of transition detected by said transition point detecting circuitry;

determining circuitry for determining whether a width of said effective window satisfies a first condition; and storage circuitry for storing an address and a data pattern of said data when said determining circuitry determines that said first condition is satisfied.

20. The interface circuit according to claim 19, further comprising:

circuitry for issuing a system reset instruction for resetting a system when said determining circuitry determines that a second condition is satisfied.

21. The interface circuit according to claim 19, wherein data is read onto said data line from a memory device, and said interface circuit is arranged in a memory control device for controlling an access to said memory device in accordance with an access request sent from a processor.

22. The interface circuit according to claim 19, wherein said data line is coupled to a processor and a memory controller controlling data transfer between a memory device and said processor in response to an access request sent from said processor, and said interface circuit is arranged at least one of said processor and said memory controller.

23. The interface circuit according to claim 19, wherein data is read onto said data line from a memory device, and said interface circuit is arranged in a semiconductor circuit device accessing said memory device.

24. An interface circuit comprising:

effective window extracting circuitry for detecting a point of change in data on a data line, and producing an effective window signal indicating an effective period of said data in accordance with a result of the detection;

effective window width detecting circuitry for detecting an effective period width of said effective window signal using a reference clock signal, and storing a result of the detection;

strobe timing storing circuitry for determining a strobe timing for said data from the effective window width information detected by said effective window width detecting circuitry, and storing the determined strobe timing; and strobe signal producing circuitry for producing a strobe signal for the data on said data line in accordance with the strobe timing stored in said strobe timing storing circuitry.

25. The interface circuit according to claim 24, wherein said interface circuit is arranged in a memory control device controlling an access to a memory device in accordance with an access request issued from a processor, and said reference clock signal is an internal operation clock signal of said processor.

26. The interface circuit according to claim 24, wherein said effective window extracting circuitry includes a circuit for detecting the point of change in data on the data line in accordance with data strobe signals complementary to each other.

27. The interface circuit according to claim 24, wherein data is read onto said data line from a memory device, and said interface circuit is arranged in a memory control device for controlling an access to said memory device in accordance with an access request sent from a processor.

28. The interface circuit according to claim 24, wherein said data line is coupled to a processor and a memory controller controlling data transfer between a memory device and said processor in response to an access request sent from said processor, and said interface circuit is arranged at least one of said processor and said memory controller.

29. The interface circuit according to claim 18, wherein data is read onto said data line from a memory device, and said interface circuit is arranged in a semiconductor circuit device accessing said memory device.

* * * * *